US012520783B2

(12) United States Patent
Camarena et al.

(10) Patent No.: US 12,520,783 B2
(45) Date of Patent: Jan. 13, 2026

(54) SYSTEM AND METHOD FOR VERTICAL FARMING

(71) Applicant: Oishii Farm Corporation, Jersey City, NJ (US)

(72) Inventors: Andres Camarena, Jersey City, NJ (US); Walter Mielarczyk, Jersey City, NJ (US); Hitoshi Kawashima, Jersey City, NJ (US); Bryan Lim, Jersey City, NJ (US)

(73) Assignee: Oishii Farm Corporation, Jersey City, NJ (US)

( * ) Notice: Subject to any disclaimer, the term of this patent is extended or adjusted under 35 U.S.C. 154(b) by 0 days.

(21) Appl. No.: 19/036,742

(22) Filed: Jan. 24, 2025

(65) Prior Publication Data

US 2025/0204345 A1 Jun. 26, 2025

Related U.S. Application Data

(63) Continuation of application No. 18/780,900, filed on Jul. 23, 2024, now Pat. No. 12,239,059, which is a
(Continued)

(51) Int. Cl.
*A01G 31/04* (2006.01)
*A01G 7/04* (2006.01)
(Continued)

(52) U.S. Cl.
CPC .......... *A01G 31/045* (2013.01); *A01G 7/045* (2013.01); *A01G 22/05* (2018.02); *A01G 31/06* (2013.01);
(Continued)

(58) Field of Classification Search
CPC ...... A01G 31/06; A01G 31/00; A01G 31/045; A01G 31/04
See application file for complete search history.

(56) References Cited

U.S. PATENT DOCUMENTS 2,896,374 A * 7/1959 Perin ...................... A01G 31/06
   47/62 R
2,897,631 A * 8/1959 Howsley, Jr. .......... A01G 31/06
   47/60
(Continued)

FOREIGN PATENT DOCUMENTS

DE      2455219 A  *  5/1976  ............ A01G 31/06
JP   2000004672 A     1/2000
(Continued)

OTHER PUBLICATIONS

Japanese Office Action issued in Application No. 2024-098476, dated Jul. 1, 2025.
(Continued)

*Primary Examiner* — Kristen C Hayes
(74) *Attorney, Agent, or Firm* — Amster, Rothstein & Ebenstein LLP

(57) ABSTRACT

An irrigation system for a vertical farm system including one or more irrigation stations, each of the one or more irrigation stations including one or more tanks that hold irrigation fluid, and one or more spigots that deliver the irrigation fluid from the one or more tanks to the vertical farm system. Each of the one or more irrigation stations includes a plurality of sub-assemblies, and each sub-assembly includes a corresponding one of the one or more tanks and a corresponding one of the one or more spigots.

5 Claims, 50 Drawing Sheets

Related U.S. Application Data continuation of application No. 18/619,847, filed on Mar. 28, 2024.

(60) Provisional application No. 63/613,377, filed on Dec. 21, 2023.

(51) Int. Cl.
  A01G 22/05 (2018.01)
  A01G 31/00 (2018.01)
  A01G 31/06 (2006.01)
  A01K 47/06 (2006.01)
  *A01G 9/24* (2006.01)
  *A01G 9/26* (2006.01)

(52) U.S. Cl.
  CPC .............. *A01K 47/06* (2013.01); *A01G 9/246* (2013.01); *A01G 9/247* (2013.01); *A01G 9/26* (2013.01)

(56) References Cited

U.S. PATENT DOCUMENTS

| | | | |
|---|---|---|---|
| 2,917,867 A | * | 12/1959 | Bailey .................... A01G 31/06 99/425 |
| 2,940,218 A | * | 6/1960 | Carter .................... A01G 31/06 137/132 |
| 2018/0168111 A1 | | 6/2018 | Yasukuri |
| 2019/0335676 A1 | | 11/2019 | Solomon et al. |
| 2019/0335692 A1 | | 11/2019 | Speetjens et al. |
| 2020/0100445 A1 | | 4/2020 | Saba |
| 2023/0075956 A1 | | 3/2023 | Laeske |

FOREIGN PATENT DOCUMENTS

| | | |
|---|---|---|
| JP | 2012518993 A | 8/2012 |
| JP | 2014090689 A | 5/2014 |
| JP | 2016007148 A | 1/2016 |
| JP | 2020191888 A | 12/2020 |
| JP | 2022127072 A | 8/2022 |
| WO | 2003041489 A1 | 5/2003 |
| WO | 2016190017 A1 | 12/2016 |
| WO | 2022046564 A1 | 3/2022 |

OTHER PUBLICATIONS

International Search Report and Written Opinion issued in Application No. PCT/US2024/059126, dated Feb. 10, 2025.

* cited by examiner

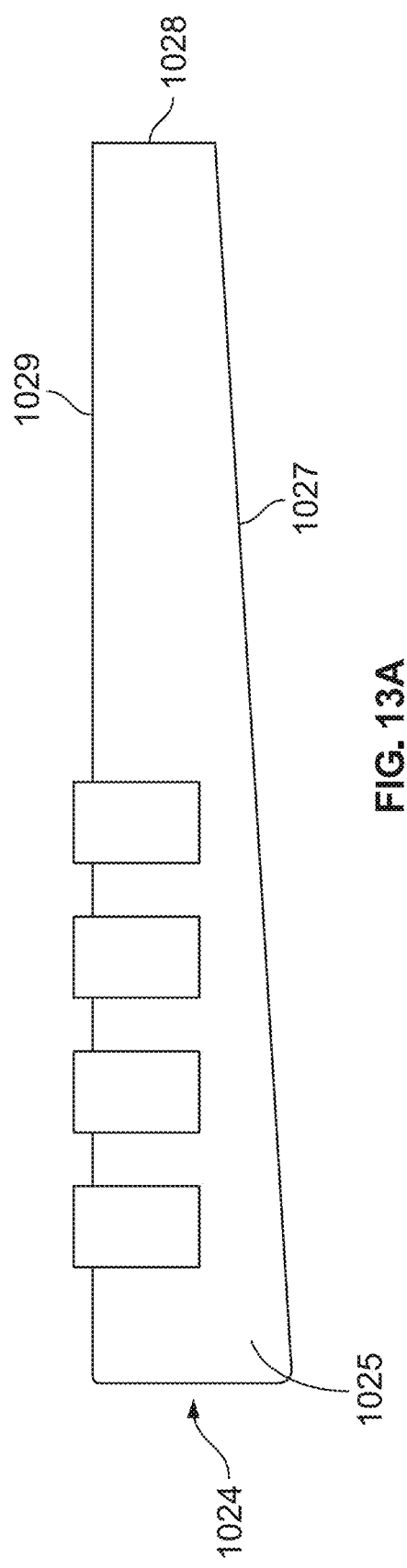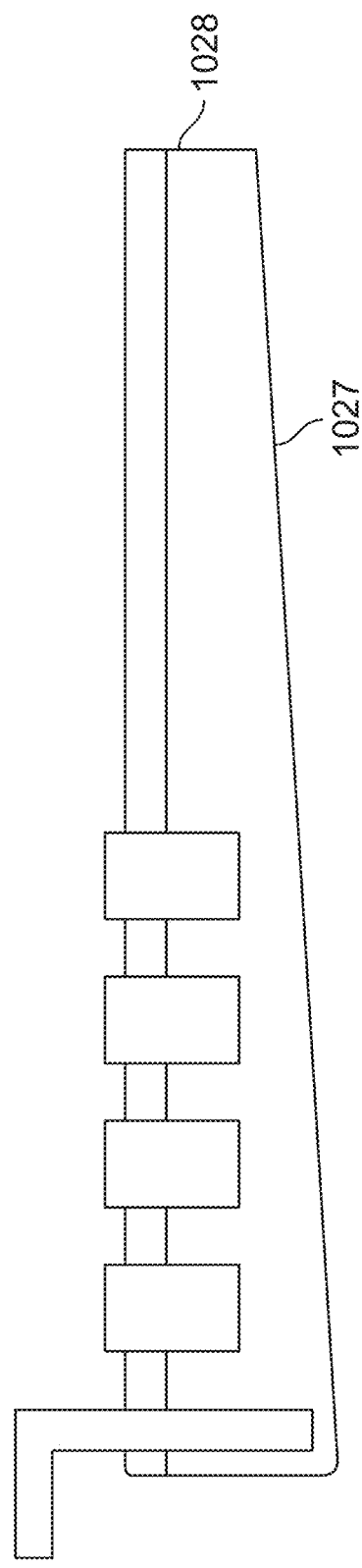
FIG. 13A
FIG. 13B

Oishii IPM Report for 09-29-2023/RD-1/ with 2 scans

| Class | Num Detections | Detection% | Actions | |
|---|---|---|---|---|
| aphid | 625 | 90.98% | View Detections | View Scans ▾ |
| fungus-gnat | 45 | 6.55% | View Detections | View Scans ▾ |
| whitefly | 11 | 1.6% | View Detections | View Scans ▾ |
| thrip | 6 | 0.87% | View Detections | View Scans ▾ |

FIG. 23

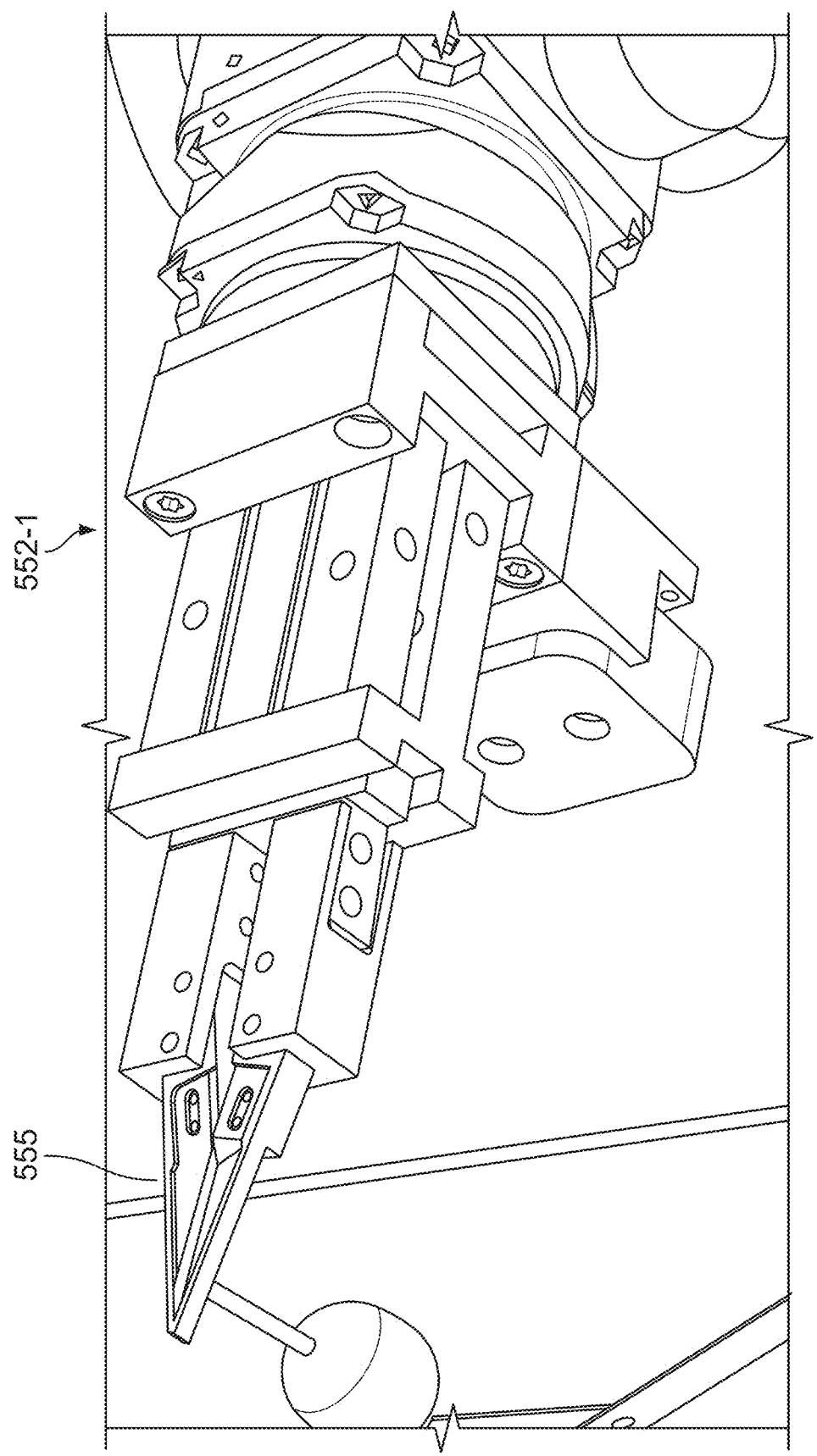

SYSTEM AND METHOD FOR VERTICAL FARMING

RELATED APPLICATIONS

This application claims priority to U.S. patent application Ser. No. 18/780,900, filed Jul. 23, 2024 and entitled SYSTEM AND METHOD FOR VERTICAL FARMING, which in turn claims priority to U.S. patent application Ser. No. 18/619,847, filed Mar. 28, 2024 and entitled SYSTEM AND METHOD FOR VERTICAL FARMING, which in turn claims priority to and the benefit of U.S. Provisional Patent Application 63/613,377, filed Dec. 21, 2023 and entitled SYSTEM AND METHOD FOR VERTICAL FARMING, the contents of which are incorporated herein by reference in their entirety.

FIELD OF THE INVENTION

The present invention relates to systems and methods for non-conventional agriculture, and more particularly to systems and methods for non-conventional agriculture in which the growing environment is controlled to cultivate and maximize yield of an agricultural crop.

BACKGROUND

Conventional vertical farming involves the growing of crops in vertically stacked layers, and often incorporates controlled-environment agriculture, which aims to optimize plant growth, and soilless farming techniques such as hydroponics, aquaponics, and aeroponics in a year-round operation. Vertical farming promotes higher crop productivity, quality and efficiency due to the protected indoor environment, free of variables in weather conditions, pests, lighting, as well as pesticides and chemical use. Vertical farming requires a fraction of land as compared to traditional farming, thus being far less disruptive to the surrounding environment and ecosystem. Sustainable practices can be employed, including renewable energies, water and nutrient recycling, a minimized carbon footprint, and avoidance of pesticides and runoff that might otherwise harm the surrounding environment. Also, they can be built and deployed anywhere in the world, supplying specific agriculture to a region devoid of it.

Conventional vertical farming techniques require a controlled, protected environment to ensure efficient crop growth and harvesting. Numerous automated or stationary crop sections exist within the farm system, requiring particular controls and inputs. Appropriate infrastructure and tools are needed to maintain light, irrigation, air circulation, temperature control, harvesting and pruning. Farm setup requires spatial optimization to allow for various maintenance and other tasks to be efficiently performed. Taking into consideration these variables and requirements presents a technological challenge for vertical farming, thus requiring ongoing iteration and consistent optimization.

SUMMARY OF THE INVENTION

An object of the present invention is to provide a vertical farm system with a layout that is optimized in terms of space, energy consumption, environmental control and access.

Another object of the present invention is to provide a vertical farm system in which crops are moved throughout the farm in a day-night cycle while providing stationary sites around the farm for delivery of light, irrigation, air flow, pruning, harvesting and other activities required for plant growth.

Another object of the present invention is to provide a vertical farm system that uses artificial intelligence for pest control, pollination, harvesting and other tasks.

Another object of the present invention is to provide a vertical farm system that is at least partially or completely automated.

A vertical farm system according to an exemplary embodiment of the present invention comprises: at least one enclosure, the at least one enclosure separated into a day section and a night section; a plurality of racks disposed within the at least one enclosure and configured to hold plants; a conveyor system configured to move the plurality of racks through the day and night section of the at least one enclosure; and at least one of an irrigation system, a lighting system or a harvesting system disposed within the at least one enclosure, the at least one of the irrigation system, the lighting system and the harvesting system being stationary relative to the plurality of racks.

In exemplary embodiments, each of the plurality of racks comprises: a central frame; and a plurality of gutters disposed on the central frame.

In exemplary embodiments, each of plurality of racks further comprises at least one of rollers or casters disposed on the central frame.

In exemplary embodiments, each of the plurality of gutters comprises one or more plant holders.

In exemplary embodiments, each of the plurality of gutters comprises at least one of a fill opening for feeding of irrigation fluid into the gutter or a drain opening for release of irrigation fluid from the gutter.

In exemplary embodiments, each of the plurality of racks comprises a top mount assembly configured to attach to the conveyor system.

In exemplary embodiments, the conveyor system is an overhead conveyor system.

In exemplary embodiments, the conveyor system is a powered overhead conveyor, a synchronous powered overhead conveyor, an asynchronous powered overhead conveyor, an open track overhead conveyor, or a closed track overhead conveyor.

In exemplary embodiments, the conveyor system comprises one or more tracks configured to guide the plurality of racks through the conveyor system.

In exemplary embodiments, the conveyor system comprises one or more toggle switches configured to guide the plurality of racks around turns within the conveyor system.

In exemplary embodiments, the vertical farm system comprises a lighting system, and the lighting system comprises a plurality of light fixtures that are stationary relative to the plurality of racks.

In exemplary embodiments, the plurality of light fixtures extend into the path of the plurality of racks as the racks are moved through the vertical farm system so that the plurality of light fixtures extend between the plurality of gutters.

In exemplary embodiments, the lighting system is located in the day section of the at least one enclosure.

In exemplary embodiments, the night section of the at least one enclosure is devoid of light fixtures.

In exemplary embodiments, the vertical farm system comprises an irrigation system, and the irrigation system comprises one or more irrigation stations that deliver irrigation fluid to the plurality of gutters.

In exemplary embodiments, the irrigation stations are spaced from another throughout the at least one enclosure.

In exemplary embodiments, each of the one or more irrigation stations comprise: one or more tanks that hold irrigation fluid; and one or more spigots that deliver the irrigation fluid from the one or more tanks to the plurality of gutters.

In exemplary embodiments, each of the one or more irrigation stations comprises a plurality of sub-assemblies, each sub-assembly comprising: a corresponding one of the one or more tanks; and a corresponding one of the one or more spigots.

In exemplary embodiments, at each of the one or more irrigation stations, each of the plurality of sub-assemblies is arranged so that the corresponding spigot delivers the irrigation fluid to a corresponding one of the gutters of a rack of the plurality of racks as the rack is positioned next to the irrigation station.

In exemplary embodiments, the plurality of sub-assemblies are arranged in a stacked manner.

In exemplary embodiments, each sub-assembly further comprises: a stopper; and a piston assembly that moves the stopper.

In exemplary embodiments, during a filling operation, the stopper is moved by the piston assembly to block the drain opening of a corresponding gutter of the plurality of gutters while the spigot delivers the irrigation fluid to the corresponding gutter.

In exemplary embodiments, during a draining operation, the stopper is moved by the piston assembly to unblock the drain opening of the corresponding gutter so that the irrigation fluid drains from the gutter.

In exemplary embodiments, each sub-assembly further comprises a drain tray that receives the drained irrigation fluid and guides the drained irrigation fluid to a corresponding tank of an immediately adjacent sub-assembly.

In exemplary embodiments, the one or more tanks are arranged next to one another.

In exemplary embodiments, the one or more tanks are positioned at a top portion of the at least one enclosure.

In exemplary embodiments, the vertical farm system further comprises at least one of: valves that control flow of the irrigation fluid from the one or more tanks to the one or more spigots; pumps configured to remove the irrigation fluid from the plurality of gutters; or sensors configured to detect level of irrigation fluid within the one or more tanks.

In exemplary embodiments, the vertical farm system further comprises an environmental control system.

In exemplary embodiments, the environmental control system comprises: a first heating, ventilation and air conditioning (HVAC) unit associated with the day section of the at least one enclosure; and a second HVAC unit associated with the night section of the at least one enclosure.

In exemplary embodiments, the environmental control system further comprises one or more air circulation units.

In exemplary embodiments, the environmental control system further comprises one or more plenums disposed within the at least one enclosure.

In exemplary embodiments, the at least one enclosure comprises a plurality of enclosures.

In exemplary embodiments, the plants are strawberry plants.

In exemplary embodiments, the plants are tomato plants.

According to an exemplary embodiment of the present invention, a system for automatically harvesting fruit from plants comprises: (A) one or more robots, each of the one or more robots comprising: (i) a camera; and (ii) an end effector; (B) one or more edge devices, each of the one or more edge devices operatively connected to a corresponding camera of a corresponding one of the one or more robots and configured to receive first image data associated with at least one two-dimensional image captured by the corresponding camera and output second image data comprising information associated with the at least one two-dimensional image and a corresponding time stamp; (B) a programmatic logic controller operatively connected to the one or more robots; (C) a server comprising a computer-readable memory and operatively connected to the programmatic logic controller, the server comprising: (i) a programmatic logic controller module configured to receive operating state data of the one or more robots from the programmatic logic controller, input the operating state data to the memory and send robot operating instructions to the programmatic logic controller; (ii) one or more communication bridges each associated with a corresponding one of the one or more robots, each of the one or more communication bridges configured to receive the second image data and store the second image data in the memory; (iii) one or more frame synchronization modules each associated with a corresponding one of the one or more robots, each of the one or more frame synchronization modules configured to, at at least one point in time: 1. obtain first operating state data and the second image data from the memory for a corresponding one of the one or more robots; and 2. synchronize the second image data with the corresponding first operating state data; and 3. output, based on the synchronization, first synchronization data to the memory, the synchronization data comprising information associated with the captured at least one image and the corresponding first operating state of the corresponding robot; (iv) an inference module configured to process the first synchronization data output by each of the one or more frame synchronization modules using a neural network, the neural network having been configured through training to receive the synchronization data and to process the synchronization data to generate corresponding output that comprises depth of a fruit image of a fruit within the at least one images captured by the one or more cameras, at least one mask associated with the fruit image within the at least one images, and at least one keypoint associated with the fruit image within the at least one images; (v) a 3D module configured to determine, based on the processed synchronization data and the robot operating state data of each of the one or more robots, a set of points within three dimensions representing location of the fruit within a three-dimensional world frame; and (vi) an aggregator module configured to: 1. generate, based on the set of points, a world map comprising the location of the fruit within the world frame and location of the end effectors within the world frame; 2. determine, based on the world map, an ideal approach angle for the end effector of a corresponding one of the one or more robots to the fruit; and 3. make available the ideal approach angle to the programmatic logic controller module so that the programmatic logic controller can control the corresponding one of the one or more robots to move the corresponding end effector along the approach angle to pick the fruit.

In exemplary embodiments, the output of the inference module further comprises fruit ripeness detection, at least one bounding box, and at least one object detection.

In exemplary embodiments, the step of determining an ideal approach angle comprises determining an a least occluded view of the fruit.

A pollination system according to an exemplary embodiment of the present invention comprises: (A) an enclosure configured to house an insect nest; and (B) a gate system operatively connected to the enclosure, the gate system comprising: (i) an exit gate assembly; (ii) an entrance gate assembly; (iii) a vision system configured to capture images of insects within the exit gate assembly and the entrance gate assembly; and (C) a controller configured to operate the exit gate assembly and the entrance gate assembly based on the images captured by the vision system to control a number of insects within an enclosed space surrounding the pollination system.

In exemplary embodiments, the exit gate assembly comprises: a proximal portion; a distal portion; a middle portion disposed between the proximal and distal portions; a first gate between the proximal and middle portions; and a second gate between the middle and distal portions, wherein the controller is configured to operate the first and second gates in sequence so that: in a first step of the sequence, the first gate is opened to allow one or more insects to enter the middle portion from the proximal portion; in a second step of the sequence, the first gate is closed; and in a third step of the sequence, the second gate is opened to allow the one or more insects to enter the enclosed space from the middle portion through the distal portion.

In exemplary embodiments, the entrance gate assembly comprises a trap door configured to allow the insects to enter the nest while preventing the insects from exiting the nest.

In exemplary embodiments, the pollination system further comprises one or more servo motors that open and close the first and second gates.

In exemplary embodiments, the vision system comprises a camera.

In exemplary embodiments, the camera is disposed above at least one of the exit gate assembly or the entrance gate assembly.

In exemplary embodiments, the camera is disposed below at least one of the exit gate assembly or the entrance gate assembly.

In exemplary embodiments, the exit gate assembly and the entrance gate assembly share a first common wall.

In exemplary embodiments, the first common wall is made of a transparent material.

In exemplary embodiments, the camera is positioned to capture images of the insects within the exit gate assembly and the entrance gate assembly through the first common wall.

In exemplary embodiments, the exit gate assembly and the entrance gate assembly share a second common wall.

In exemplary embodiments, the second common wall is made of a translucent material.

In exemplary embodiments, the pollination system further comprises a lighting system positioned to direct light though the second common wall.

In exemplary embodiments, the first common wall is opposite the second common wall.

In exemplary embodiments, the controller comprises a computing unit.

In exemplary embodiments, the computing unit comprises a bee detection module configured to detect locations of insects within the exit gate assembly and the entrance gate assembly at a point in time based on image data generated by the vision system.

In exemplary embodiments, the bee detection module is configured to output global insect location data within a horizontal and vertical reference frame at the point in time.

In exemplary embodiments, the computing unit further comprises a middle portion bee count estimator module configured to estimate a current number of insects within the middle portion of the exit gate assembly based on the insect location data.

In exemplary embodiments, the current numbers of insects within the middle portion is estimated with an exponential filter.

In exemplary embodiments, the computing unit further comprises an insect tracker module configured to generate insect count adjustment data associated with a number of insects leaving and entering the entrance gate assembly.

In exemplary embodiments, the insect tracker module tracks the number of insects leaving and entering the entrance gate assembly by tracking insect trajectories within the entrance gate assembly within a predetermined period of time to determine an increase or decrease in a number of insects within the enclosed space.

In exemplary embodiments, the insect tracker module generates the insect count adjustment data using a filtering technique.

In exemplary embodiments, the filtering technique comprises Kalman filtering, nearest neighbor, extended Kalman filtering or unscented Kalman filtering.

In exemplary embodiments, the computing unit further comprises a command logic module configured to: determine insect count data associated with the number of bees in the enclosure based on the insect count adjustment data, insect release data and reset data, wherein the reset data is associated with a scheduled rest period in which the nest is closed and the insect count data is reset, and wherein the insect release data is associated with a number of bees released by the exit gate assembly; and determine, based on the insect count data, insect count limiting data and the reset data, control data for operation of the exit gate assembly.

In exemplary embodiments, the scheduled rest period begins during a nighttime period and ends during a daytime period following the nighttime period.

In exemplary embodiments, the computing unit further comprises an exit gate control module configured to operate the first and second gates based on the control data generated by the command logic control module.

In exemplary embodiments, the exit gate control module is further configured to generate the insect release data based on the number of insects released from the exit gate assembly.

In exemplary embodiments, the insect nest is a bee hive and the insects are bees.

A pest management system according to an exemplary embodiment of the present invention comprises: a card configured to hold pests that craw or fly onto the card; a scanner that generates image data associated with images of the pests held on the card; and a neural network having been configured through training to receive the image data and to process the image data to generate corresponding output that comprises identification data associated with the pests.

In exemplary embodiments, the image data comprises gigapixel images.

In exemplary embodiments, the output comprises a report that provides pest information based on the identification data.

In exemplary embodiments, the pest information comprises class of pests, number of pests or percentage of each pest type.

BRIEF DESCRIPTION OF THE DRAWINGS

The features and advantages of exemplary embodiments of the present invention will be more fully understood with reference to the following, detailed description when taken in conjunction with the accompanying figures, wherein:

FIGS. 13A and 13B are cross sectional view of a gutter according to an exemplary embodiment of the present invention;

FIG. 23 shows a report generated by a pest control system according to an exemplary embodiment of the present invention;

FIG. 25B is a perspective view showing scaffolding for harvesting robots according to an exemplary embodiment of the present invention;

DETAILED DESCRIPTION

In exemplary embodiments, the present invention is described in the context of vertical farming, but it should be appreciated that one or more of the various components, systems and processes described herein may be applied to other types of agriculture, such as, for example, indoor farming, outdoor farming, greenhouse farming, vertical farming and non-vertical farming, to name a few.

As explained herein, various components of the inventive vertical farm system are stationary while other components are not stationary. In this regard, the term "stationary" should be taken to mean fixed in place as in the case of, for example, manufacturing fixtures that hold a workpiece in a fixed position during a manufacturing process. As a more specific example related to the present invention, robots may be stationary in that they are fixed to a non-moveable platform within the manufacturing environment but are otherwise free to move to carry out manufacturing tasks. In contrast, components that are not stationary are free to move from point to point within the vertical farm system, and are not fixed in place.

Figure 1:
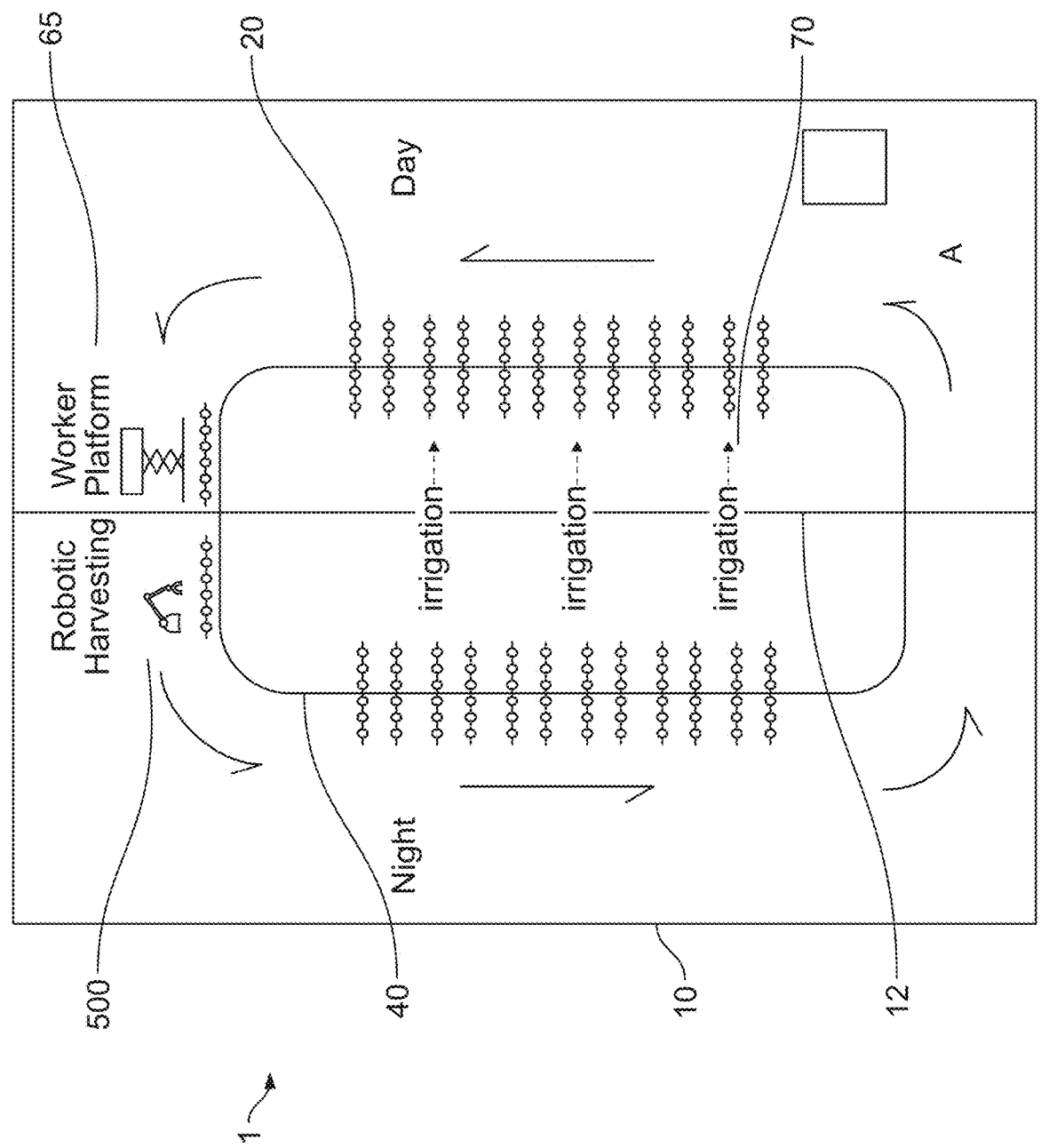
FIG. 1 is a representative diagram of a vertical farm system according to an exemplary embodiment of the present invention.

FIG. 1 shows a layout of a vertical farm system, generally designated by reference number 1, according to an exemplary embodiment of the present invention. The vertical farm system 1 includes an enclosure 10 that houses the main components of the system 1. In exemplary embodiments, the enclosure 10 may be a cleanroom and in order to minimize the carrying of particulate by a person moving into the enclosure 10, workers and other personnel may enter and leave through airlocks with or without an air shower stage, and wear protective clothing such as hoods, face masks, gloves, boots, and coveralls. The enclosure 10 may be a stand-alone structure or part of a facility that includes multiple enclosures 10, and in exemplary embodiments may be a walled off-section of a warehouse, a shipping container, or some other generally enclosed room.

The vertical farm system 1 includes a plurality of racks 20 that are configured to hold agricultural crops growing within the contained environment provided by the enclosure 10. In exemplary embodiments, the racks 20 are configured to move along a generally rectangular path within the enclosure 10, as indicated by arrows A. In this regard, the vertical farm system 1 may include a conveyor system 40 on which the racks 20 are mounted and moved within the enclosure 10. In exemplary embodiments, and as explained in more detail below, the conveyor system 40 may include a track on which the racks 20 are guided as the racks 20 move through the enclosure 10. The vertical farm system 1 may include a plurality of enclosures 10 with corresponding racks 20 and conveyor systems 40, with each enclosure 10 preferably sealed off from the other enclosures 10 to prevent cross-contamination.

In exemplary embodiments, the crops grown in the vertical farm system 1 may be flowering crops, such as, for example, strawberries, tomatoes, melons, peppers, eggplants and berries, to name a few, as well non-flowering crops such as leafy greens, root vegetables and mushrooms, to name a few. Additionally, crops grown may include tree crops, such as citrus, apples, tree nuts and olives, to name a few, as well as staple crops such as wheat, rice and corn, to name a few.

As shown, the enclosure 10 is divided in half to provide both a day-time cycle and a night-time cycle. As explained in more detail below, during the day-time cycle, lighting is provided to simulate sunlight so as to stimulate growth of the crops, while no lighting is provided in the night-time cycle. In exemplary embodiments, the day and night-time cycles may be based on any number of total hours, such as, for example, 6 hours, 12 hours, 24 hours or more. For example, if the total number of hours in the "day" or photoperiod is 24 hours, the number of hours that make up the day-time cycle might be 12 hours and the number of hours that make up the night-time cycle might be 12 hours, or any other time periods that add up to the total 24-hour photoperiod. It should be appreciated that the number of hours in the "day" is not limited to 24 hours, and in exemplary embodiments the number of hours in each "day" may be less or more than 24 hours, and each "day" may vary in the number of total hours (for example, 22 hours in a first day, 26 hours in a second day, 20 hours in a third day, etc.) In exemplary embodiments, the number of hours of the day-time cycle might be equal or not equal to the number of hours of the night-time cycle. For example, if the number of hours in the "day" is 24 hours, the day-time cycle might be 14 hours and the night-time cycle might be 10 hours. Further, in exemplary embodiments, the number of hours of the day-time cycle and the number of hours of the night-time cycle might vary from day to day.

The two halves of the enclosure 10 may be divided by a partition 12 made of, for example, plastic, fabric, metal panels (insulated or not insulated) or any other suitable material, and which is opaque enough to block a substantial amount of the light from entering the night-time portion of the enclosure 10. In exemplary embodiments, rather than a partition 12, the enclosure 10 may be divided into separate rooms, with one room providing the day-time cycle and the other room providing the night-time cycle.

The system 1 further includes a harvesting station 500 and a worker platform 65. As explained in more detail below, the harvesting station 500 may be a robotic harvesting station that includes one or more robots controlled to harvest ripe or semi-ripe fruit or vegetables as the crop matures. The worker platform 65 may include components, such as, for example, scaffolding, ladders and lifts, to name a few, to allow workers to access the racks 20 at varying heights as the racks 20 pass by the workers. In exemplary embodiments, the harvesting station 500 and worker platform 65 are generally stationary compared to the racks 20, which again are moved around the enclosure on the conveyor system 40. The harvesting station 500 and the worker platform 65 may be located at any point within the enclosure 10, such as, for example, at each end of the enclosure 10, at the middle of the enclosure 10, or at the sides of the enclosure 10. The harvesting station 500 and the worker platform 65 may be positioned directly adjacent to one another at the same location within the enclosure 10 or spaced from one another at different locations within the enclosure 10. In exemplary embodiments, multiple harvesting stations 500 and/or multiple worker platforms 65 may be positioned throughout the enclosure 10.

The system 1 also includes an irrigation system made up of one or more irrigation stations 70 placed at spaced locations along the path of the racks 20. As explained in more detail below, the irrigation stations 70 are generally stationary compared to the racks 20, and operate to provide water or water-fertilizer solution (referred to herein as "irrigation fluid") to the crops held on each rack 20 and drain the water or water-fertilizer solution from the racks 20.

Figure 2:
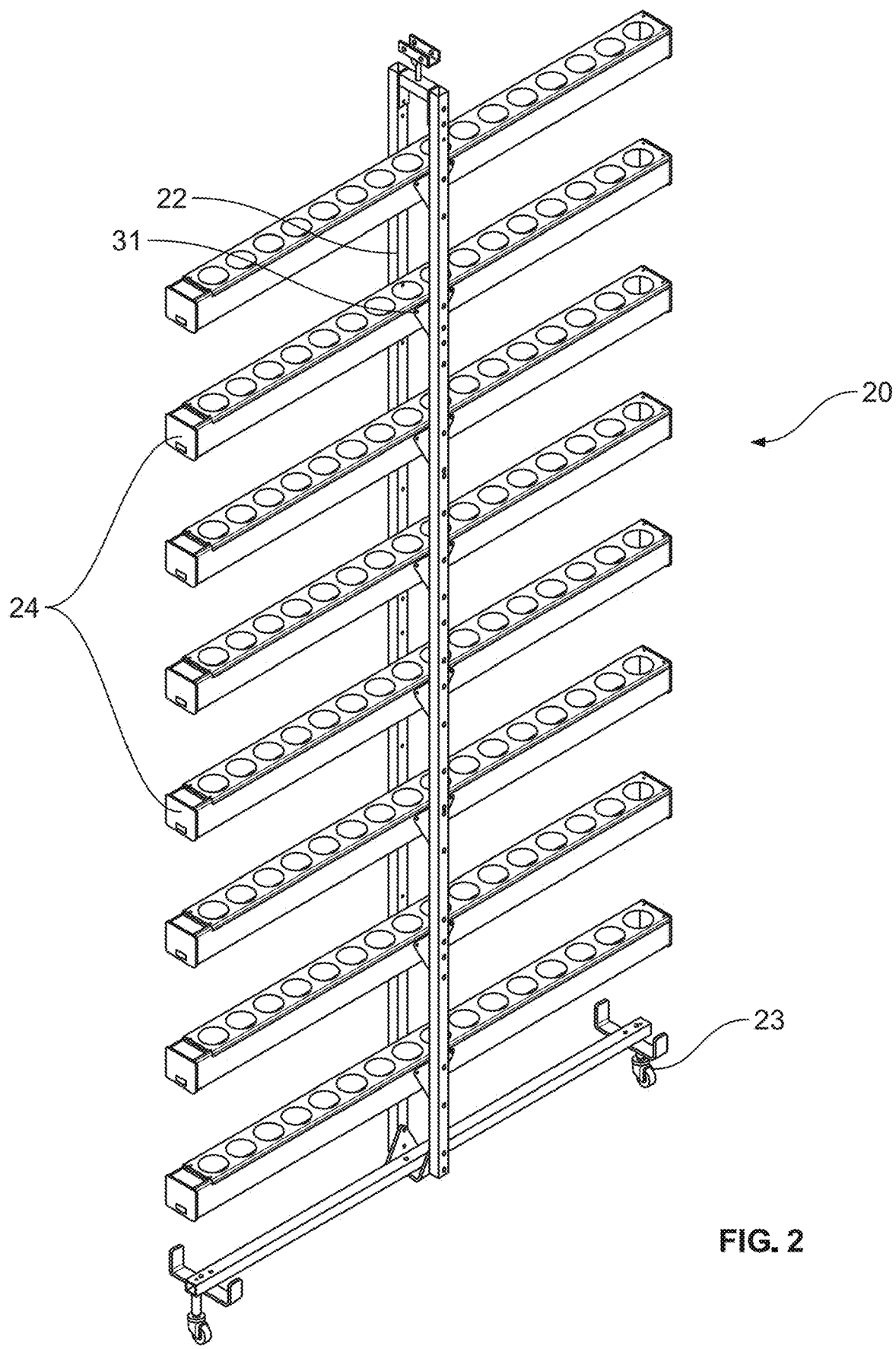
FIG. 2 is a perspective view of a rack according to an exemplary embodiment of the present invention.
Figure 3:
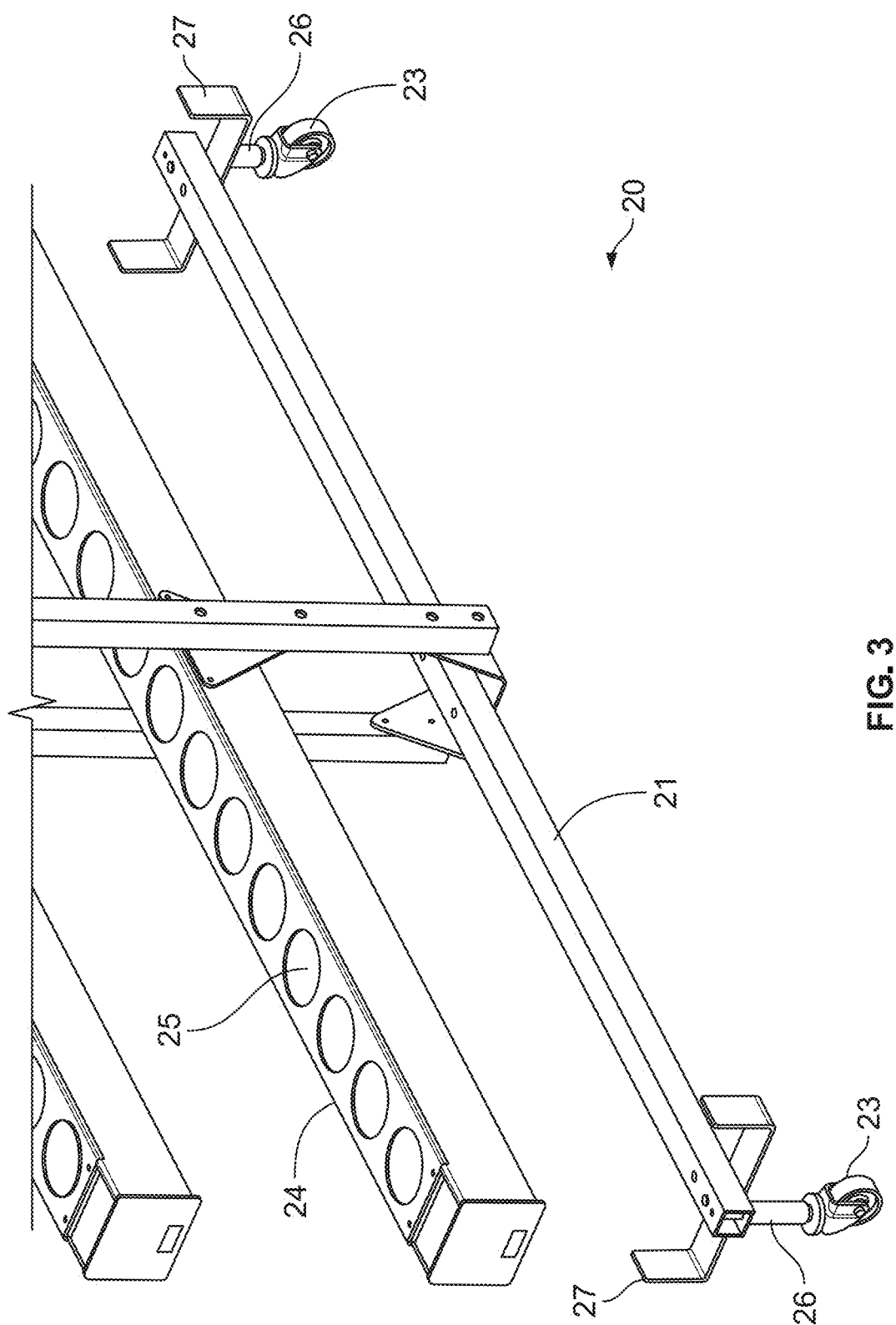
FIG. 3 is a perspective view of a portion of a rack according to an exemplary embodiment of the present invention.
Figure 4:
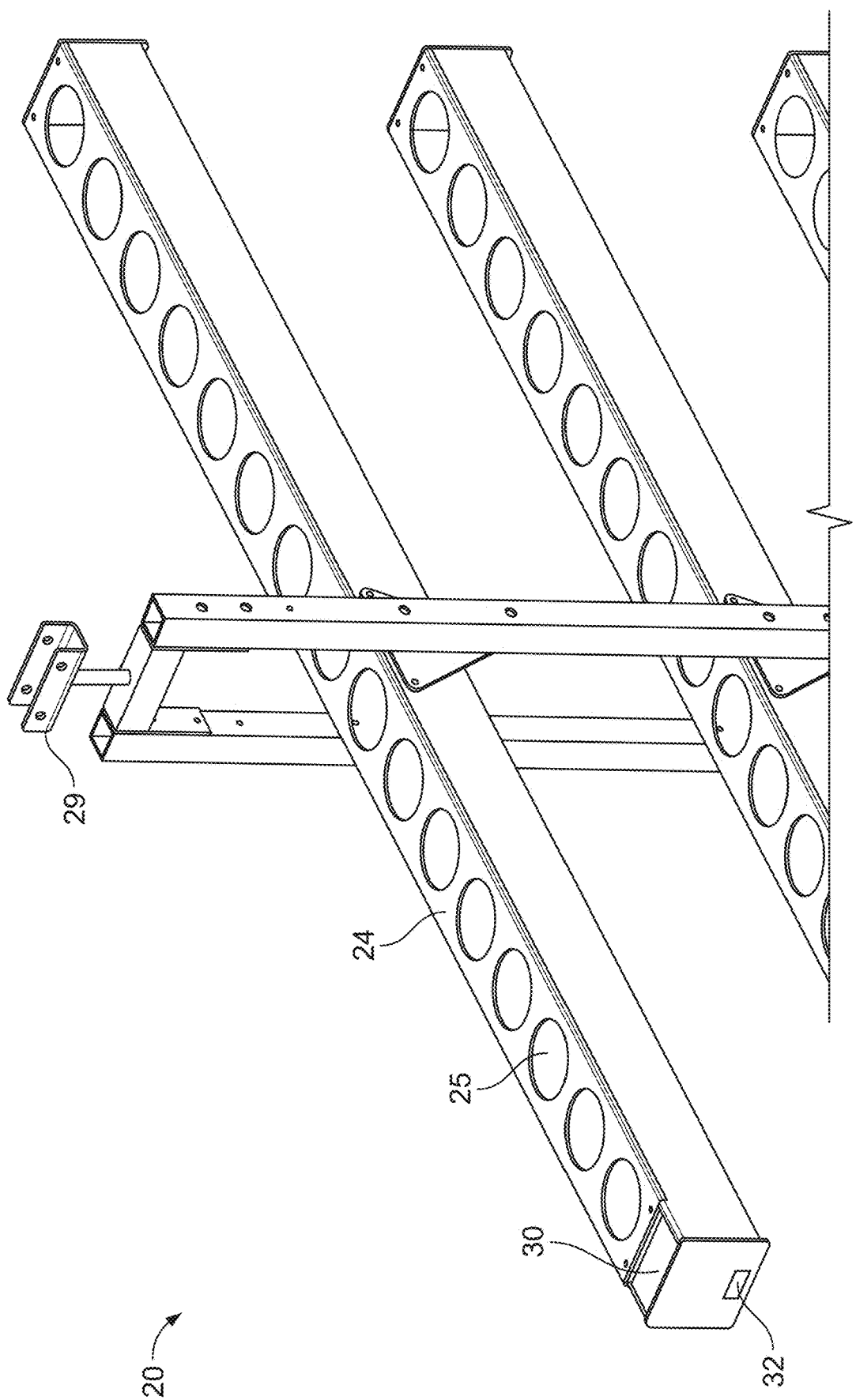
FIG. 4 is a perspective view of a portion of a rack according to an exemplary embodiment of the present invention.

FIGS. 2-4 show a rack 20 according to an exemplary embodiment of the present invention. The rack 20 includes a vertical central frame 22 that is attached to the conveyor system 40 and that holds a plurality of horizontally oriented gutters 24. Although the rack 20 is shown having eight gutters 24, it should be appreciated that each rack 20 may include any number of gutters 24, such as, for example, four, six, ten, twelve or more gutters 24. In exemplary embodiments, the rack 20 does not include any outer frame elements, and instead the rigidity of the overall structure allows the plant holders to be supported on the single vertical central frame 22. Alternatively, the rack 20 may include any number of vertical and/or horizontal elements, such as, for example, outer frame elements, to provide the rack 20 with sufficient support and strength. The gutters 24 are stacked and spaced vertically on top of one another on the central frame 22, with each gutter 24 attached to the central frame 22 at approximately the longitudinal center of the gutter 24 to optimize balance. The rack 20 may include mounts 31 that hold the gutters 24. Casters 23 may be disposed at the bottom of the central frame 22 to allow the rack 20 to move along a floor of the enclosure 10. The rack 20 may be made of, for example, aluminum, plastic or other types of rigid material. In exemplary embodiments, the rack 20 is made using any suitable construction technique, such as, for example, welding or 3D printing.

Figure 8:
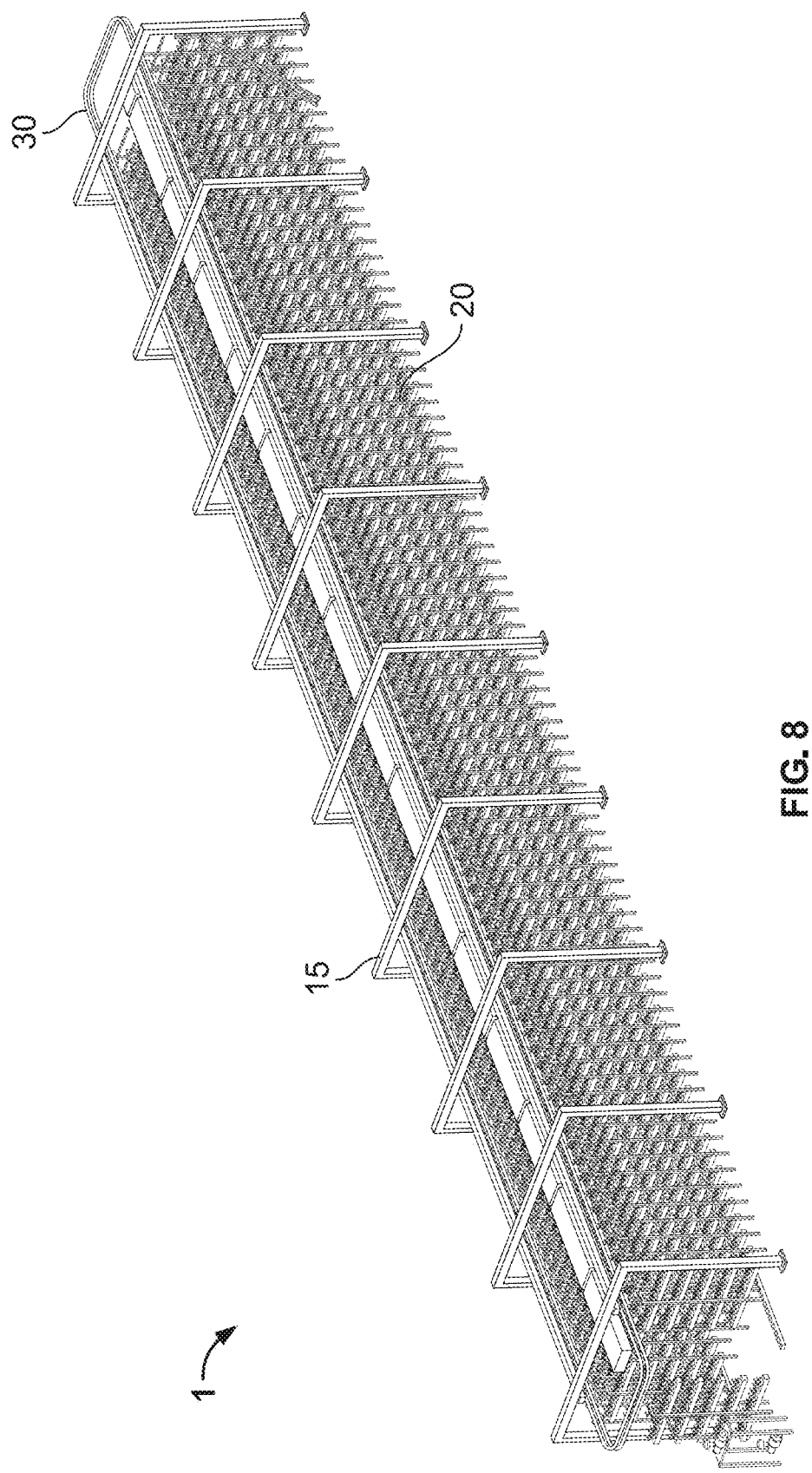
FIG. 8 is a perspective view of a vertical farm system according to an exemplary embodiment of the present invention.

FIG. 8 is a perspective view of the system 1 according to an exemplary embodiment of the present invention, showing the racks 20 moving on the conveyor system 30 through stationary scaffolding 15 that may hold, for example, a lighting system (including light fixtures) and irrigation system components. In the exemplary embodiment shown in FIG. 8, the night-time cycle portion and the day-time cycle portion of the enclosure 10 are arranged in-line with one another so that each rack 20 follows a loop with long sections that are half in the night-cycle portion and half in the day-cycle portion. However, as shown in FIG. 1, it should be appreciated that the night-time cycle portion and the day-time cycle portion of the enclosure 10 may be arranged side-by-side so that each rack 20 follows a loop with a long section that is entirely in the day-time cycle portion and another long section that is entirely in the night-time cycle portion. It should also be appreciated that the racks 20 may follow any other path within the enclosure 10 that allows for differences in lighting throughout a selected time period, with one or more sections of varying lengths.

Figure 9:
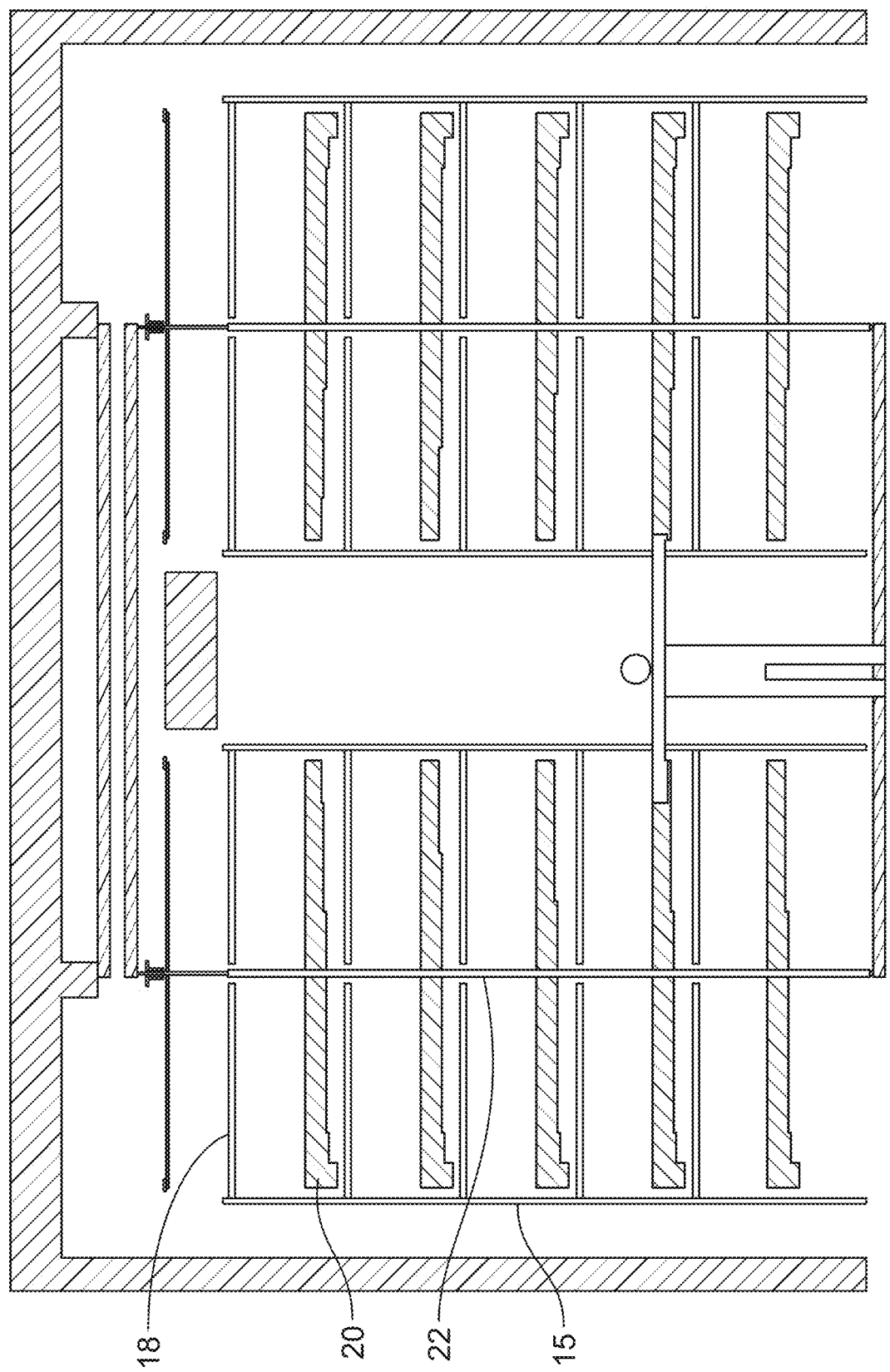
FIG. 9 is a cross-sectional view of a vertical farm system according to an exemplary embodiment of the present invention.
Figure 10:
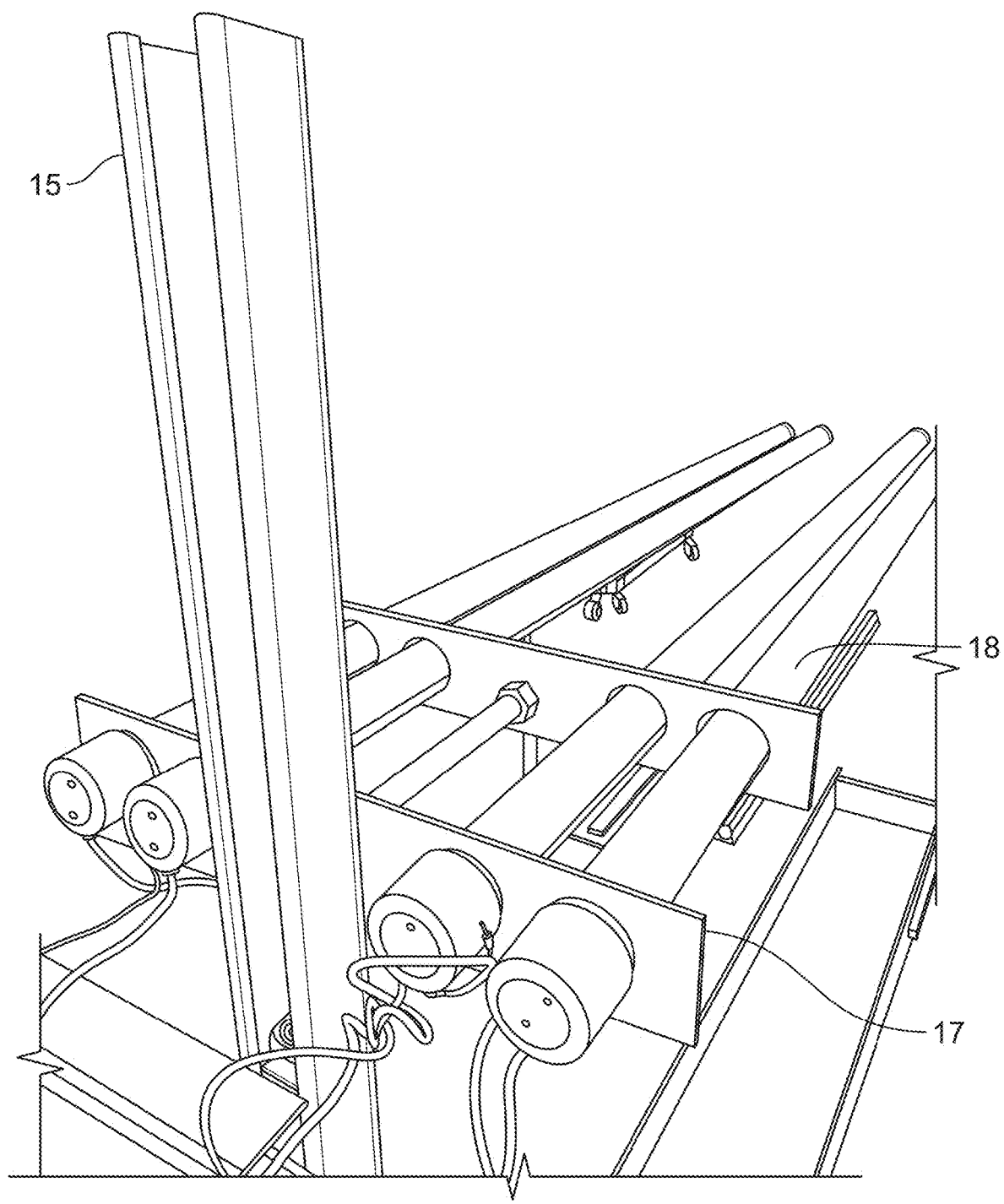
FIG. 10 is a perspective view showing a lighting system according to an exemplary embodiment of the present invention.

As shown more clearly in FIG. 9, the racks 20 are able to move freely between the scaffolding 15 and into alignment with the stationary irrigation stations 70 due to the cantilever structure of the scaffolding 15. In this regard, as shown in FIG. 10, the scaffolding 15 may include cross-pieces 17 that extend in the travel direction of the racks 20, and the cross-pieces 17 may have openings through which sets of light fixtures 18 may extend in a horizontal direction (and transverse to the travel direction of the racks 20). This allows the light fixtures 18 to be held in place in a cantilevered arrangement to allow the racks 20 to pass through the scaffolding without interference. For example, as shown in FIG. 9, the central frame 22 of each rack 20 may pass between cantilevered light fixtures 18 that extend in opposite directions from both sides of each scaffolding 15. In exemplary embodiments, the scaffolding 15 may hold a plurality of sets of light fixtures 18, with each set arranged at a specific height above a corresponding one of the gutters 24 of the rack 20. This arrangement allows all of the plants within each gutter 24 in each rack 20 to be exposed to an appropriate amount of light as the racks 20 traverse through the system 1. The light fixtures 18 are held stationary on the scaffolding 1 as the racks 20 pass through each scaffolding 15 on the conveyor system 40. This overall configuration is advantageous in that lighting components do not need to be moved around the enclosure 10 to simulate day-night cycles, which might otherwise require excessive wiring and cause accidents and/or result in damage to the lighting components or other components of the system 1. Another advantage of this configuration is that less control of the lighting components is required, since lighting components can simply be omitted from the night-time cycle portion of the enclosure 10 rather than needing to turn off or dim the lighting to simulate night time. Alternatively, or in additionally, lighting components may be provided in the night-time cycle portion of the enclosure 10 that provide less light compared to lighting components provided in the day-time cycle portion of the enclosure 10.

In exemplary embodiments, the light fixtures 18 may include light sources, such as, for example, incandescent, fluorescent, halogen, LED (light emitting diode), laser, or HID (high-intensity discharge) light sources, to name a few. The lighting system may include intensity controls and drivers so that the intensity of the light can be adjusted for different plant types and/or different parts of the growth cycle.

FIG. 3 is a more detailed view of the bottom of a rack 20 according to an exemplary embodiment of the present invention. The rack 20 includes a guide bar 21 to which is attached vertically oriented rollers 26, in turn to which are attached the casters 23. The guide bar 21 is fixed to the central frame 22 and extends generally parallel to the gutters 24. As explained in more detail below, the casters 23 and rollers 26 are spaced sufficiently apart from one another to allow the casters 23 and rollers 26 to traverse along the conveyor system 40, while the guide bar 21 provides the rack 20 with sufficient rigidity so that the rack 20 remains stable during movements within the conveyor system 40. In exemplary embodiments, the rack 20 may include bumpers 27 disposed on the guide bar 21 and/or at any other portion of the rack 20 to avoid damage to the rack 20 in case of contact with other racks 20 or any other object that might be in the path of the rack 20.

FIG. 4 is a more detailed view of the top of a rack 20 according to an exemplary embodiment of the present invention. A top mount assembly 29 is disposed at the top extremity of the rack 20, the purpose of which is to attach to the conveyor system 40, which may be an overhead conveyor. In this regard, the top mount assembly 29 may include a clamp, bracket or other structural component configured for attachment to the conveyor system 40. In exemplary embodiments, the top mount assembly 29 includes a swivel so that the rack 20 remains in the same orientation around turns.

As shown most clearly in FIGS. 3 and 4, each gutter 24 includes a series of plant holders 25 into which one or more plants and corresponding amounts of growing medium may be inserted. Although each gutter 24 is shown with sixteen plant holders 25, it should be appreciated that each gutter 24 may include any number of plant holders 25. Also, although the plant holders 25 are shown as being arranged in a single row, each gutter 24 may include any number of rows of plant holders 25, with any number of plant holders 25 in each row. Further, although the gutters 24 are shown as generally rectangular components, it should be appreciated that the gutters 24 may have any other shape, and the plant holders 25 may be arranged along any surface of the gutters 24. In exemplary embodiments, the plant holders 25 are openings formed in the gutters 24, where such openings may be circular in shape to accommodate circular plant pots or have any other suitable shape. In exemplary embodiments, the plant(s) in each plant holder 25 may or may not be held in pots. For example, plant(s) may be held directly in each plant holder 25 without corresponding plant pots. Further, in exemplary embodiments, the racks 20 may carry the plants in such a manner that the plant roots are exposed to allow for use of aeroponic cultivation systems, in which case the plant holders 25 may be omitted.

In exemplary embodiments of the present invention, each gutter 24 includes a top fill opening 30 and a side drain opening 32. As explained in more detail below, the top fill opening 30 allows an irrigation station 70 to fill each gutter 24 with irrigation fluid and the side drain opening 32 allows for the irrigation station 70 to drain the irrigation fluid. It should be appreciated that each gutter 24 may include one or more drains located at any other positions around the gutter 24, such as, for example, on the bottom of the gutter 24, or may not include any drains. In exemplary embodiments, irrigation fluid may be drained directly from the gutters 24 to the floor of the enclosure 10 through vertical supports.

Conveyor System

Figure 5:
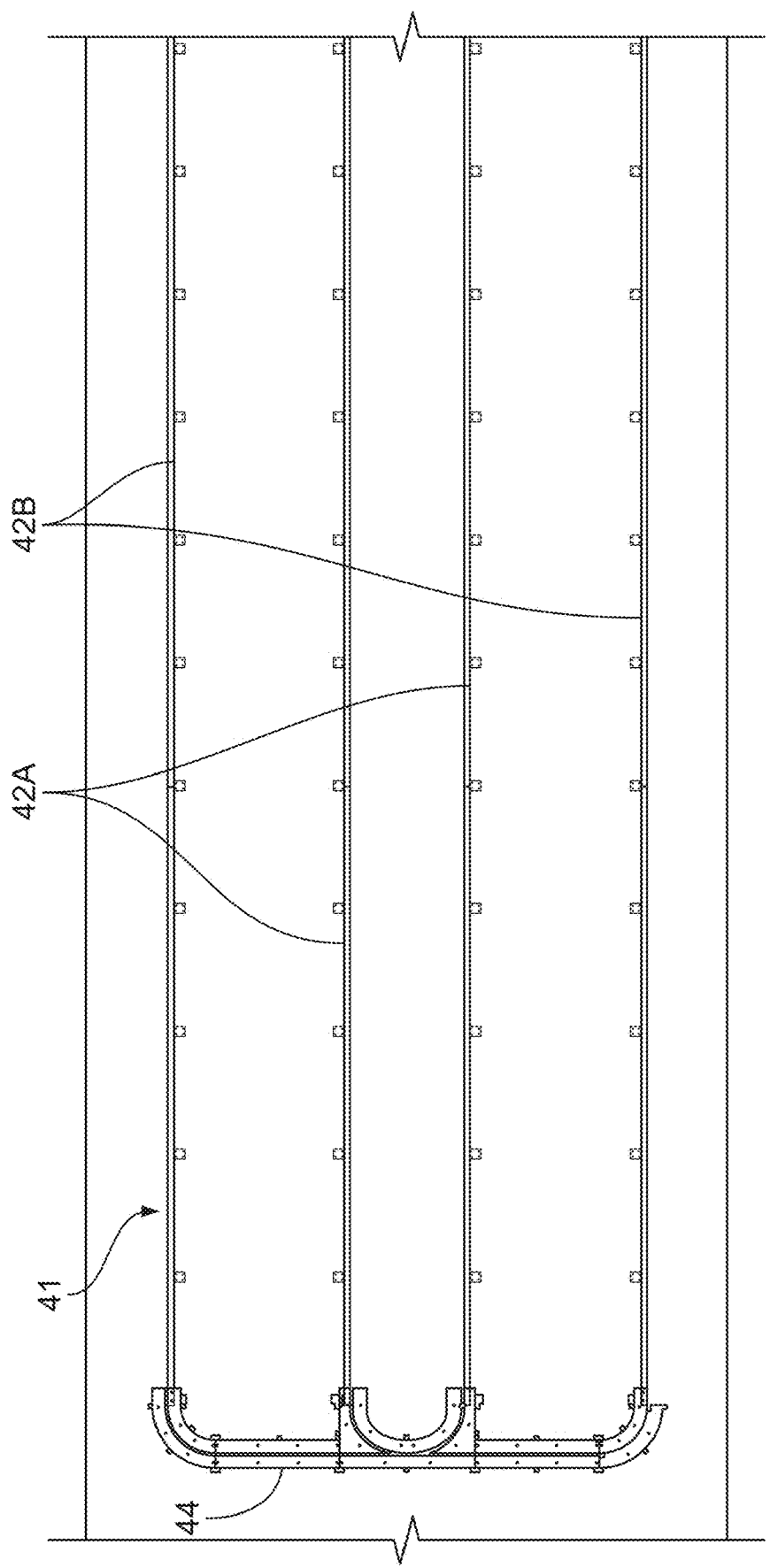
FIG. 5 is a top view of a conveyor system according to an exemplary embodiment of the present invention.
Figure 6:
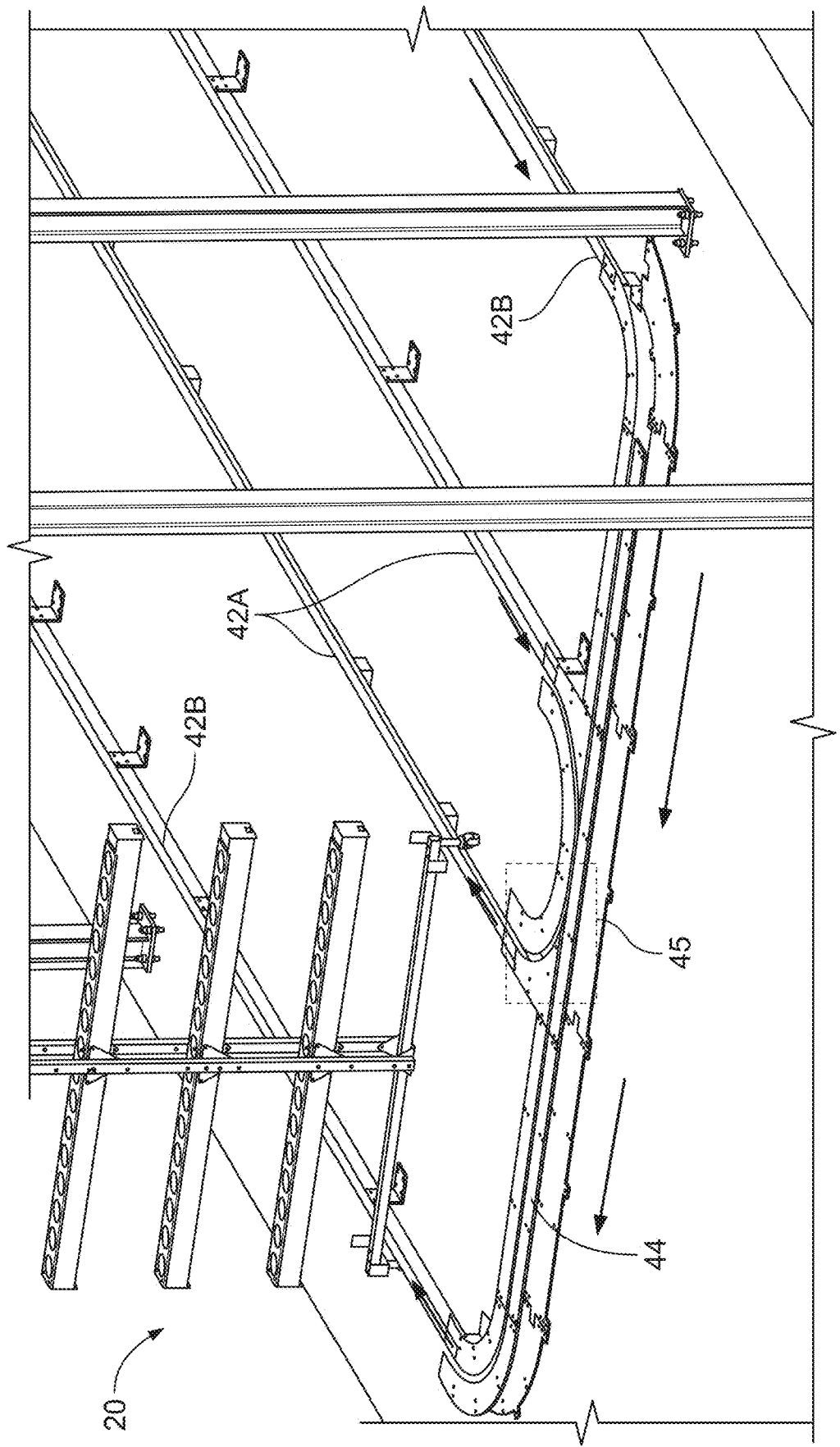
FIG. 6 is a perspective view showing a rack moving within a conveyor system according to an exemplary embodiment of the present invention.

FIGS. 5 and 6 show a bottom portion of a conveyor system 40 according to an exemplary embodiment of the present invention. The bottom portion of the conveyor system 40 includes a guide assembly 41 made up of internal guide rails 42A, external guide rails 42B and tracks 44 that guide the rollers 26 of the racks 20 so that the racks 20 follow a predetermined path within the enclosure 10. In this regard, the guide rails 42A, 42B generally guide the racks 20 along straight sections of the path, while the tracks 44 generally guide the racks 20 along curved sections of the path. For example, the tracks 44 may be located within the conveyor system 40 where the racks 20 are shifted to another section of the path, and in this regard may include one or more toggle switches 45. As shown in FIG. 6, each rack 20 may be conveyed so that each caster 23 of the rack 20 follows a respective one of the tracks 44 and the rack 20 is shifted into position to follow another section of the path while ensuring the racks 20 continue to face the same direction. In the exemplary embodiment shown in FIG. 6, as indicated by the arrows, one caster 23 of the rack 20 (in this case, the right caster 23) has been guided from an external guide rail 42B to internal guide rail 42A through a switcher 45, while the other caster 23 (in this case, the left caster 23) has been guided from an internal guide rail 42A to an external guide rail 42B. The rollers 26 are spaced so as to remain in contact with the guide rails 42A, 42B while the rack 20 is moved along the conveyor system 40. In exemplary embodiments, the casters 23 may or may not directly contact the floor of the enclosure 10 while the rack 20 is moving through the conveyor system 40. For example, the casters 23 may not contact the floor while the rack 20 is moving along the guide rails 42A, 42B, but make contact with the floor (or a bottom surface of the tracks 44) when the rack 20 is moving through the tracks 44. In this regard, the casters 23 provide added stability to the rack 20 while the rack 20 is being switched to the opposite direction.

Figure 7:
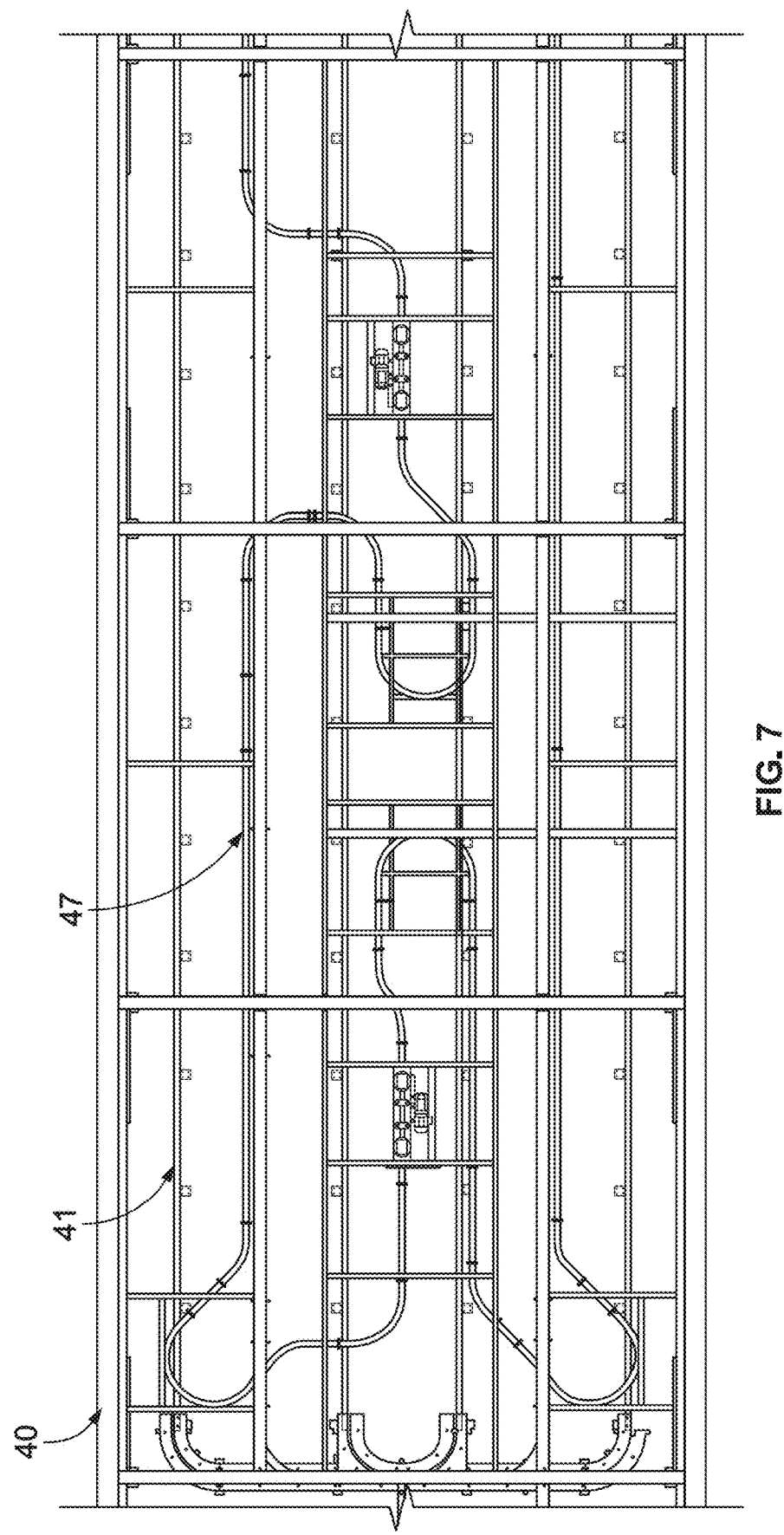
FIG. 7 is a top view of a conveyor system according to an exemplary embodiment of the present invention.

FIG. 7 is a top view of the conveyor system 40 according to an exemplary embodiment of the present invention. The conveyor system 40 includes a conveyor 47 that moves the racks 20 throughout the enclosure 10 and along the guide assembly 41. The conveyor 47 may be an overhead conveyor, such as, for example, a powered overhead conveyor, a synchronous powered overhead conveyor, an asynchronous powered overhead conveyor (such as, for example, a power and free conveyor), an open track overhead conveyor, or a closed track overhead conveyor, to name a few. In exemplary embodiments, it should be appreciated that the conveyor system 40 is not limited to an overhead conveyor, and other exemplary embodiments may involve conveyors that drive the racks 20 from the bottom, from the bottom and top, or from any other point on the racks 20. Further, it should be appreciated that the conveyor system 40 is not limited to the extent that the racks 20 are moved individually, and in other exemplary embodiments the racks 20 may be linked together and conveyed as a single unit. In exemplary embodiments, the conveyor 47 may include components, such as, for example, one or more chains, one or more trolleys, one or more brackets, one or more drive units, one or more take-up units, and one or more electrical control units, to name a few. Suitable conveyors are available from, for example, Rapid Industries (Louisville, Kentucky, USA), Ultimation Industries, LLC (Roseville, Michigan, USA), Daifuku (Osaka, Japan), and Richards-Wilcox Conveyor (Aurora, Illinois, USA), to name a few.

Irrigation System

Figure 11:
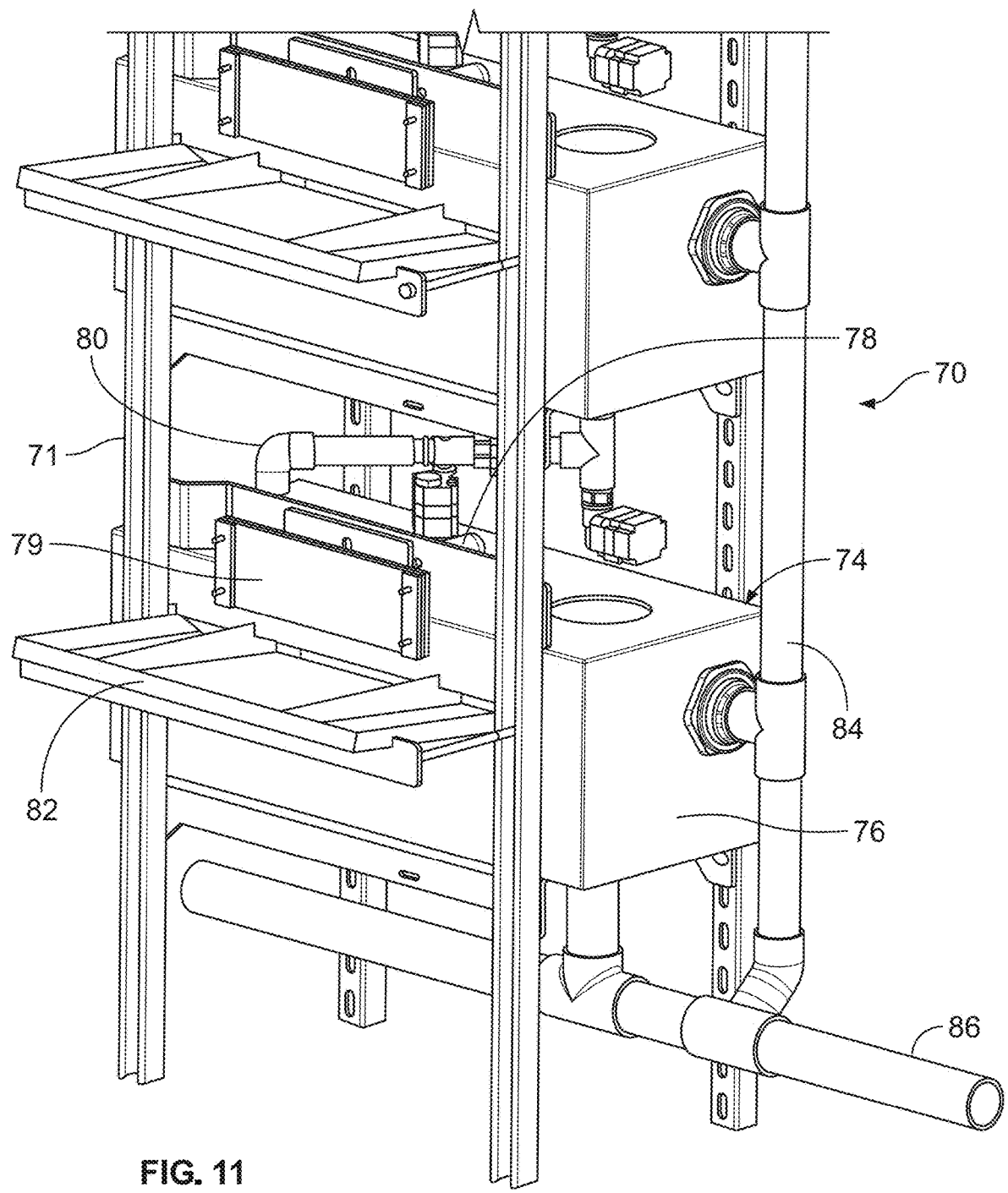
FIG. 11 is a perspective view showing a portion of an irrigation system according to an exemplary embodiment of the present invention.

FIG. 11 is a partial view of an irrigation station, generally designated by reference number 70, according to an exemplary embodiment of the present invention. Any number of irrigation stations 70 may be placed within the enclosure 10, and in exemplary embodiments the number of irrigation stations 70 may be within the range of five to fifteen, or less or more than this range. The irrigation station 70 includes a support structure 71 that holds a plurality of irrigation sub-assemblies 74. Each irrigation sub-assembly 74 includes a tank 76, a piston assembly 78, a stopper 79, a spigot assembly 80, and a drain tray 82. An overflow pipe 84 is in fluid connection with each of the tanks 76, and a bottom end of the overflow pipe 84 is in fluid connection with main drainpipe 86. Each irrigation sub-assembly 74 is arranged at a corresponding height so that as a rack 20 is moved into position next to the irrigation station 70, each gutter 24 of the rack 20 is aligned with a corresponding one of the irrigation sub-assemblies 74. As explained in more detail below, this allows for filling of each gutter 24 in the rack 20 with irrigation fluid and subsequent draining of the irrigation fluid from each gutter 24 before the rack 20 is moved downstream.

Figure 12:
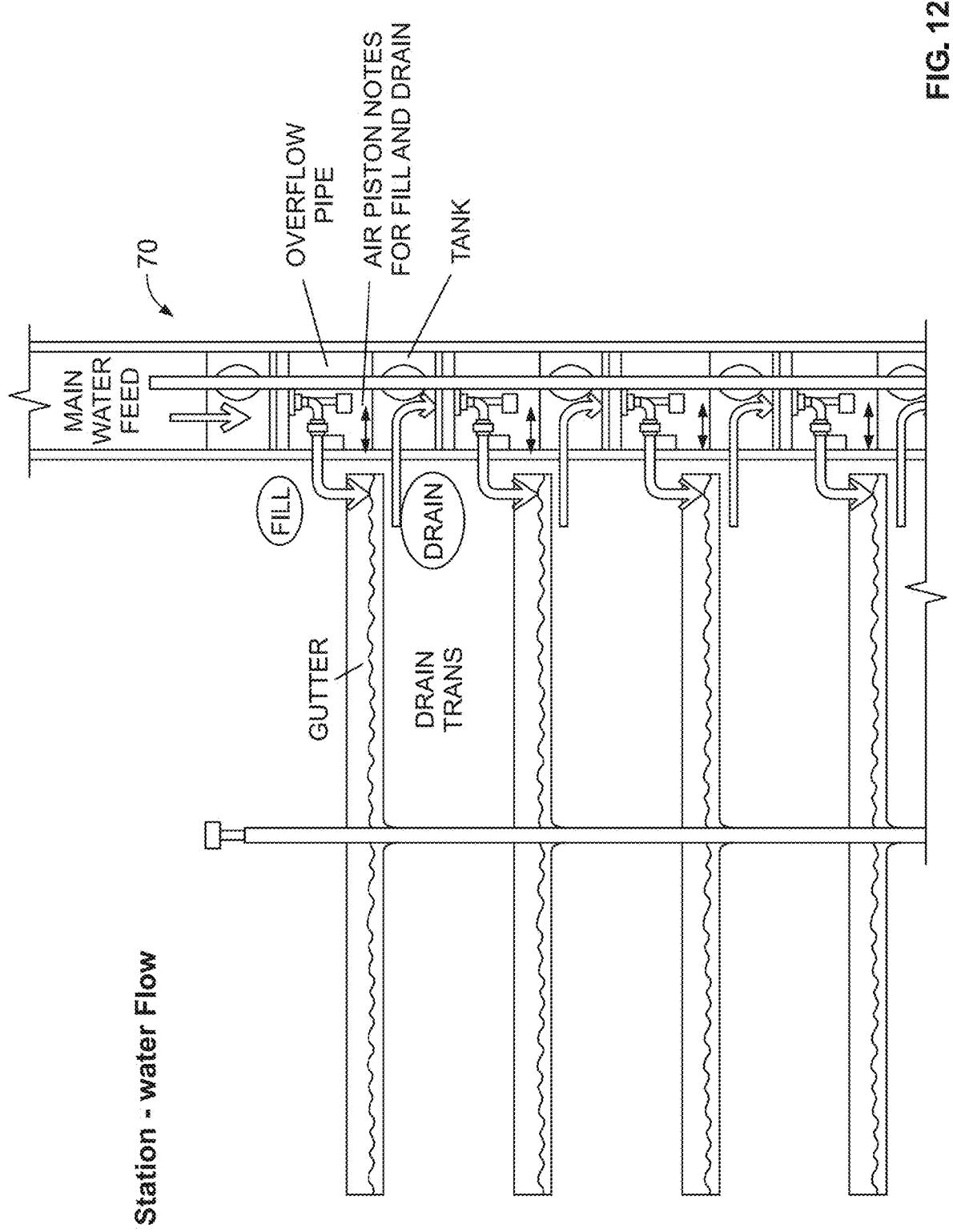
FIG. 12 is a block diagram showing a portion of an irrigation system according to an exemplary embodiment of the present invention.

FIG. 12 shows flow of the irrigation fluid during filling and draining of the gutters 24 by the irrigation station 70. Irrigation fluid is introduced to the irrigation station 70 from a main irrigation fluid feed at the top irrigation sub-assembly 74 where it enters and begins to fill the corresponding tank 76. When the filling process begins, the piston assembly 78 moves the stopper 79 into engagement with the side wall of the gutter 24, thereby blocking the side drain opening 32 of the topmost gutter 24. Irrigation fluid is then fed from the tank 76 of the topmost irrigation sub-assembly 74 to the corresponding spigot assembly 80, which in turn feeds the irrigation fluid into the gutter 24 through the top fill opening 30. The draining process may commence after a predetermined period of time during which the plants within the gutter 24 are adequately soaked. The soaking period may be any suitable period of time, such as, for example, 30 seconds, one minute, or two minutes, to name a few.

During the draining process, the piston assembly 78 moves the stopper 79 away from the side drain opening 32, thereby allowing the irrigation fluid from the top gutter 24 to drain onto the drain tray 82 of the top gutter 24. The drain tray 82 guides the drained irrigation fluid from the topmost gutter 24 into the tank 76 of the next irrigation sub-assembly 74 just below the topmost irrigation sub-assembly. The next irrigation sub-assembly 74 can then perform the same filling and draining process for the gutter 24 just below the topmost gutter 24 using the associated piston assembly 78, stopper 79 and spigot assembly 80. The irrigation process then continues downward until the bottom most gutter has been irrigated and drained, with any overflow irrigation fluid within the tank being drained into the overflow pipe 84 and into the main drainpipe 86. The main drainpipe 86 may be connected to other irrigation stations 70 throughout the enclosure 10 so that the irrigation fluid from each irrigation station 70 can re-circulate to the main irrigation fluid feed. In this regard, the main drainpipe 86 may be connected to a main tank (not shown) that holds irrigation fluid to be supplied to the main irrigation fluid feed at the top of each irrigation station 70.

It should be appreciated that irrigation station 70 is not limited to the description provided above, and in other exemplary embodiments, each tank 76 of each irrigation sub-assembly 74 may be supplied separately with irrigation fluid rather than each sub-assembly 74 relying on the irrigation fluid being drained from the gutter 24 just above it, in which case irrigation fluid may be drained directly from the gutters 24 into a main drain pipe, for example. In another exemplary embodiment, each sub-assembly 74 may not have a corresponding tank 76 but instead may have a supply-drain line through which irrigation fluid is delivered to the top of the corresponding gutter 24 and then through which the irrigation fluid is pumped out of the gutter 24.

FIGS. 13A and 13B show a gutter 1024 according to another exemplary embodiment of the present invention. The gutter 1024 includes a bottom 1027, sides 1028 and a top 1029. The top 1029 includes a plurality of openings 1030 configured to hold potted or unpotted plants. The height of the gutter 1024 varies from a maximum at a proximal end of the gutter 1024 to a minimum height at a distal end. The gutter 1024 may include a pocket 1025 at the proximal end of the gutter 1024, which as described in more detail below, assists in the irrigation process.

During the irrigation process, an irrigation feed point 70 made up of a spigot 72 fills the gutter 1024 with irrigation fluid and then once filled, sucks the fluid out of the gutter 1024. In this regard, the spigot 72 is automatically controlled to move into position into the gutter 1024 for filling, and then the same spigot 72 or a separate suction line (not shown) may be used to remove the fluid. The spigot 72 may be placed in position over the pocket 1034 to allow for more efficient filling of the gutter 1024 while avoiding overspill.

Figure 14:
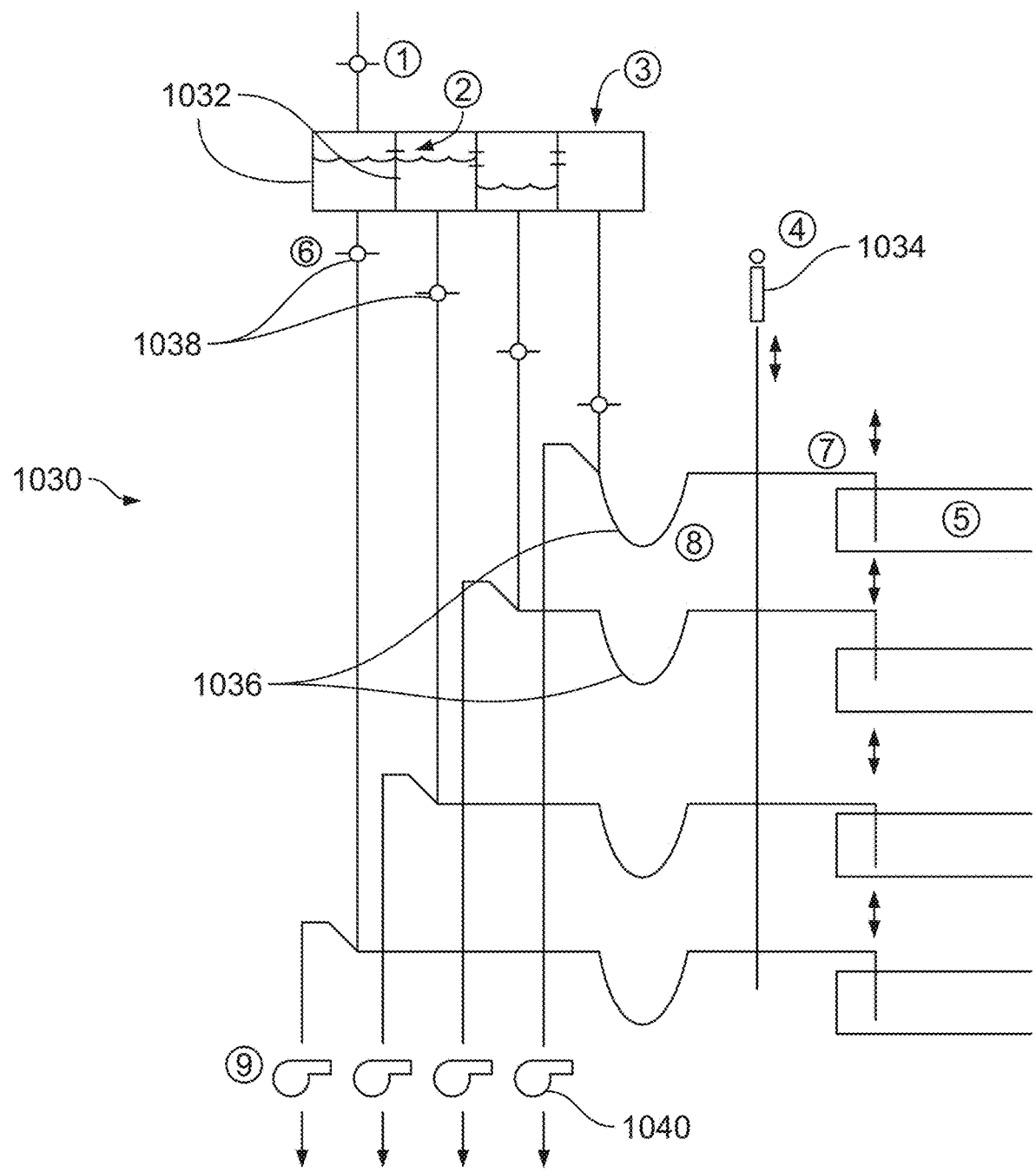
FIG. 14 is a block diagram of an irrigation system according to an exemplary embodiment of the present invention.

FIG. 14 shows an irrigation system, generally designated by reference number 1030, according to an exemplary embodiment that may be used with the gutter 1024. The irrigation system 1030 includes tanks 1032, which may be located within or above the enclosure 10. During the irrigation process, irrigation fluid is pre-filled into the tanks 1032. Filling of the tanks 1032 may begin at the left-most tank 1032 through a valve, such as, for example, a ball valve or solenoid, and overflow into the tanks 1032 to the right. Each tank 1032 may include a water level sensor that detects when each tank 1032 has been filled to the appropriate volume of water. A lifting mechanism 1034, such as, for example, a pneumatic cylinder may then be controlled to lower the spigots 72 into the gutters. Flex hoses 1036 may be used to allow the spigots 72 to lift and lower relative to stationary plumbing. Ball valves 1038 from each tank 1032 may then open to allow irrigation fluid to flow from the tanks 1032 to the gutters 1024. After the gutters 1024 are soaked for a predetermined amount of time, the ball valves 1038 close and self-priming pumps 1040 may be turned on to pump the irrigation fluid from the gutters 1024. A "Y" PVC fitting may be used to ensure irrigation fluid naturally flows to the gutters 1024 and not the pump during the fill sequence. After pumping is complete, the lifting mechanism 1034 is controlled to lift the spigots 72 from the gutters 1024. An ultrasonic or other type of level sensor may be mounted to the end of the spigots 72 to detect if the fill and drain sequences are successful. In exemplary embodiments, low- and high-level sensors can be added to the tanks 1032 to ensure proper operation and/or overflow piping may be used to ensure volume of fluid in each tank does not exceed a predetermined amount (where "predetermined amount" may refer to a desired amount of fluid sent to the gutter when the valve opens). Also, in exemplary embodiments, the lifting mechanism 1034 may use proximity sensors to ensure proper movement.

Figure 15:
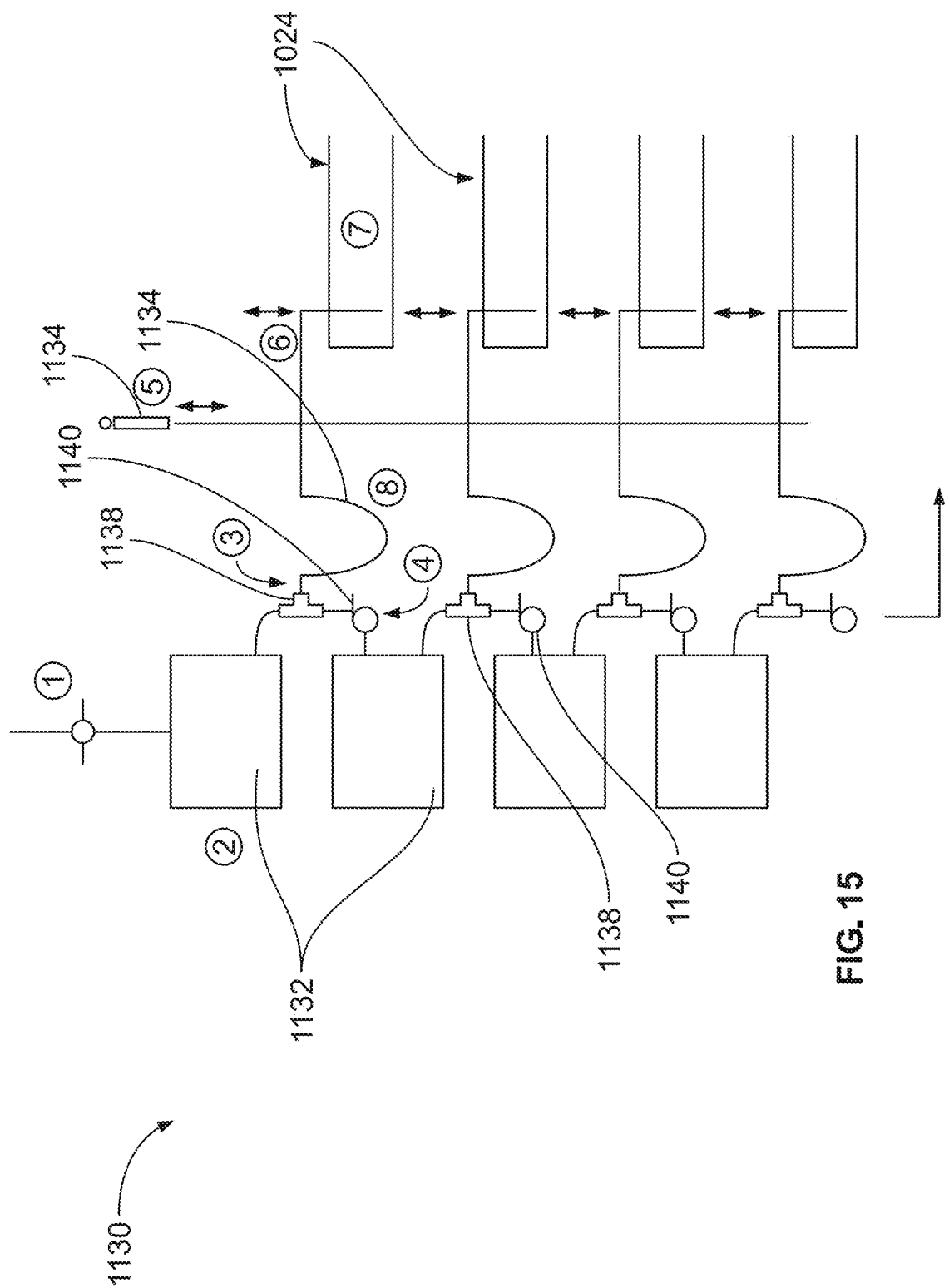
FIG. 15 is a block diagram of an irrigation system according to an exemplary embodiment of the present invention.

FIG. 15 shows an irrigation system, generally designated by reference number 1130, according to another exemplary embodiment that may be used with the gutter 1024. The irrigation system 1130 includes tanks 1132. Filling of the tanks 1132 may begin at the topmost tank 1132 through a valve, such as, for example, a ball valve or solenoid, and overflow into the tanks 1132 below. Each tank 1132 may include a water level sensor that detects when each tank 1132 has been filled to the appropriate volume of fluid. During a fill sequence, three-way valves 1138, which may be motorized ball valves, are actuated to allow flow of irrigation fluid from the tanks 1138 into the gutters 1024. After soak time, the three-way valves 1138 are reversed to connect pumps 1140 to the gutters 1024. Each pump 1140 is turned on to pull irrigation fluid from the respective gutter 1024 and into the tank 1138 just below the pump 1140. A lifting mechanism 1134, such as, for example, a pneumatic cylinder may be controlled to lower and raise the spigots 72 relative to the gutters. Flex hoses 1136 may be used to allow the spigots 72 to lift and lower relative to stationary plumbing. Lifting of the spigots 72 allows the racks to index without interference, while lowering allows the flood and drain sequence to begin. An ultrasonic or other type of level sensor may be mounted to the end of the spigots 72 to detect if the fill and drain sequences are successful. In exemplary embodiments, low- and high-fluid level sensors can be added to the tanks 1132 to ensure proper operation. Also, in exemplary embodiments, the lifting mechanism 1134 may use proximity sensors to ensure proper movement.

In exemplary embodiments, drip irrigation techniques may be used to deliver water directly to individual pots. Normally, pressurized lines and flow controlling emitters are used to balance the amount of water delivered to each plant. In moving plant systems, however, it is often difficult to pressurize irrigation systems. For these types of systems, using gravity to move water is more practical.

Figure 16A:
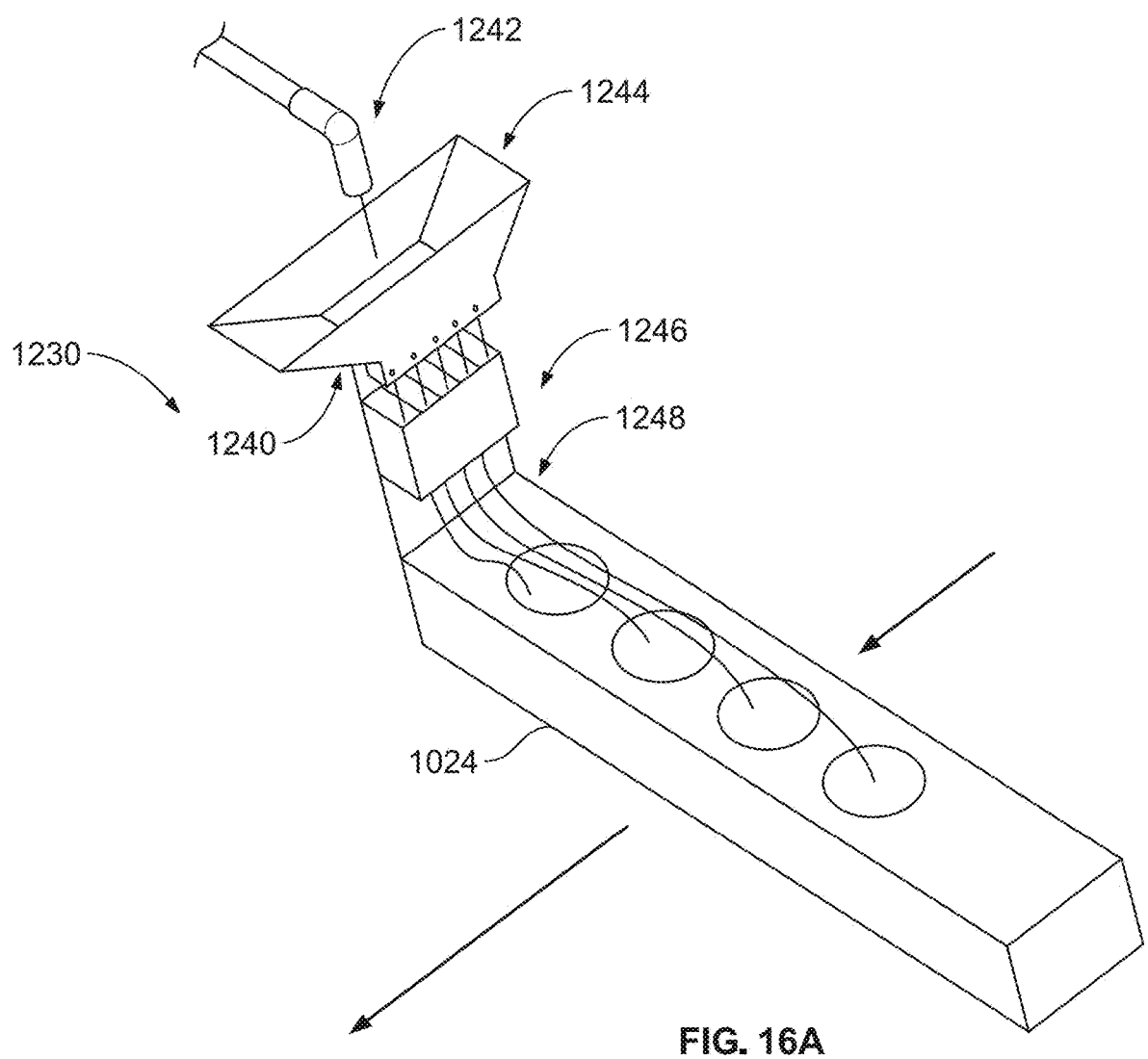
FIGS. 16A and 16B show an irrigation system according to an exemplary embodiment of the present invention.
Figure 16B:
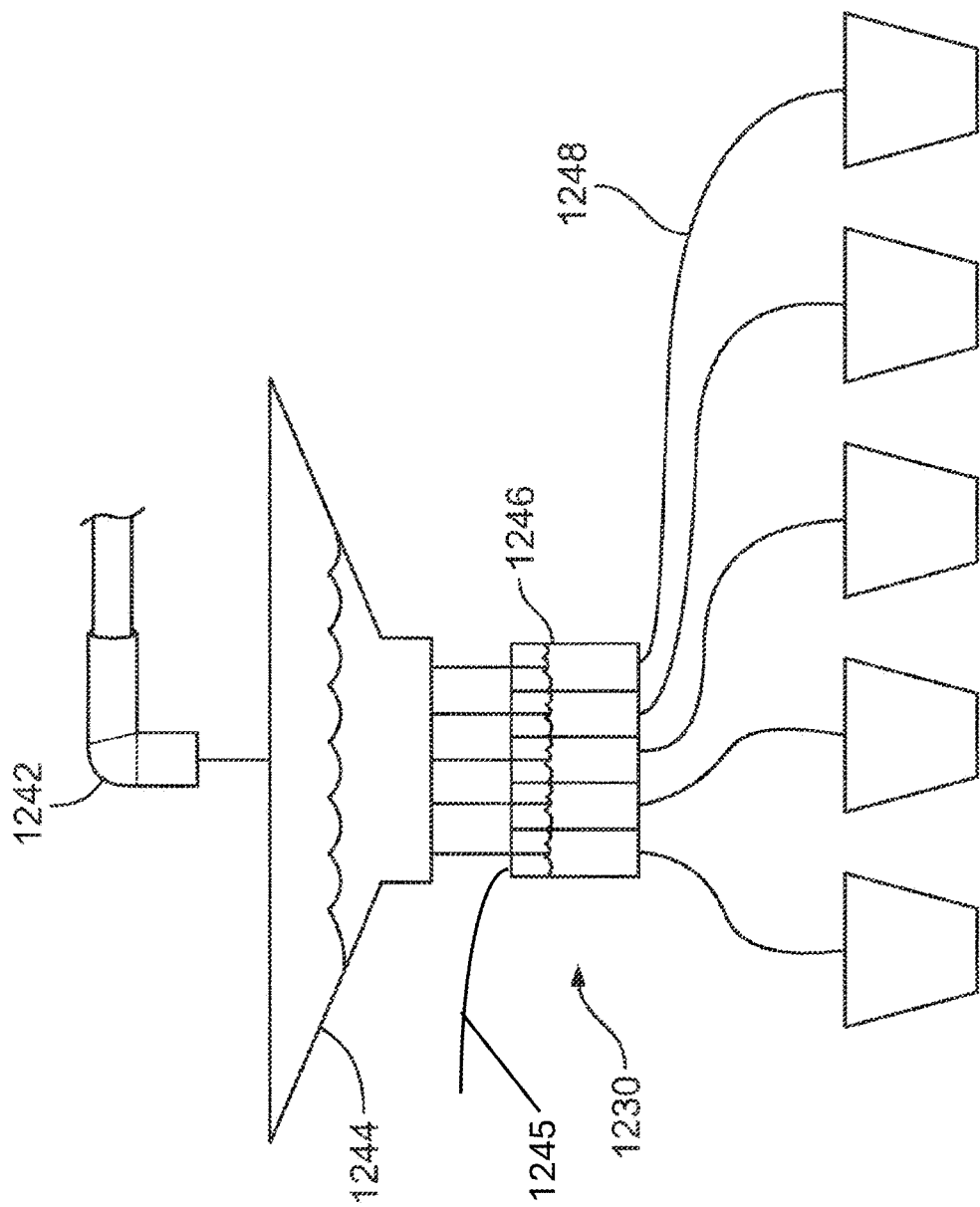

FIGS. 16A and 16B show a drip irrigation system, generally designated by reference number 1230, according to an exemplary embodiment of the present invention. The system 1230 provides a mechanism for delivering substantially equal volumes of water to pots with limited head height. Specifically, the system 1230 includes sub-assemblies 1240 (only one sub-assembly is shown in FIGS. 16A and 16B), with each sub-assembly 1240 associated with a corresponding gutter 1024. The sub-assembly 1240 includes a stationary spigot 1242, a funnel 1244, a plurality of reservoirs 1246, and a plurality of tubes 1248 each connected to a corresponding one of the plurality of reservoirs 1248. The spigot 1242 supplies a volume of irrigation fluid to the funnel 1244. The total volume of delivered irrigation fluid is enough to irrigate a total number X of plants held by the gutter 1024 at one time. The funnel 1244 has X number of openings at a base of the funnel 1244. When irrigation fluid is added the funnel 1244, the funnel openings split the fluid into X small streams. In this regard, the funnel 1244 gets narrower near the openings, thereby allowing a small amount of fluid to create consistent head height over the openings. This results in X number of streams with similar flow rates. Each stream from the funnel 1244 is captured in a corresponding one of the plurality of reservoirs 1246. Each tube 1248 is connected to a base of a corresponding one of the plurality of reservoirs 1248 and routed to a corresponding one of the individual pots, thereby delivering fluid to the pot. If the tubes 1248 were connected directly to the funnel, without the intermediary reservoirs 1246, differences in tube resistance and elevations would result in uneven distribution of the water. The reservoirs 1246 act as a buffer allowing the pre-partitioned amount of water to flow to an individual pot at whatever rate allowed by the tubing 1248. Overflow channels 1245 can be added to the reservoirs 1248 to detect if an individual tube 1248 gets clogged.

It should be appreciated that various sensors and control modules may be used in the irrigation systems according to exemplary embodiments of the present invention to carry out delivery of irrigation fluid to the plants within the enclosure 10 in a controlled manner. For example, sensors may be used to sense flow, level and other parameters associated with the irrigation fluid, as well as operating state of components of the irrigation system, and information obtained by the sensors may be used by control modules to operate the various components of the irrigation system according to exemplary embodiments of the present invention. Accordingly, in exemplary embodiments of the present invention, the irrigation system may be partially or fully automated.

Environmental Control System

Figure 17:
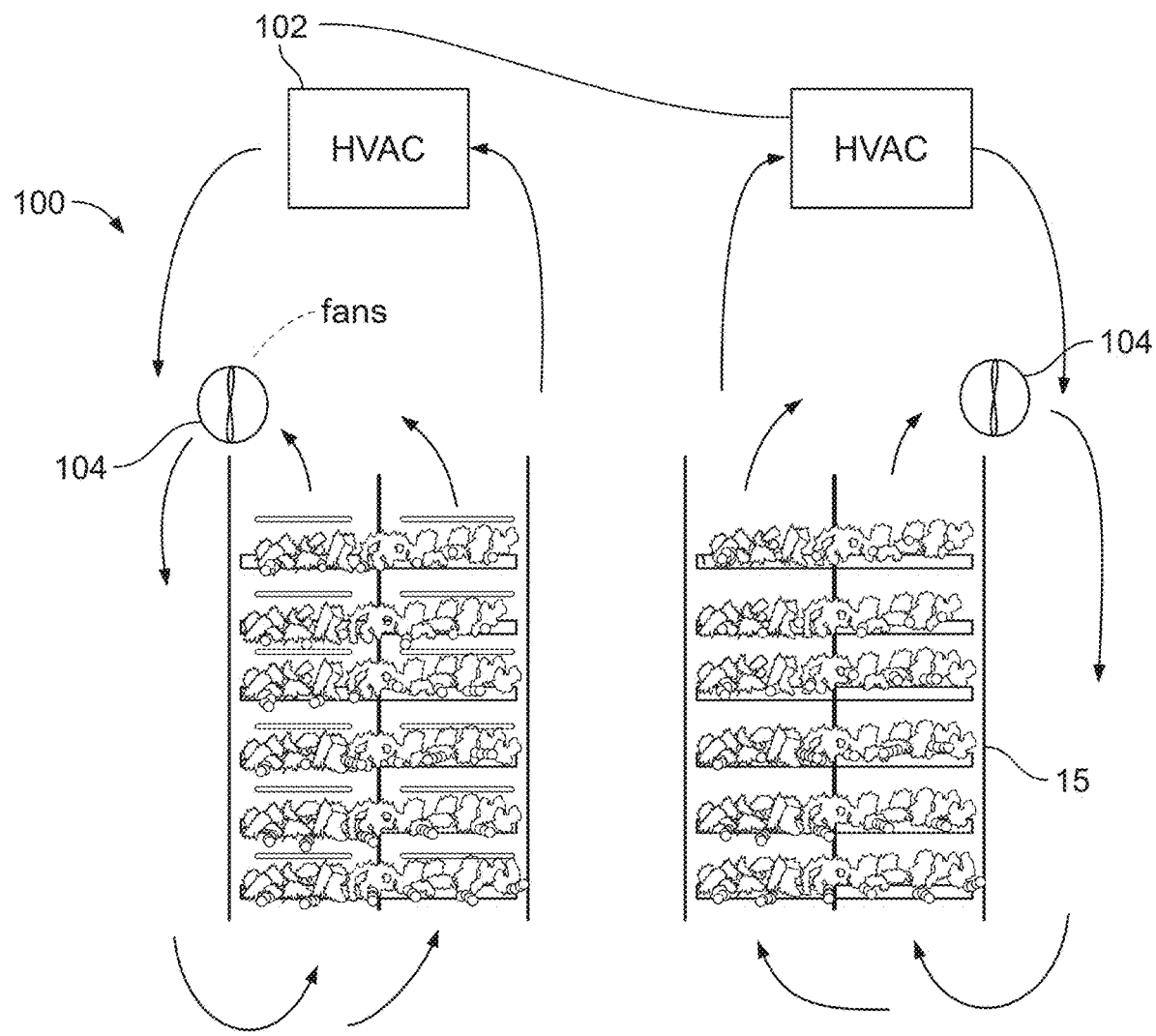
FIG. 17 is a block diagram of an environmental control system according to an exemplary embodiment of the present invention.

In exemplary embodiments, the system 1 further includes an environmental control system configured to maintain the target profiles (including but not limited to air temperature, relative humidity, air velocity, air particulate count, and carbon dioxide concentration) within the enclosure 10. For example, the environmental control system may control the air temperature and/or other parameters within the enclosure 10 to vary through a 24-hour period (or any other predetermined photoperiod) to simulate morning, day and evening temperatures that optimize growth of the crop. FIG. 17 shows components of the environmental control system, generally designated by reference number 100, according to an exemplary embodiment of the present invention. The temperature control system 100 includes one or more HVAC units 102 and one or more air circulation units 104 disposed within the enclosure 10. The former primarily provides controls to air temperature and relative humidity while the latter focuses on air velocity. The HVAC units 102 may be located on the ceiling of or within the enclosure 10, with each HVAC unit 102 primarily located within a corresponding day/night half of the enclosure 10. The air circulation units 104, which may include circulation fans, may be disposed on the scaffolding 15 at points throughout the enclosure 10 to circulate the environmentally conditioned air generated by the HVAC units 102. This separation of air flow and HVAC units allows for enhanced airflow through the enclosure 10 while minimizing environmental variance, which in turn allows for minimization of energy consumption, reduced equipment sizing, and less restriction on the height of the overall system 1.

Figure 18:
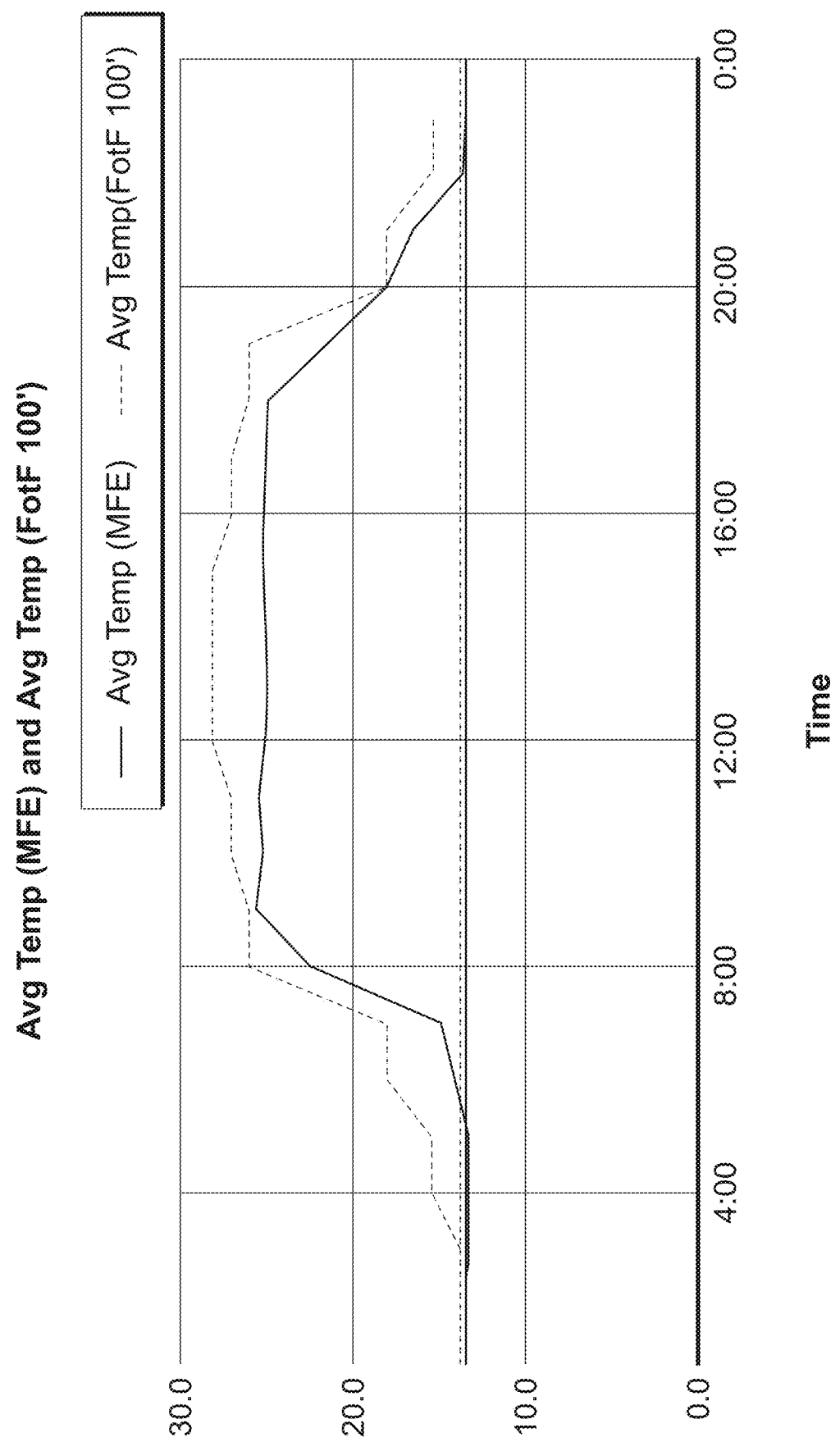
FIG. 18 is a chart showing average temperature changing over time within a vertical farm system according to an exemplary embodiment of the present invention.

In exemplary embodiments, the environmental control system 100 varies the air temperature, relative humidity, and air velocity within the enclosure so that, as each rack travels around the enclosure 100 between the day and night halves, the rack 20 encounters a temperature, humidity and velocity variation profile that simulates day-night environmental conditions. Said environmental variation may occur over a 24-hour period or some other predetermined period of time. For example, as shown in FIG. 18, each rack 20 may proceed through an environmental variation profile within the predetermined time period with a minimum temperature range of 8° C. to 10° C. at greater than 85% relative humidity and a maximum temperature range of 25° C. to 30° C. with relative humidity between 60-80%. It should be appreciated that the present invention is not limited to these temperature or relative humidity ranges, and in other exemplary embodiments, the environmental conditions may be higher or lower than these ranges. For example, the minimum temperature range may be lower than 8° C. to 10° C. and the maximum temperature range may be higher than 25° C. to 30° C. Further, in exemplary embodiments, the humidity during the day may be controlled to be in the range of 60% to 80% relative humidity and the humidity during the night may be controlled to be in the range of 75% to 95% relative humidity. In this regard, the HVAC units 102 may be controlled using feedback from sensors, such as, for example, air temperature sensors, humidity sensors, wind speed sensors and $CO_2$ sensors, to name a few, located at various points within the enclosure 10, either installed in fixed locations and/or which are fixed to the racks 20 so that the sensors can measure the full plant environment as the racks 20 move through the enclosure 10. In a more specific example, each rack 20 encounters the minimum temperature of the temperature variation profile within the night half of the enclosure 10 and encounters the maximum temperature within the day half of the enclosure. The temperature and other environmental parameters may be controlled to gradually change to appropriate day ranges as the rack 20 makes its way into and through the day half and gradually change to appropriate night ranges as the rack 20 makes its way out of the day half and into the night half. The environmental conditions may be selected based on a number of factors, such as, for example, the type of crop, desired time to harvest, and energy efficiency, to name a few.

Figure 19:
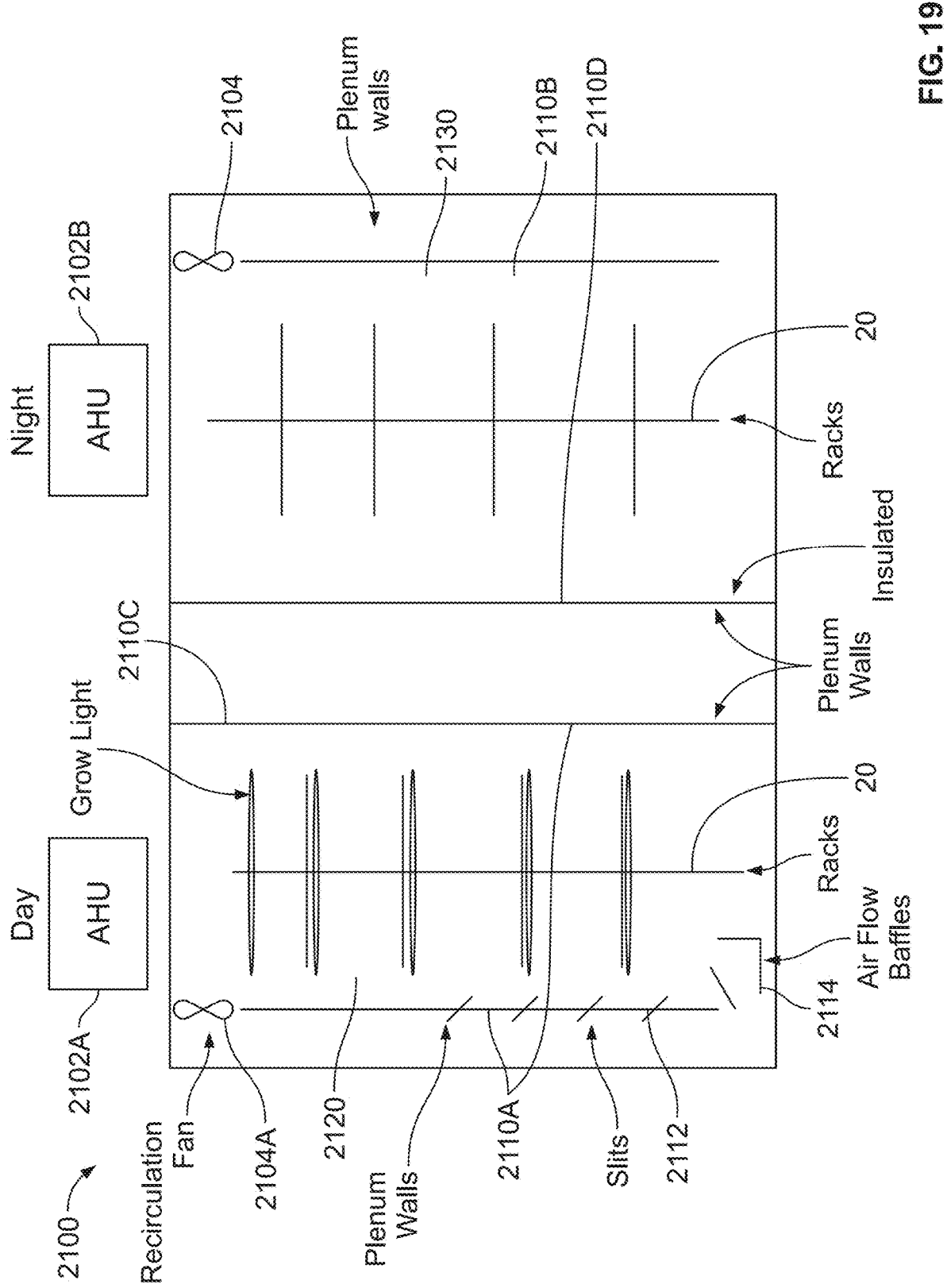
FIG. 19 is a block diagram of an environmental control system according to an exemplary embodiment of the present invention.

FIG. 19 shows an environmental control system, generally designated by reference number 2100, according to an exemplary embodiment of the present invention. The environmental control system 2100 includes plenum areas within the enclosure 10 that facilitate air circulation. The plenum areas may include plenum walls 2110A, 2110B that separate the plenum areas from other areas of the enclosure 10. In this regard, the plenum walls 2110A, 2110B may be made of insulative material, such as, for example, plastic sheeting, fabric, metal panels or any other suitable material. Some or all of the plenum walls 2110A, 2110B may include slits or other openings to allow for conditioned air to circulate between the plenum areas and the other areas of the enclosure.

As described previously, the environmental control system 2100 includes one or more HVAC units 2102A, 2102B and one or more air circulation units 2104A, 2104B disposed within the enclosure 10. The HVAC units 2102A, 2102B may be located at the upper portion of the enclosure 10, such as, for example, on the ceiling, with each HVAC unit 2102A, 2102B primarily located within a corresponding day/night half of the enclosure 10. The air circulation units 2104A, 2104B may be disposed on the scaffolding 15 at points throughout the enclosure 10 to circulate the environmentally conditioned air generated by the HVAC units 2102A, 2102B. As shown in FIG. 19, the plenum walls 2110A, 2110B may be arranged so as to separate the enclosure 10 into the day/night portions. For example, the plenum wall 2110A may be arranged closest to a side wall of the enclosure and another plenum wall 2110B may be arranged closest to an opposite side wall of the enclosure, with two other plenum walls 2110C, 2110D arranged between the two side plenum walls 2110A, 2110B, thereby forming a day portion 2120 at one side of the enclosure 10 and a night portion 2130 on the opposite side of the enclosure 10. One or more air flow baffles 2114 may be arranged throughout the system 2100 to direct air flow in appropriate directions.

Figure 20:
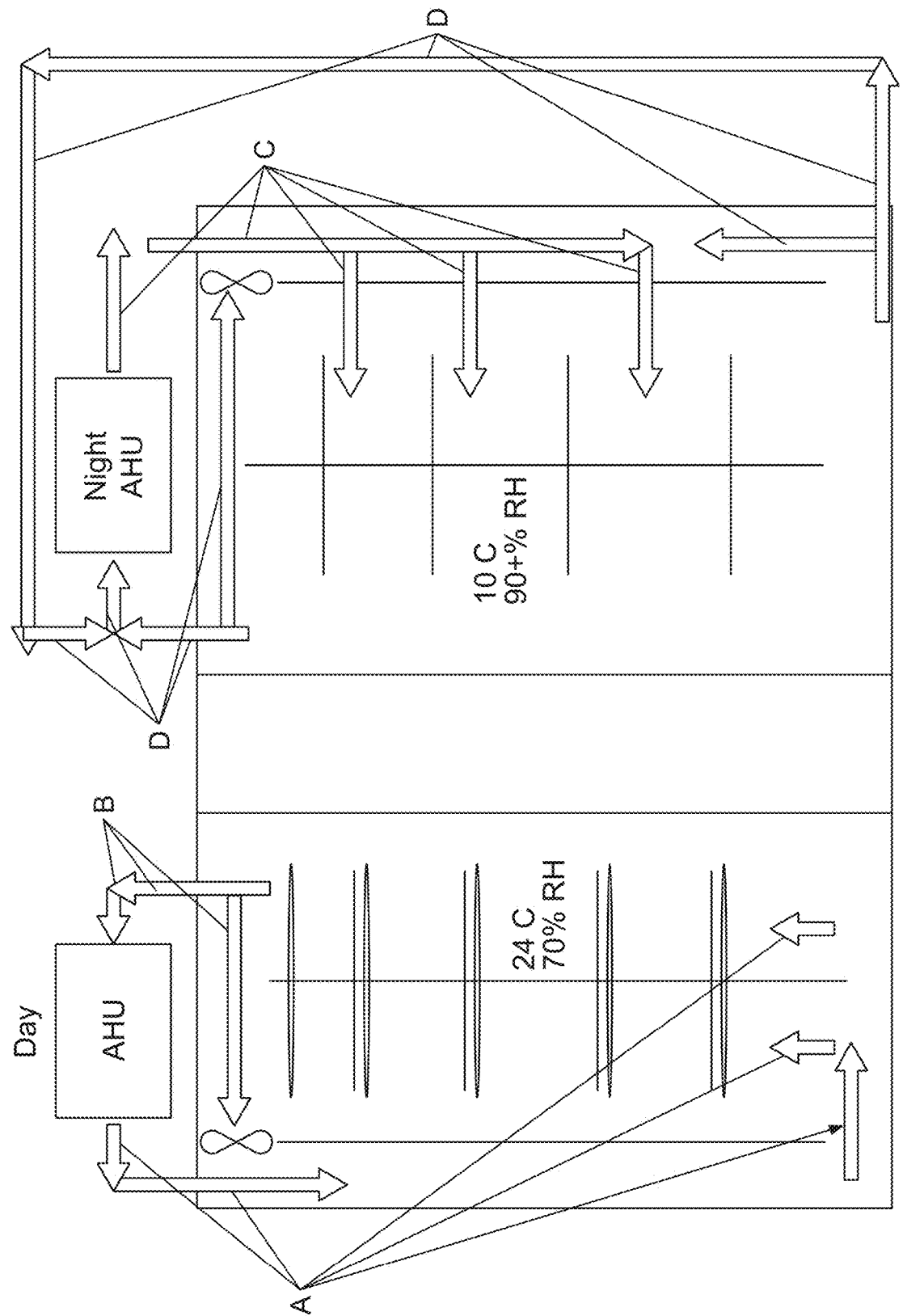
FIG. 20 is a block diagram of an environmental control system according to an exemplary embodiment of the present invention.

FIG. 20 shows conditioning and circulation of air within the enclosure 10 resulting from operation of the environmental control system 2100. In the day portion 2120, the conditioned air (indicated by arrows A) is sent from the HVAC unit 2102A down the plenum area and into the bottom of the area of the enclosure 10 in which the racks 20 are housed. This air then traverses through the racks 20 (and associated plants), gaining heat and humidity. The recirculated air (indicated by arrows B) is sent back to the HVAC unit 2012A and also mixed with the conditioned air via the air circulation units 2104A. The circulated air can then be re-conditioned and circulated once again through the racks 20. In the night portion 2130, the conditioned air (indicated by the arrows C) is sent from the HVAC unit 2102B down and into the bottom of the side plenum in a duct which throws cold air into the racks sideways. Warmed up air (indicated by arrows D) is sucked from the top and the bottom of the racks within ducts and returned back to the HVAC unit 2102B to be conditioned. In exemplary embodiments, the air circulation units 2104A, 2104B are used to create climate uniformity.

In exemplary embodiments, cooling capacity can be provided by systems that includes components, such as, for example, unit coolers, ducted systems with air handlers, direct expansion units, and combinations thereof, to name a few. In exemplary embodiments, air can also be delivered directly to individual plants through use of air tubes, such as air tubes mounted in the same orientation as the light fixtures 18 described earlier.

Pest Management System

Figure 21:
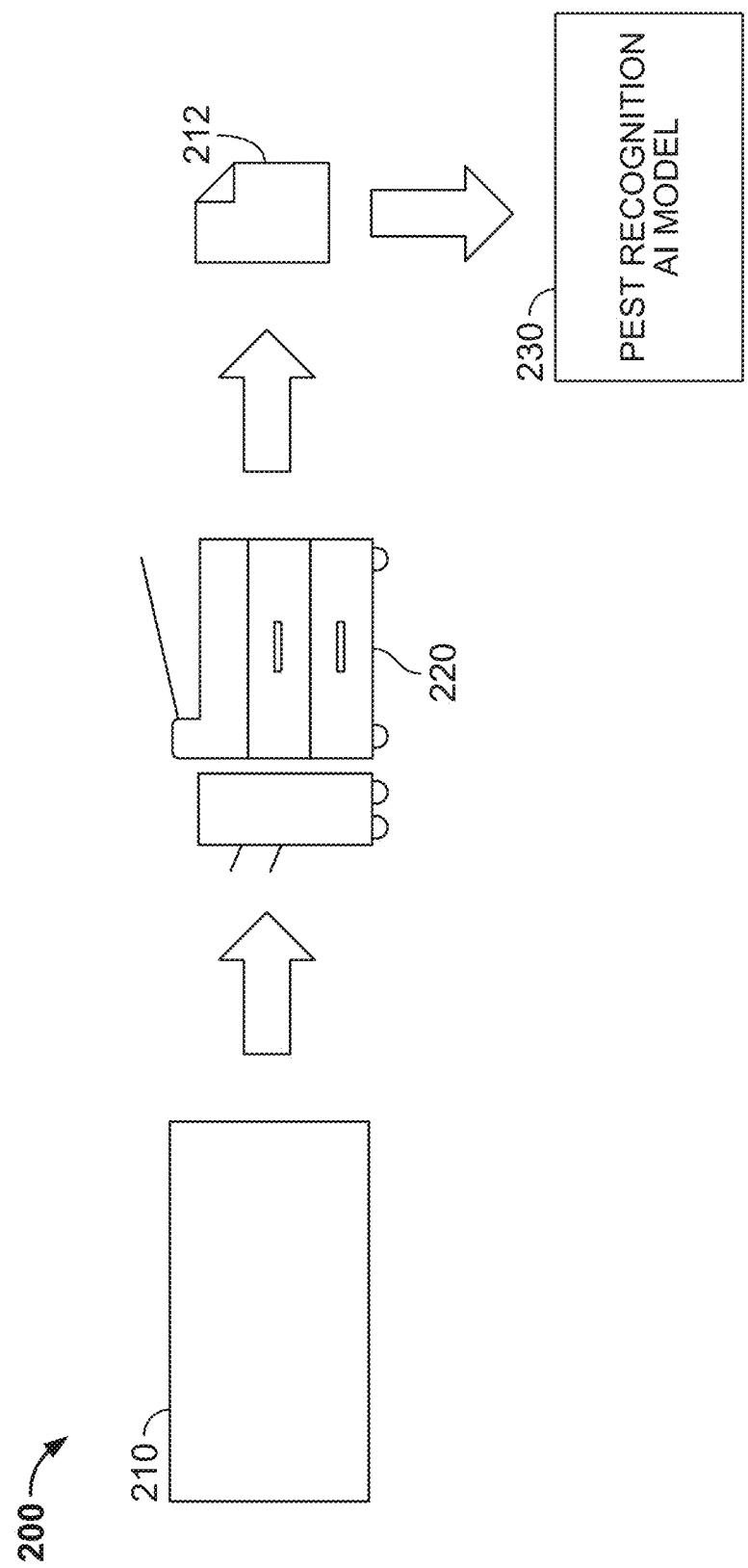
FIG. 21 is a block diagram of a pest control system according to an exemplary embodiment of the present invention.

In an exemplary embodiment, the vertical farm system 1 includes a pest management system, generally designated by reference number 200. As shown in FIG. 21, the pest management system 200 includes a card 210 coated with adhesive that holds insects that might fly or crawl onto the card 210. In this regard, the card 210 may hold common crop pests, such as, for example, aphids, *thrips*, beetles and mites, to name a few. These pests are typically within the size range of 0.5 mm to 10 mm, and are often difficult to see and/or identify with the human eye. Within a period of time, for example within a period of one or more hours, days and months, thousands of insects may crawl or fly onto the card 210. In the process, the card 210 is scanned using a conventional flatbed scanner 220 to thereby generate a corresponding gigapixel image 212 of the card 210. The gigapixel image 212 is then fed to a pest recognition artificial intelligence model 230 configured to analyze and identify any pests from large scale images of such pests within the gigapixel image 212 of the card 210.

In exemplary embodiments, each enclosure 10 within a farm made up of a plurality of enclosures 10 may include one or more cards 210 located at various sections of the enclosure 10. The one or more cards 210 in each section may be scanned individually or more than one card may be scanned at once to generate a composite of card images. In exemplary embodiments, all cards from the same enclosure 10 are scanned at once to generate a gigapixel image. In exemplary embodiments, each image 212 may have a size of, for example, 5 GB or more.

Figure 22:
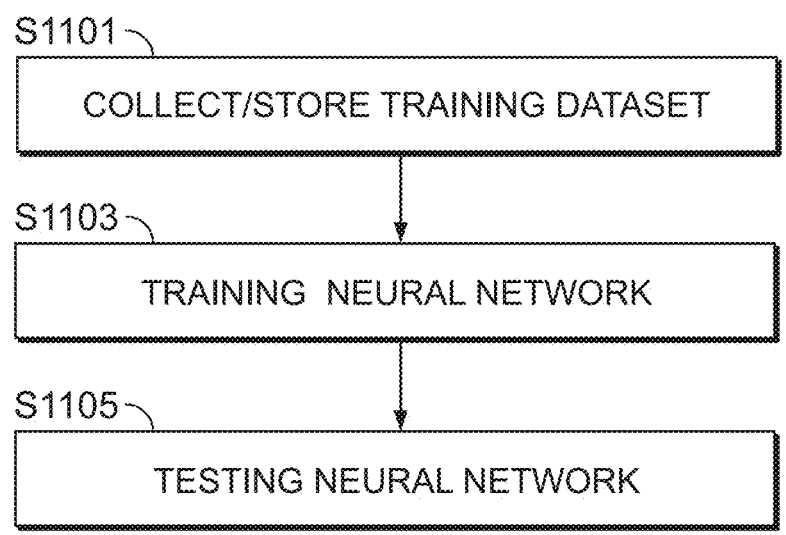
FIG. 22 is a flowchart showing a process for generating a pest recognition artificial intelligence model according to an exemplary embodiment of the present invention.

FIG. 22 shows a process for generating a pest recognition artificial intelligence model 230 according to an exemplary embodiment of the present invention. In step S1101 of the process, training data is collected and stored in a database. The training data may include data associated with features of specific pest-types and tags associated with those pest-types. For example, in the case of an aphid, the training data may include data associated with a unique shape of the aphid and a tag associated with the aphid identified based on the unique shape. A computer vision API (application programming interface), such as, for example, AWS Rekognition API, Microsoft Computer Vision or Google Cloud Vision API, to name a few, may be used to generate the training dataset.

In step 1103 of the process, a neural network may be trained using the training data from step S1101. In this regard, the training data may be fed into a neural network algorithm that applies appropriate weights to input data, or independent variables, to determine an appropriate dependent variable, with one or more dependent variables being determined and combined to determine a final result (e.g., identification of an image of a pest within an image dataset and categorization of the identified pest). In exemplary embodiments, the neural network algorithm may be implemented using deep learning frameworks, such as, for example, Tensorflow, Keras, PyTorch, MxNet, Chainer Caffe, Theano, Deeplearning4j, CNTK, and Torch, to name a few.

In step S1105, the trained neural network is tested for performance. For example, the trained neural network may be tested for precision, recall, F1 score, accuracy, Intersection over Union (IoU), Mean Absolute Error (MAE), to name a few.

In exemplary embodiments, the pest recognition model 230 may be a machine learning recognition model, such as, for example, a Support Vector Machines (SVM) model, Bag of Feature Model, or a Viola-Jones Model, to name a few. In the exemplary embodiments, the pest recognition model 230 may be a deep learning image recognition model, such as, for example, Faster RCNN (Region-based Convolutional Neural Network), Single Shot Detector (SSD) or You Only Look Once (YOLO), to name a few.

In exemplary embodiments, the pest recognition AI model may generate reports indicating presence or non-presence of pests within sections of an enclosure 10. In this regard, FIG. 23 shows an example of a report generated by the pest management system 200, including class of pests identified in an enclosure, number of detections, percentage of each pest out of the total of all pests detected, to name a few. Links may also be provided to view detections and/or scans.

In exemplary embodiments, the results of the pest recognition model 230 in locating and identifying pests on the card 210 may be checked manually by a person viewing the card 210 and visually spotting any pests. If the pest recognition model and/or the manual inspection results in identification of a pest, appropriate action may then be taken to eliminate the pest from the enclosure 10.

In exemplary embodiments, pests may be detected that are not in the training set for inspection. In this regard, unsupervised and/or semi-supervised learning algorithms can be used to detect pests outside of the original training set. Large unlabeled datasets of historical data plus a small subset of labeled data may be used to bootstrap AI training. Suitable techniques that may be used in this regard include few-shot learning and anomaly detection, among others.

Harvesting System

Figure 24:
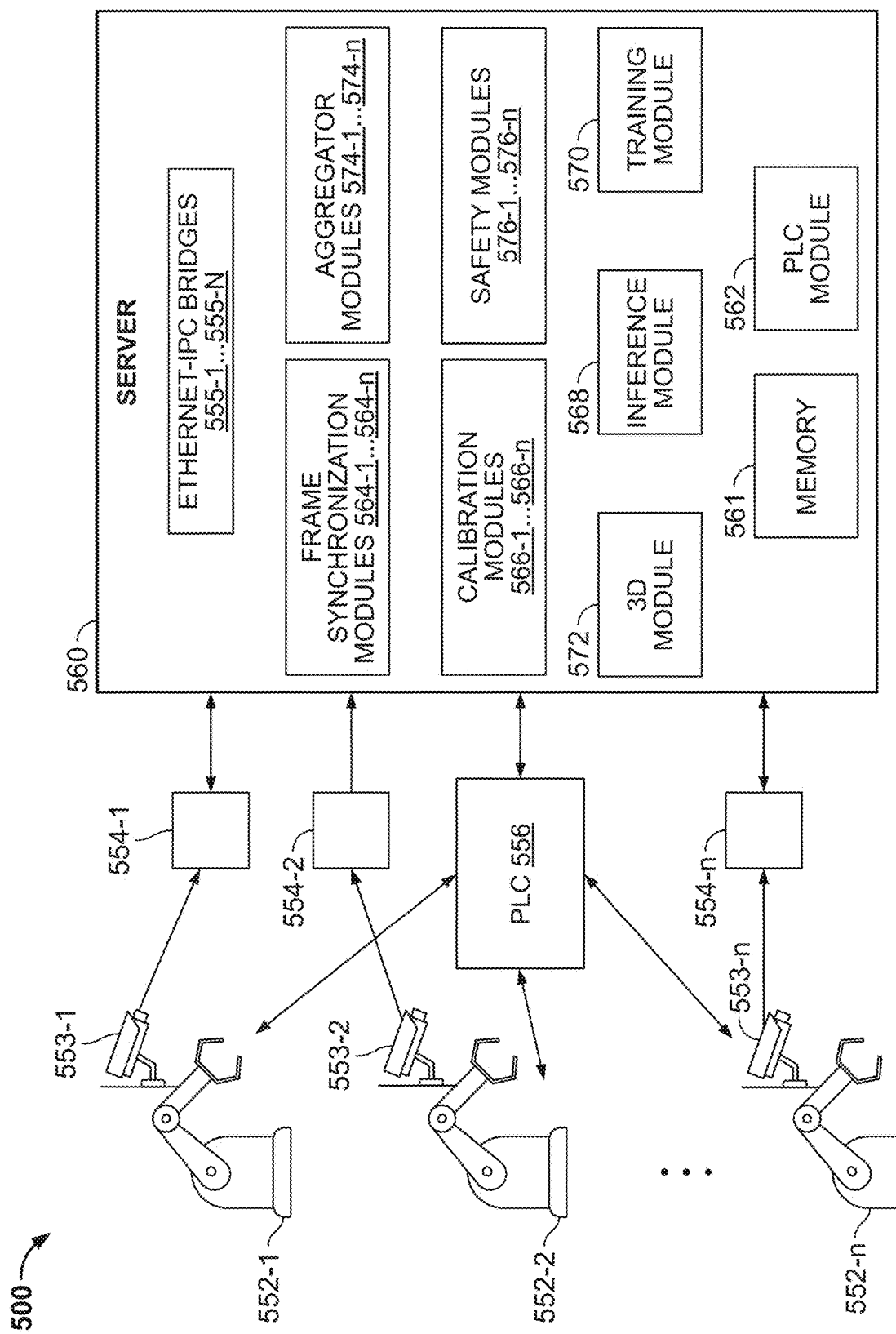
FIG. 24 is a block diagram of a harvesting station according to an exemplary embodiment of the present invention.

As mentioned previously, the system includes a harvesting station 500, and in exemplary embodiments the harvesting station 500 is fully automated using integrated handling and machine vision tooling affixed to robotic manipulators, single-axis servo positioners, conveyors, machine vision techniques and artificial intelligence. In this regard, FIG. 24 is a block diagram of a harvesting station 500 according to an exemplary embodiment of the present invention. The harvesting station 500 includes one or more harvesting robots 552-1, 552-2 . . . 552-n operatively connected to a server 560 and a programmable logic controller (PLC) 556. Each of the harvesting robots 552-1, 552-2 . . . 552-n may be operatively connected with one or more corresponding edge devices 554-1, 554-2 . . . 554-n, one or more corresponding ethernet-IPC bridges 555-1, 555-2 . . . 555-n, one or more corresponding frame synchronization modules 564-1, 564-2 . . . 564-n, one or more corresponding calibration modules 566-1, 566-2 . . . 566-n, one or more corresponding aggregator modules 574-1, 574-2 . . . 574-n, and one or more corresponding safety modules 576-1, 576-2 . . . 576-n, all of which may exist within the server 560. The server may also contain a 3D module 572, an inference module 568, a training module 570, memory 561 and PLC module 562. The modules of the server 560 may be made up of software components, hardware components, or combinations of hardware and software components. Further, one or more modules may be combined and/or one or more modules may be separated into sub-modules. Although only one server 560 is shown in FIG. 24, it should be appreciated that multiple servers may be provided, with multiple enclosures 10 (or "farms") including one or more harvesting stations 500 associated with one or more servers of the multiple provided servers. Also, although only one PLC 556 is shown in FIG. 24, it should be appreciated that the harvesting station 500 may include multiple PLCs, with each PLC associated with one or more corresponding harvesting robots 552-1, 552-2 . . . 552-n.

The harvesting robots 552-1, 552-2 . . . 552-n include corresponding camera units 553-1, 553-2 . . . 553-n. In exemplary embodiments, the camera units 553-1, 553-2 . . . 553-n may be stereoscopic red-green-blue-depth (RGBD) cameras, such as, for example, an Intel® RealSense™ D405 camera (Intel Corporation, Santa Clara, California, USA). Other types of cameras may be used, such as, for example, plain stereo, structured light, or solid-state LiDAR, to name just a few.

Figure 25A:
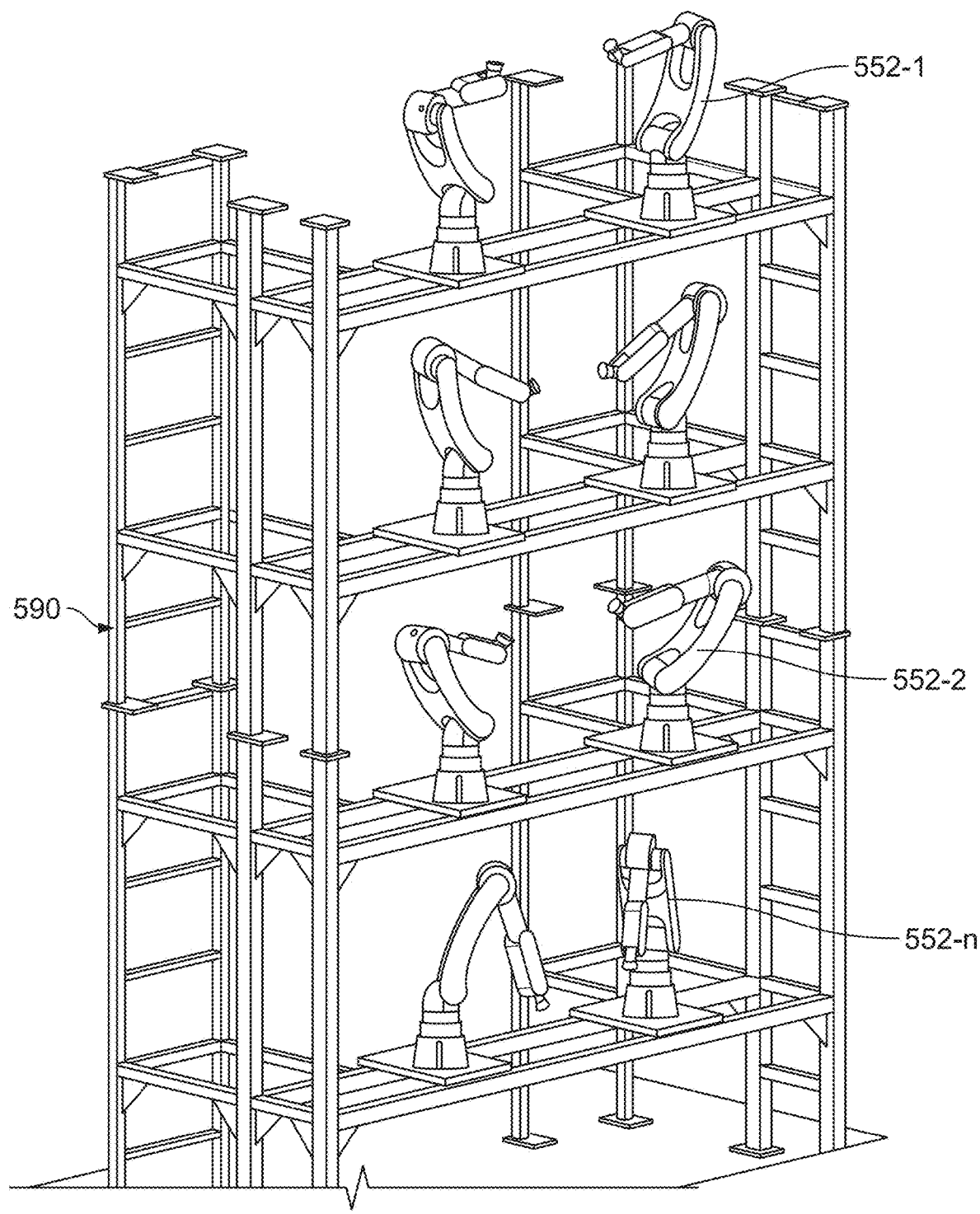
FIG. 25A is a perspective view showing a portion of a harvesting robot according to an exemplary embodiment of the present invention.

As explained in more detail below, the harvesting station 500 operates to identify ripe fruit within a closed view of the crop environment and harvest the ripe fruit without causing damage to the plants or environment. In exemplary embodiments, the harvesting station 500 may also be configured to count the number of flowers in the enclosure 10 for appropriate control of the pollination system 300, to be described in more detail below. The harvesting robots 552-1, 552-2 . . . 552-n are fixtured to stationary platforms so that as the racks 20 move along the conveyor system 40, the harvesting robots 552-1, 552-2 . . . 552-n are able to access the crops and carry out the harvesting process. As shown in FIGS. 25A and 25B, in exemplary embodiments, the harvesting robots 552-1, 552-2 . . . 552-n are six-axis robots and may include multiple joints and an end effector 555. The end effector 555 may be a gripper configured to grasp a stem and snip the stem to remove ripe fruit or the gripper may have a more claw-like configuration to directly grasp the fruit and pull the fruit from the stem. In this regard, the end effector 555 may include a grip portion that holds a stem, and a separate snipping portion that snips the stem while the stem is being held by the gripper portion. This allows the end effector 555 to then place the still-gripped harvested fruit onto a tray or other storage/packaging component. As also explained in more detail below, the camera units 553-1, 553-2 . . . 553-n operate to capture images of the crops and surrounding environment to assist in the harvesting process. In exemplary embodiments, the harvesting robots may be commercially available robots, such as, for example, Yaskawa Motoman (Yaskawa America, Inc., Miamisburg, Ohio, USA) or FANUC LR Mate (FANUC America Corporation, Rochester Hills, MI, USA).

As shown in FIG. 25A, the harvesting robots 552-1, 552-2 . . . 552-n may be held stationary on scaffolding 590. The scaffolding 590 may include multiple levels with any number of harvesting robots 552-1, 552-2 . . . 552-n supported at each level so that the harvesting robots 552-1, 552-2 . . . 552-n can access the plants held on the racks 20. In this regard, as each rack 20 enters the harvesting station area, the rack 20 may be held stationary to allow time for the harvesting robots 552-1, 552-2 . . . 552-n to harvest the fruit. Once harvested, the fruit may be placed by the harvesting robots 552-1, 552-2 . . . 552-n onto trays or other temporary storage components which can then be transported by a separate conveyance system to a packaging station.

The edge devices 554-1, 554-2 . . . 554-n operate to process image data captured by the camera units 553-1, 553-2 . . . 553-n into data that can be used to carry out various processes at the server 560. In this regard, the edge devices 554-1, 554-2 . . . 554-n may be devices, such as, for example, NVIDIA® Jetson Nano™ (NVIDIA Corporation, Santa Clara, CA, USA), soc (system on a chip), sbc (single board computer), Raspberry Pi (Cambridge, England, UK), Intel® Edison (Intel Corporation, Santa Clara, California, USA) and Intel® NUC, to name a few. In exemplary embodiments, the edge devices 554-1, 554-2 . . . 554-n run the camera drivers and send information from the camera to the server 560 through the ethernet-IPC bridges 555-1, 555-2 . . . 555-n. In this regard, the ethernet-IPC bridges 555-1, 555-2 . . . 555n may include, for example, a ZeroMQ bridge, a RabbitMQ bridge, WebRTC Gateway, or a gRPC bridge, to name a few. The edge devices 554-1, 554-2 . . . 554-n may be configured to output data into memory, which may be, for example, serialized messages or payloads sent vie inter-process communication (e.g., shared memory, memory-mapped files, file descriptors, pipes, Unix domain sockets, etc.), along with a timestamp. The data placed into memory may be image data contained within a message container, where the message has a binary serialization format, such as, for example, Cap'n Proto, Protobuf, Flat-Buffers and JSON, to name a few.

The ethernet-IPC bridges 555-1, 555-2 . . . 555n within server 560 receives input from the edge devices 554-1, 554-2 . . . 554-n and carries out operations, such as those described in more detail below. In this regard, messages are sent from the bridges at the edge devices 554-1, 554-2 . . . 554-n and received at a corresponding ethernet-IPC bridge 555-1, 555-2 . . . 555n at the server 560, where they are then placed in server memory 561. Server memory 561 (commonly referred to as IPC) is a module that facilitates communication between all modules in server 560. In FIG. 24, all connections/arrows within modules in server 560 are made using server memory 561 as a pass-through interconnection between modules. In exemplary embodiments, image messages may be passed from the edge devices 554-1, 554-2 ... 554-*n* to ethernet-IPC bridge 555-1 ... 555-*n* within server 560 at a rate of, for example, 30 times per second.

The PLC module 562 is configured to communicate with the PLC 556 to obtain the operating state of the harvesting robots 552-1, 552-2 ... 552-*n* and also provides instructions to the harvesting robots to perform harvesting, pruning, and other operations. These instructions include, but are not limited to: locations for picks, trajectories for the harvesting robot to execute picks, validation of successful/unsuccessful execution of picks, locations for placement of picked berries/fruits, and validation of successful/unsuccessful placement of picked berries/fruits. In this regard, the PLC module 562 may determine operating states of the harvesting robots 552-1, 552-2 ... 552-*n*, such as, for example, where the robots are located, whether the robots are idle, and whether the robots are in a picking mode, to name a few. The PLC module 562 may communicate with the PLC 556 using conventional industrial communication protocols. The PLC module 562 places the robot operating state data into the memory module 561 for use by the other modules on the server 560. The robot operating state data may be in a serialized memory format that describes what a particular robot or collection of robots is doing at a point in time.

Exemplary pseudocode for implementation of the PLC module 562 is as follows:

```
class PlcModule:
    def __init__(self,plc_address,robots, plc_api_version) :
        plc_connection = establish_connection_with_plc(plc_address, plc_api_version)
        for robot_number in robots:
            self.robot_controllers.append(RobotController(robot_number=robot_number, plc_connection) )
    def run(self) :
        while True: # Run forever
            for robot in self.robot_controllers:
                # Get index of current rack
                rack_index = read_from_plc(self.plc_connection, rack_tag)
                current_state = robot.determine_operating_state( )
                if current_state == RobotState.IDLE:
                    pass # Do nothing while the robot is idle.
                elif current_state == RobotState.CALIBRATING:
                    robot.publish_position_and_state_to_memory_module( )
                elif current_state == RobotState.SCANNING:
                    gutter_index = read_from_plc(self.plc_connection, gutter_tag)
                    robot.publish_position_and_state_to_memory_module(rack_index, gutter_index)
                elif current_state == RobotState.WAITING_FOR_PICK_DATA:
                    pick_data = read_pick_data_from_safety_module( )
                    robot.send_pick_instructions_to_plc(pick_data)
                elif current_state == RobotState.PICKING:
                    robot.publish_position_and_state_to_memory_module( )
                    result = read_pick_success_from_backend_verification_module( )
                    robot.send_pick_success_to_plc(result)
                elif current_state == RobotState.PLACEMENT:
                    robot.publish_position_and_state_to_memory_module( )
                else:
                    raise ValueError("Invalid state")
```

Figure 26:
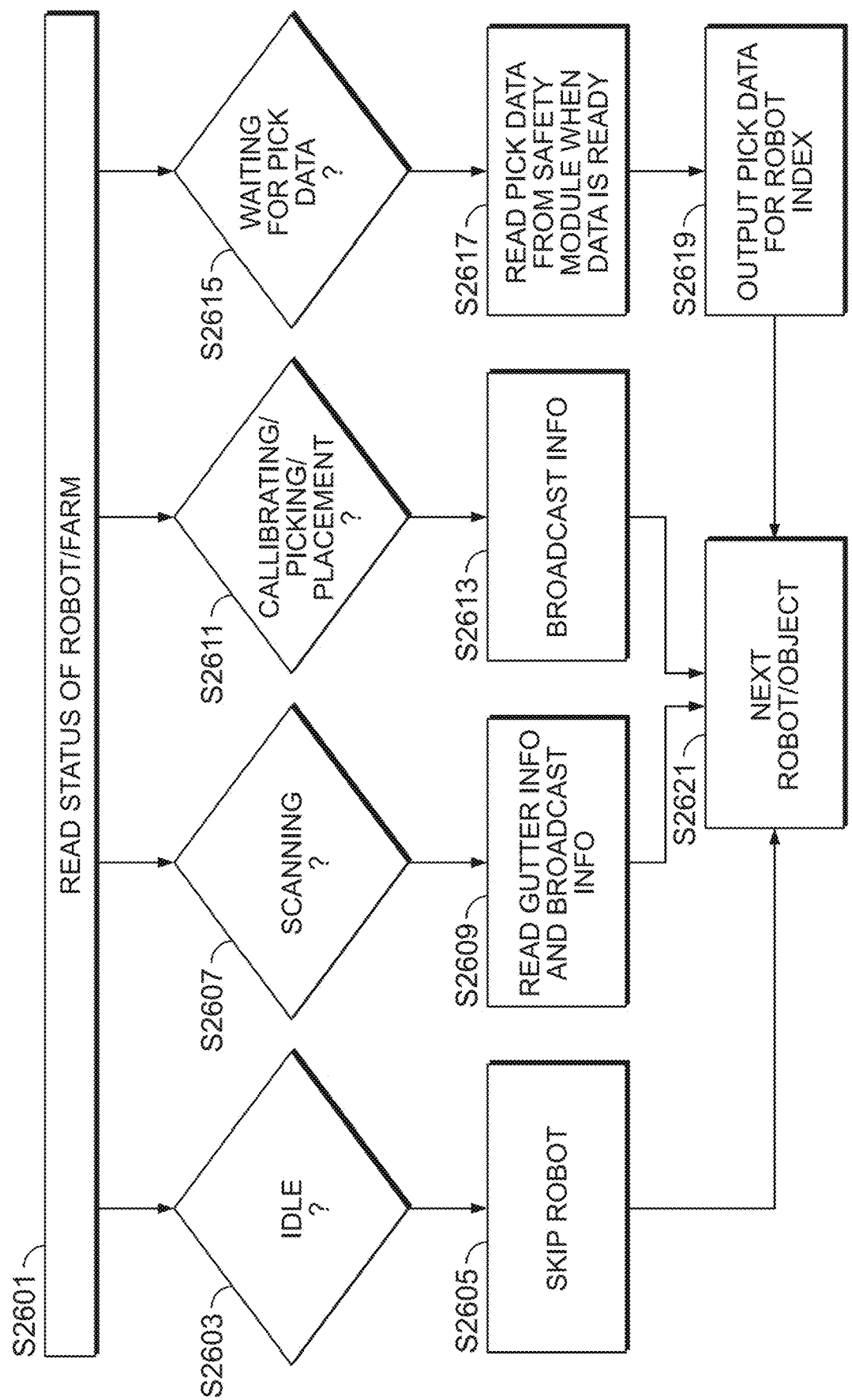
FIG. 26 is a flowchart showing a process carried out by a PLC module according to an exemplary embodiment of the present invention.

FIG. 26 is a flowchart showing a process carried out by the PLC module 562 according to an exemplary embodiment of the present invention. In step S2601 of the process, for each robot, the PLC module 562 reads status of the robot and/or the farm. In step S2603, if the PLC module 562 determines that the robot is idle, the robot is skipped and the next robot is analyzed. In step S2607, if it is determined that the robot is scanning, additional gutter information is read from the PLC 556, and then the PLC module 562 broadcasts relevant notification messages to various other modules using the memory module 561. In step 2611, if the PLC module 562 determines the robot is calibrating, picking and/or performing placement, relevant notification messages are broadcast to various other modules using the memory module 561. In step S2615, if the PLC module 562 determines that the robot is waiting for pick data, the PLC module 562 reads the pick data from the safety module 576-n when the data is ready, and then outputs the pick data to the PLC 556 for a robot index. If the PLC module 562 cannot determine status of the robot (e.g., invalid or unknown state), the PLC module 562 will return an error message.

The frame synchronization modules 564-1 . . . 564-n are configured to read directly from the memory module 561 to obtain image messages and robot operating state data and synchronize the robot operating states with a captured image. In this regard, the frame synchronization modules 564-1 . . . 564-n may receive a notification each time a robot 552-1, 552-2 . . . 552-n has initiated an image scan, indicating that an appropriate image must be found from the scan event that matches the robot operating state. Since the robots 552-1, 552-2 . . . 552-n are moving during the scan event, the captured images may be blurry, and thus in exemplary embodiments, the frame synchronization modules 564-1 . . . 564-n may downsample to capture separate image frames. For example, the downsampling may be one frame per second, or some other frame capture rate. When PLC module 562 receives a scan event and verifies that the robot is not moving, the frame synchronization modules 564-1 . . . 564-n may select a captured image frame and output a sync frame message into the memory module 561 that includes information on the captured image frame and the corresponding robot operating state data. Accordingly, the captured image frame is synched with the robot operating state at a particular point in time.

Exemplary pseudocode for implementation of the frame synchronization modules 564-1 . . . 564-n is as follows:

```
class FrameSyncModule:
    def __init__(self) :
        self.image_buffer = { }
        self.event_queue = [ ]
    def run(self) :
        while True:
            # Receive image message from camera feed
            image_data, time_stamp = camera_subscriber_socket.receive( )
            # Store binary image data in buffer with timestamp
            self.image_buffer[time_stamp] = image_data
            if self.image_buffer.size() > buffer_limit:
                self.image_buffer.drop_images_older_than_duration(10) # Drop images older than 10 seconds
            robot_event_msg = event_subscriber_socket.receive( )
            if robot_event_msg is not None:
                # Add this event to the queue
                self.event_queue.append(robot_event_msg)
            # Check if we can process the oldest event in the queue
            if length(self.event_queue) != 0:
                event_msg = self.event_queue.pop(0)
                # Fetch matching image based on timestamp
                image = self.image_buffer.retrieve_closest_image(event_msg.time_stamp)
                # Republish image with robot_event data
                image_republish_msg = create_message(vision_msgs.Image, image, event_msg.time_stamp)
                image_publisher_socket.send(image_republish_msg.to_bytes( ))
```

Figure 27:
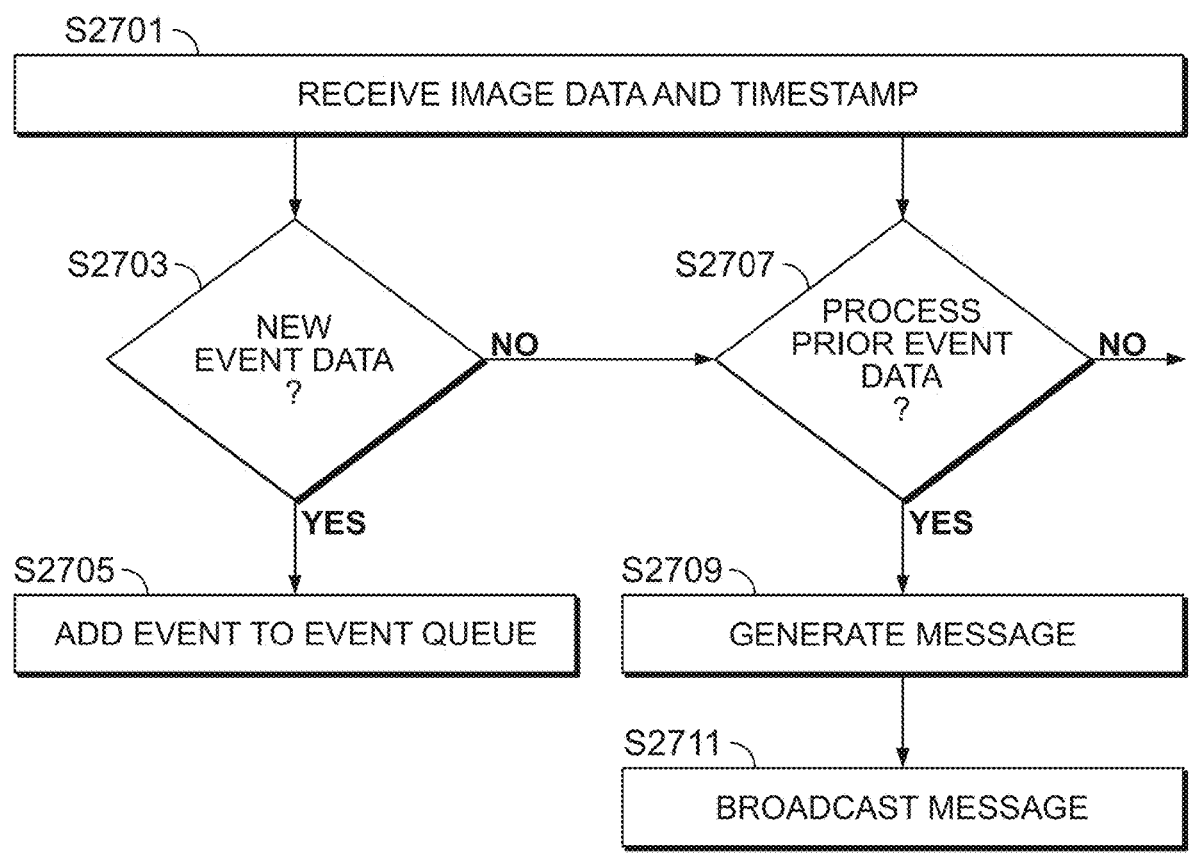
FIG. 27 is flowchart showing a process carried out by a frame synchronization module according to an exemplary embodiment of the present invention.

FIG. 27 is flowchart showing a process carried out by a frame synchronization module 564-*n* according to an exemplary embodiment of the present invention. In step S2701, the frame synchronization module 564-*n* receives image data and timestamp from memory module 561 and the image data is stored in an image buffer indexed by the timestamp. If the image buffer is too large, oldest data may be dropped from the buffer to meet a maximum buffer limit. In step S2703, the frame synchronization module 564-*n* determines if new event data is available. If so, the frame synchronization module 564-*n* will then add the new event data to an event queue. Otherwise, the frame synchronization module 564-*n* will check if the oldest event in the queue can be processed. In exemplary embodiments, an event can be processed if the event timestamp is near to the timestamp of an image in the image buffer. If such a match is found, the frame synchronization module 564-*n* will pack the event data into a message along with the retrieved image, and then broadcast the message to various modules in the pipeline using memory module 561. The processed event data may then be removed from the queue.

The calibration modules 566-1 . . . 566-*n* are configured to use the synch frame messages generated by the frame synchronization modules 564-1 . . . 564-*n* to perform an initial calibration or update an existing calibration of the robots 552-1, 552-2 . . . 552-*n* and camera units 553-1, 553-2 . . . 553-*n*. In this regard, the PLC 556 may be placed into a calibration mode which causes a robot 552-1, 552-2 . . . 552-*n* to progress through a plurality of movements while sending associated captured images to the server 560. The calibration modules 566-1 . . . 566-*n* may then use this information to perform intrinsic and extrinsic calibration of the camera units 553-1, 553-2 . . . 553-*n*.

Exemplary pseudocode for implementation of the calibration modules 566-1 . . . 566-*n* is as follows:

```
class CalibrationModule:
    def __init__(self) :
        calibration_settings = load_config("/configs/calibration.yaml")
        # CHARUCOBOARD SN003 (MEFA) (calib.io)
        self.charucoboard = aruco.CharucoBoard_create (calibration_settings)
        # Aruco detection params (turned for closer detections)
        self.aruco_dict = aruco.Dictionary_get(aruco.DICT_5X5_1000)
        self.aruco_detector_params =
aruco.DetectorParameters_create(calibration_settings)
    def run(self) :
        while True: # Run forever
            msg_rgbd = self.receive_latest_rgbd_frame_from_camera( )
            # Skip frames that have already been processed.
            if msg_rgbd.index in scanIdxs:
                continue
            # Add current index to processed set
            scanIdxs.add(msg_rgbd.index)
            gray_img = extract_image_from_msg(msg_rgbd)
            ############### CHARUCOBOARD Processing ###############
            # Get arucoboard markers
            arucoCorners, arucoIds = cv2.aruco.detectMarkers(
                gray_img, self.aruco_dict, self.aruco_detector_params
            )
            if arucoIds is None: # Skipping frame, since no aruco IDs were
detected.
                continue
            # Get highly precise charuco corners
            charucoretval, charucoCorners, charucoIds =
aruco.interpolateCornersCharuco(
                arucoCorners, arucoIds, gray_img, self.charucoboard
            )
            ######################### Process transform
#########################
            transform_3d = extract_transform_from_msg(msg_rgbd)
            # Add these corners and ids to our calibration arrays
            if charucoretval >
self.aruco_detector_params.required_num_corners:
                charucoCornersAll.append(charucoCorners)
                charucoIdsAll.append(charucoIds)
                list_of_3d_transforms.append(transform_3d)
            else: # Skipping frame, since not enough charuco corners were
detected
                continue
            ################ Perform calibration #################
            if len(list_of_3d_transforms) > 4:
                # Perform intrinsic calibration
                self.camera_matrix, self.distortion_coefficients, rvecs,
tvecs = (
                    cv2.aruco.calibrateCameraCharuco(
                        charucoCornersAll,
                        charucoIdsAll,
                        self.charucoboard,
                        gray_img.shape,
                    )
                )
                # Perform extrinsic calibration using handeye package
                calibrator = handeye.HandEyeCalibrator(setup="Moving")
                for r, t, transform_3d in zip(rvecs, tvecs,
```

```
list_of_3d_transforms) :
        transform_2d = create_2d_transformation_matrix(r, t)
        calibrator.add_sample(transform_3d, transform_2d)
    if calibrator.get_num_samples( ) >=
calibrator.min_samples_required:
        # Solve for hand-eye transform
        tool_T_cam = calibrator.solve(method=solver)
        rotation_rmse, translation_rmse = (
          calibrator.compute_reprojection_error(tool_T_cam)
        )
        # Add the calibration to the configmap
        calib_data = {
            "date": datetime.datetime.now( ) .strftime("%d/%m/%Y
%H:%M:%S"),
            "num_samples": calibrator.get_num_samples( ),
            "rotation. rmse": rotation_rmse,
            "translation.rmse": translation_rmse,
            "matrix": tool_T_cam,
            "intrinsic.matrix": self.camera_matrix,
            "intrinsic.distortioncoeffs":
self.distortion_coefficients,
        }
        # Update the configmap from K8s
        update_calibration_settings_for_robot(
            "/configs/calibration.yaml", calib_data
        )
```

Figure 28:
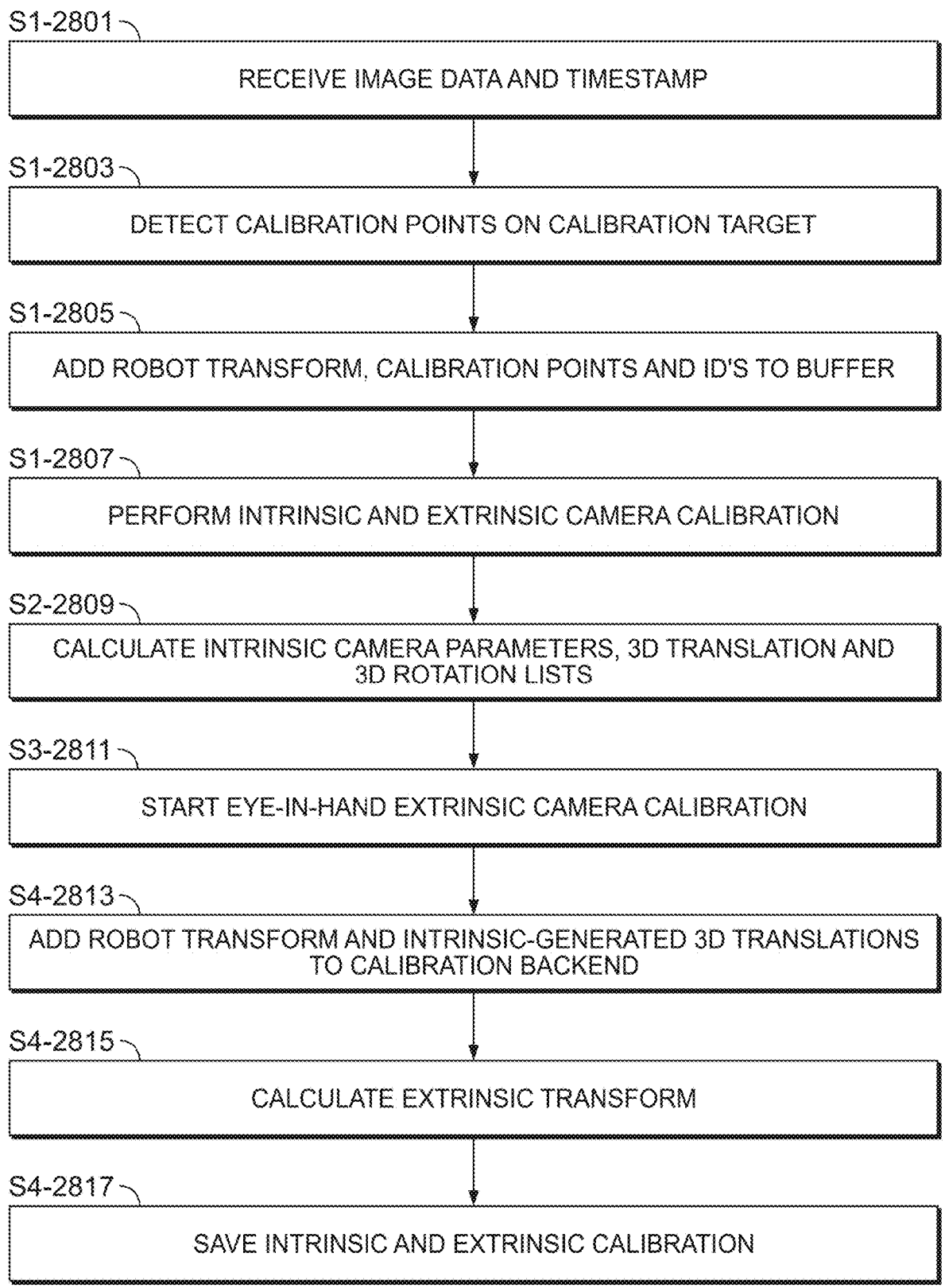
FIG. 28 is a flowchart showing a process carried out by a calibration module according to an exemplary embodiment of the present invention.

FIG. 28 is a flowchart showing a process carried out by the calibration module 566-$n$ according to an exemplary embodiment of the present invention. After initial loading of calibration configuration settings (e.g., calibration target information, robot coordinate system information, etc.), the calibration module 566-$n$ receives image data and timestamp from memory module 561 (step S1-2801). In this step, duplicate input frames may be ignored, and image data may be unpacked. In step S1-2803, the calibration module 566-$n$ detects and refines calibration points on a calibration target. In step S1-2805, if a sufficient number of calibration points have been detected in the frame, the calibration module 566-$n$ adds the robot transform, calibration points, and IDs to a buffer. In step S1-2807, if a sufficient number of robot transforms, calibration points, and IDs have been gathered from multiple images, the calibration module 566-$n$ performs intrinsic and extrinsic camera calibration. Step S1-2807 includes sub-steps, including step S2-2809, in which the calibration module 566-$n$ calculates intrinsic camera parameters, 3D translation, and 3D rotation lists using known parameters from the calibration target and from all aggregated calibration points and IDs. Step S2-2809 includes sub-steps, including step S3-2811, in which the calibration module 566-$n$ starts eye-in-hand camera calibration, which loops over all robot transforms and intrinsic-generated 3D translation and rotations. Step S2-2809 includes sub-steps, including step S4-2813, in which the calibration module 566-$n$ adds robot transform and intrinsic-generated 3D translation and rotation to the calibration backend. The backend will reject mathematically degenerate samples. In step S4-2815, if sufficient number of samples are collected after removal of mathematically degenerate samples, the calibration module 566-$n$ calculates extrinsic transform. In step S4-2817, the calibration module 566-$n$ saves the intrinsic and extrinsic calibration in Kubernetes (or other container orchestration tool) as a configmap.

The inference module 568 is configured to use the captured 2D images and generate messages that includes inference data that are placed into the memory module 561. In this regard, the inference module 568 uses the result of the training module, i.e., the trained model, to perform inference on the incoming real-time data. The inference module 568 may perform operations, such as, for example, object detection, masking, ripeness detection, bounding boxes and keypoint detection, to name a few. In exemplary embodiments, the inference module 568 may use an object detection model and a separate keypoint detection model. In exemplary embodiments, the inference module 568 may perform its operations using one or more neural networks, such as, for example, Mask R-CNN, YOLOACT, Keypoint R-CNN, GSNet, Detectron2 and PointRend, to name a few. In exemplary embodiments, the inference module 568 may use one or more accelerators for enhanced speed and efficiency. Suitable accelerators include, for example, graphics processing units (GPUs), tensor processing units (TPUs), and field programmable gate arrays (FPGAs), to name a few. The input to the inference module 568 may be the synched frame messages generated by the frame synchronization modules 564-1 . . . 564-$n$ and the output may be an inference output message that includes robot operating state data, the original input message, depth (as part of RGBD data), masks, object detection, ripeness detection, bounding boxes, keypoints, and other relevant information.

Exemplary pseudocode for the inference module 568 is as follows:

```
class InferenceNode:
    """
    This class takes in a stream of RGB-D images and outputs inference
    results from the AI models.
    """
    def __init__(
        self,
        path_to_mask_model,
```

```
    path_to_keypoint_model,
) :
    self.mask_model = MaskRCNNPredictor (path_to_ mask_model)
    self.keypoint_model = KeypointPredictor (path_to_keypoint_model)
def get_ripeness_score (self, img, mask) :
    img_hsv = cv2.convert_to_hsv (img)
    red_pixels = cv2.inRange (img_hsv, min_red, max_red)
    num_red_pixels = cv2.countNonZero (red_pixels)
    num_berry_pixels = cv2.countNonZero (mask)
    ripeness_score = int (num_red_pixels * 100 / num_berry_pixels)
    return ripeness_score
def berry_width_and_height (self, mask) :
    big_strawberry_contour = self.find_biggest_contour_(mask)
    berry_axes = self.circle_contour (mask, big_strawberry_contour)
    return berry_axes
def combine_boxes_based_on_iou (self, boxes1, boxes2, iou_threshold=0.5) :
    iou_matrix = compute_iou_matrix (boxes1, boxes2)
    iou_matrix[iou_matrix < iou_threshold] = 0
    return nonzero_elements (iou_matrix)
def infer (self, image) :
    mask_outputs = self.mask_model.infer_on_images (image)
    keypoint_outputs = self.keypoint_model.infer_on_images (image)
    # Combine_outputs of models based on intersection over union (IoU) of
the bounding boxes.
    combined_outputs = self.combine_boxes_based_on_iou (mask_outputs,
keypoint_outputs)
    combined_outputs ["berry_data"] = [self.berry_width_and_height (mask)
for mask in combined_outputs ["masks"] ]
    return combined_outputs
    # output contains bounding boxes, detection masks, keypoints, major
and minor axes of the berry, and the label of the detected object.
def run (self) :
    while True: # Loop forever
        for msg in self.receive_message ( ) :
            image = extract_image_from_msg (msg)
            models_output = self.infer (image)
            if models_output.empty ( ) :
                continue
            models_output.filter_out_boxes_near_edge_of_image ( )
            scores = [self.get_ripeness_score (detection) for detection in
models_output]
            detections_msg = create_message (vision_msgs.ObjectDetections,
models_output, scores)
                publish_detections_socket.send (detections_msg)
                visualization_msg = create_message (vision_msgs.Image, image,
models_output)
publish_visualization_socket.send (visualization_msg.to_bytes ( ) )
```

Figure 29A:
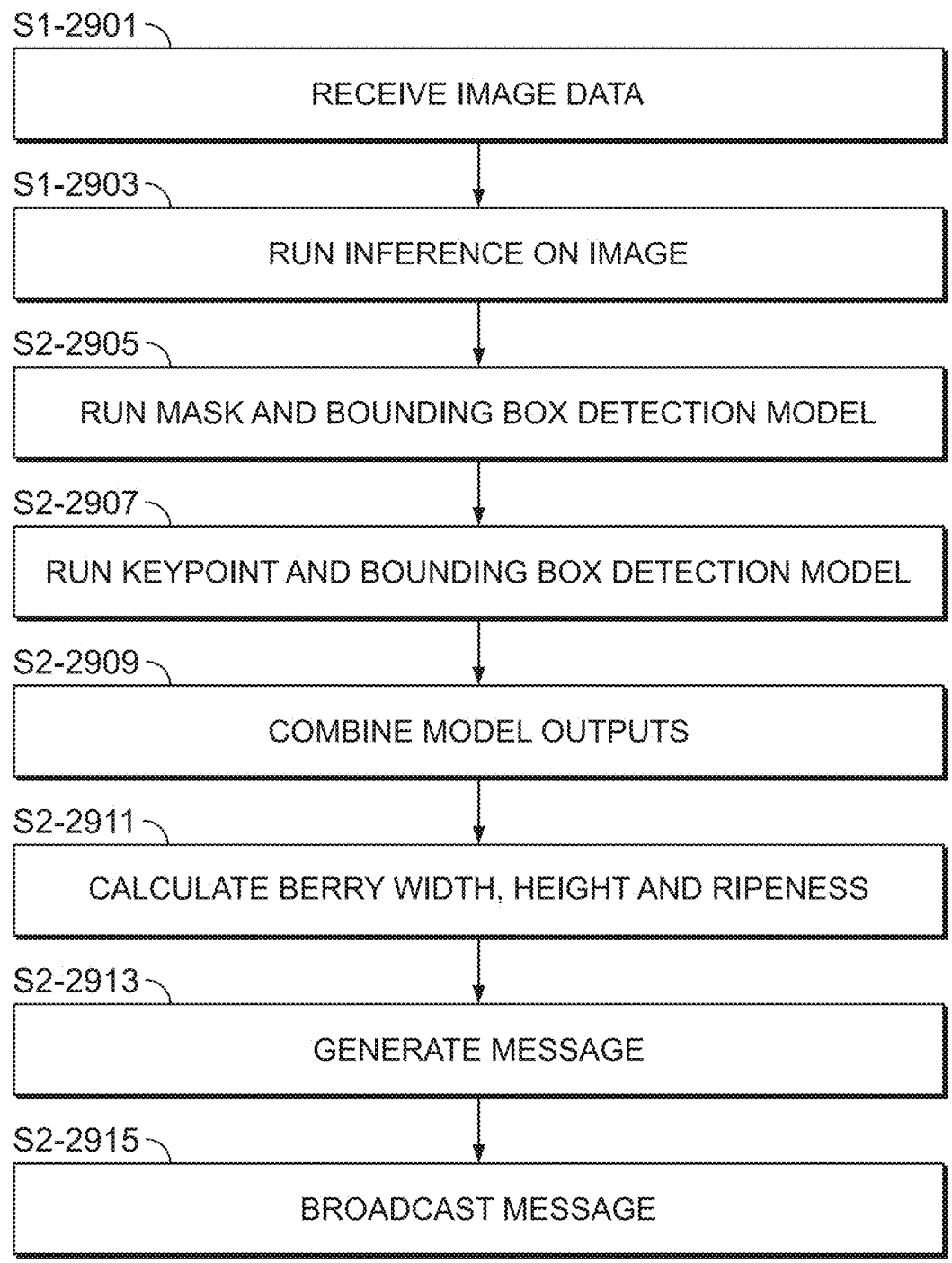
FIG. 29A is a flowchart showing a process carried out by an inference module according to an exemplary embodiment of the present invention.

FIG. 29A is a flowchart showing a process carried out by the inference module 568 according to an exemplary embodiment of the present invention. After initial loading of inference models, the inference module 568 received image data from the memory module 561 (step S1-2901). In step S1-2903, the inference module 568 runs inference on the image data. Step S1-2903 may include sub-steps including step S2-2905 in which the inference module 568 runs a mask and bounding box detection model, step S2-2907 in which the inference module 568 runs a keypoint and bounding box detection model, step S2-2909 in which the inference module 568 combines model outputs using, e.g., bounding boxes IoU and the Hungarian Algorithm, and step S2-2911 in which the inference module 568 calculates berry width, height, and ripeness. In these steps, detections near the edge of an image may be discarded. In step S2-2913, the inference module 568 packages detections into a message and in step S2-2915 broadcasts the message to various modules in the pipeline using memory module 561.

Figure 29B:
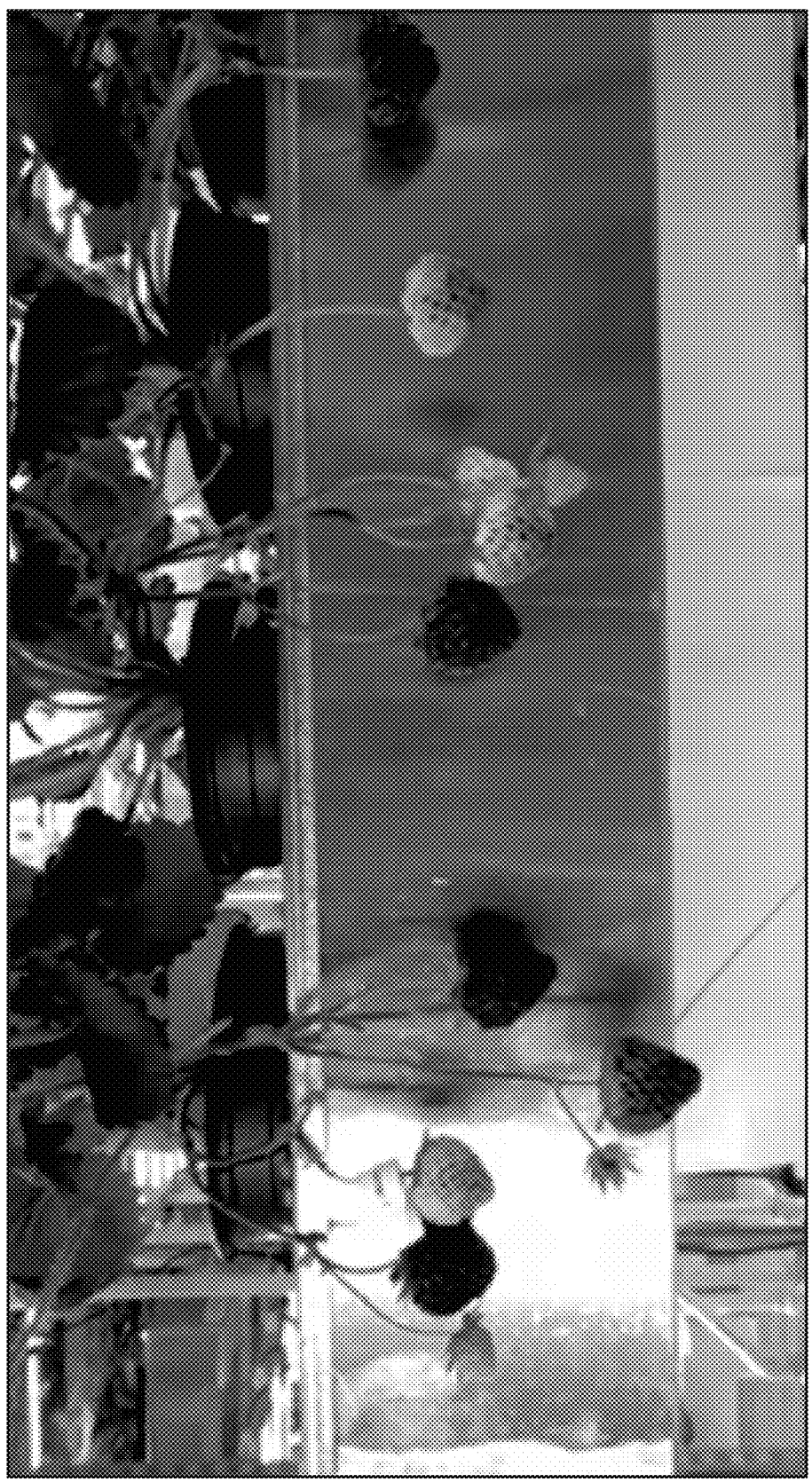
FIG. 29B is an image of a picking environment according to an exemplary embodiment of the present invention.
Figure 29C:
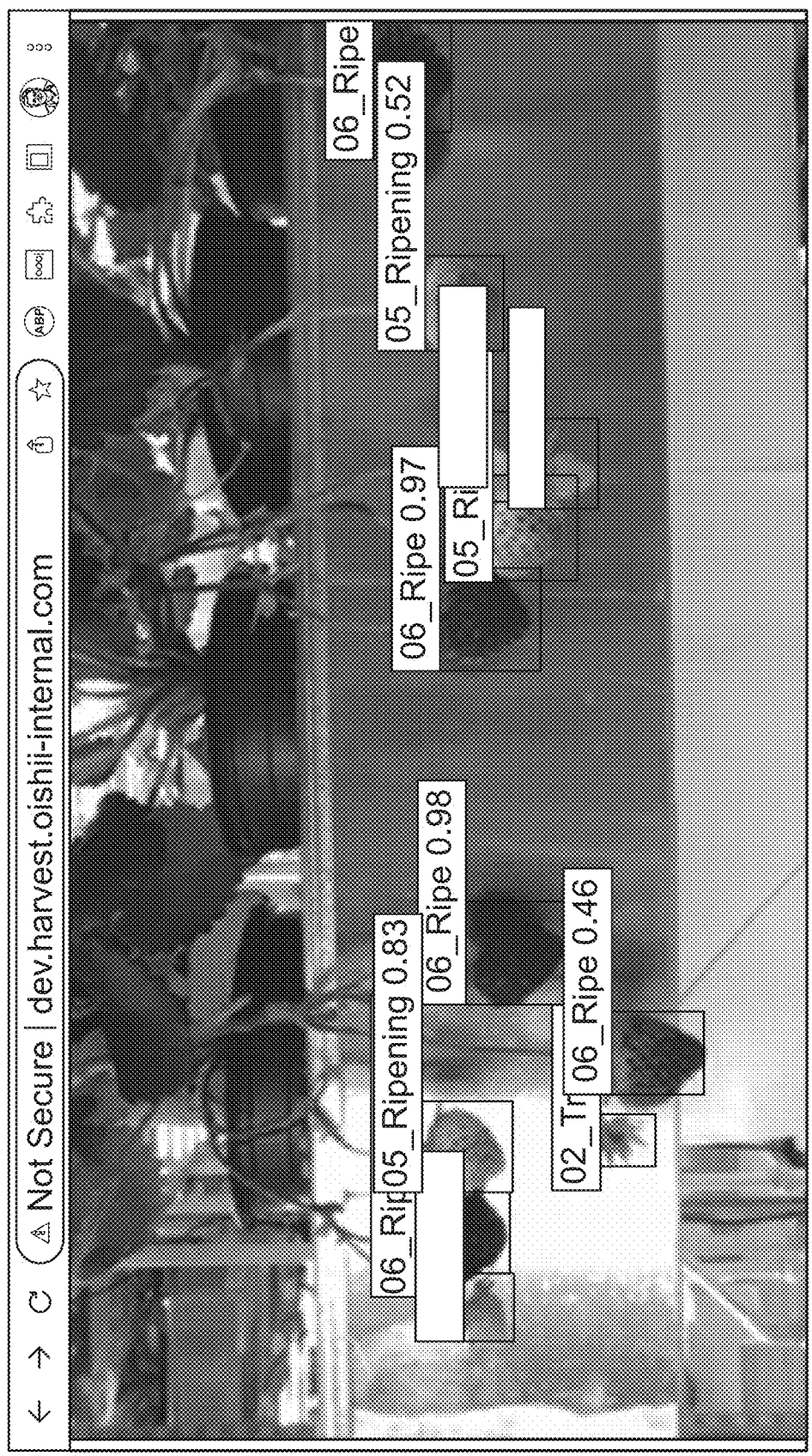
FIG. 29C is an image showing the picking environment of FIG. 29B after running of an inference module according to an exemplary embodiment of the present invention.

FIG. 29B is an image of a picking environment before running the inference module 568 according to an exemplary embodiment of the present invention. FIG. 29C shows the output of the inference module, including masks, bounding boxes, keypoints and ripeness scoring. In exemplary embodiments, ripeness may be determined by the inference module 568 based on color of the fruit and/or other parameters. Ripeness scores may be based on a scale of 0 to 1, with lower range scores corresponding to "unripe" fruit, mid range corresponding to "ripening" fruit, and higher range scores corresponding to "ripe" fruit. It should be appreciated that the scoring is not limited to this scale or ranges.

The training module 570 prepares one or more object recognition and keypoint detection models, which may use neural networks. This is preferably run separately, and not as part of the real-time system. The training module 570 may train the models using a publicly available dataset for strawberries and/or other parts of the plant, such as, for example, StrawDI and the "strawberry picking point localisation ripeness and weight estimation" dataset. The datasets may be in standard formats, such as, for example, COCO, KITTI, and Cityscapes, to name a few. Alternatively, the dataset may be a proprietary dataset generated using creation, curation and annotation.

The 3D module 572 is configured to transform the captured 2D images into 3D image information based on the inference output message generated by the inference module 568. In this regard the 3D module 572 may perform operations, such as, for example, calculation of width and height of a strawberry (in mm or other suitable unit of measurement), calculation of location of stem with respect to the camera, prediction for the percent of occlusion for a specific image, and addition of parameters to a transform tree that may include, for example, a global world frame, relative position of a robot, relative position of a camera and relative position of a strawberry, to name a few. The input into the 3D module 572 is the full RGBD data from the cameras 553-1 . . . 553-n and the 2D keypoints and the 2D masks from the inference module 568. The 3D module 572 integrates all three of these components, fills in any holes and corrects for camera calibration. The 3D module 572 may generate a set of 3D points representing the location of a strawberry with respect to a camera that captured an image of the strawberry. The location of a strawberry with respect to the global world frame may then be determined based on the known position of the robot from the robot operating state data and location of the strawberry with respect to the camera as determined by the 3D module 572.

Exemplary pseudocode for implementation of the 3D module 572 is as follows:

```
class CalyxDet3DNode :
    """
    This node extracts calyxs from a RGBD image using bounding boxes as input.
    Returns a list of 3d points in camera frame.
    """
    def extract_single_bbox (self, depth_img, model_outputs, i) :
        calyxDepth = get_calyx_depth (model_outputs.labelMasks, depth_img, i)
        return append_depth_to_2d_points (depth=calyxDepth, points_2d=[
            model_outputs.keypoints [i] ,
            model_outputs.majorAxes [i, 0],
            model_outputs.majorAxes [i, 1],
            model_outputs.minorAxes [i, 0],
            model_outputs.minorAxes [i, 1]
        ] )
    def run (self) :
        while True: # Loop forever
            for msg_dets in self.receive_message ( ) :
                depth_img, model_outputs = msg_dets.parse ( )
                intrinsics = getCameraIntrinsics ( )
                # For calyx location in 3d
                calyx3DPoints, axesMajorLeft3D, axesMajorRight3D, axesMinorLeft3D, axesMinorRight3D = [
                    self.extract_single_bbox (depth_img, model_outputs, box)
                    for box in model_outputs.boundingBoxes
                ]
                # Transform 2D points to camera frame 3D
                pointcloud = deproject 2d_to_3d (intrinsics, calyx3DPoints)
                # Transform all points into 3D
                axes_3d  =  [deproject_2d_to_3d (intrinsics,  ax) for  ax  in
                (axesMajorLeft3D, axesMajorRight3D, axesMinorLeft3D, axesMinorRight3D) ]
                width3D, height3D = compute_3d_distances (axes_3d)
                col_sorted_indices = pointcloud.sort ("Z")
                occlusion_dict  =  intersecting_boxes (model_outputs.boundingBoxes,
                model_outputs.labelMasks, col_sorted_indices)
                pick_ind = [ ]
                occ_scores = [ ]
                for ind in col_sorted_indices :
                    if occlusion_dict [ind] ["area"] > self.max_occlusion: # occluded
                by berries in the front
                        continue
                    pick_ind.append (ind)
                    occ_scores.append (occlusion_dict [ind] ["area"] * 100.0)
                # Only select the indices that are not occluded
                filter ( [model_outputs, pointcloud, width3D, height3D] , by=pick_ind)
                msg_pc  =  create_message (vision_msgs.Pointcloud,  model_outputs,
                (height3D, width3D), pointcloud, occ_scores)
                publish_socket.send (msg_pc.to_bytes ( ) )
```

Figure 30:
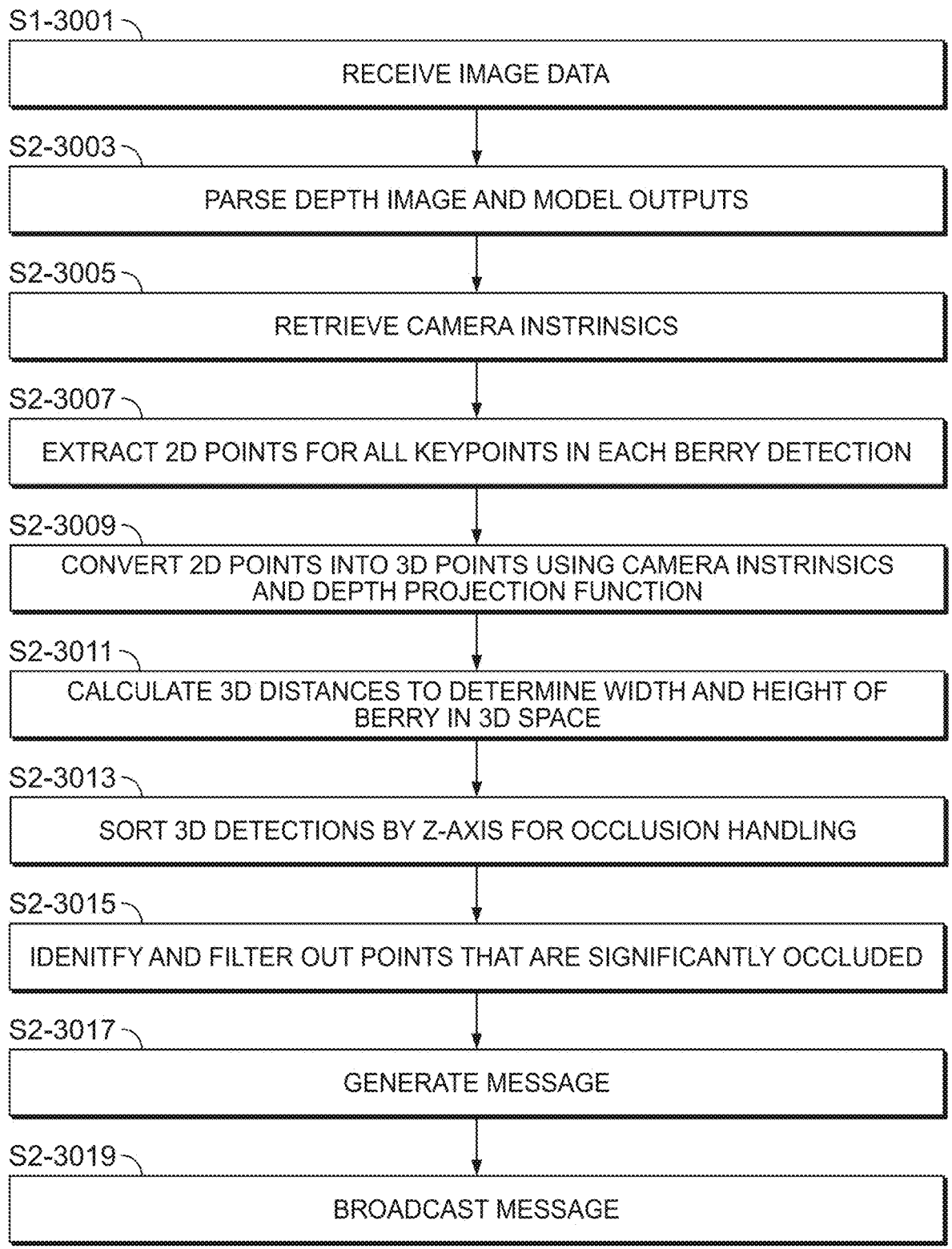
FIG. 30 is a flowchart showing a process carried out by a 3D module according to an exemplary embodiment of the present invention.

FIG. 30 is a flowchart showing a process carried out by the 3D module 572 according to an exemplary embodiment of the present invention. In step S1-3001, the 3D module 572 receives imaged data from memory module 561. For each image received, the 3D module 572 carried out steps S2-3003 to S2-3019. In step S2-3003, the 3D module 572 parses the depth image and model outputs and in step S2-3005, the 3D module 572 retrieves the camera intrinsics. In step S2-3007, the 3D module 572 extracts 2D points for all keypoints in each berry detection and appends a dimension to the tensor. In step S2-3009, the 3D module 572 converts the 2D points into 3D points using camera intrinsics and a depth projection function. In step S2-3011, the 3D module 572 computes 3D distances to determine the width and height of the berry in the 3D space. In step S2-3013, the 3D module 572 sorts the 3D detections by the Z-axis (depth) to prepare for occlusion handling. In step S2-3015, the 3D module identifies and filters out points that are significantly occluded based on a predefined maximum occlusion threshold. In step S2-3017, the 3D module packages occlusion scores, 3D keypoints, and associated model outputs into a message and, in step S2-3019, broadcasts the message to various modules in the pipeline using memory module 561.

The aggregator modules 574-1 . . . 574-n are configured to aggregate 3D image data to generate a world map of strawberries within a world frame using a plurality of 3D images. In this regard, the frame synchronization modules 564-1 . . . 564-n, the inference module 568 and the 3D module 572 may "fire" only once per image so that a world map of strawberries is not known without aggregation of those images. In this regard, the aggregator modules 574-1 . . . 574-n may generate a world map using a plurality of collected 3D images, for example, one to sixteen images, to generate a world map of strawberries within a world frame. After the world map is projected onto the world frame, the aggregator modules 574-1 . . . 574-n may remove duplicate images and determine an ideal approach angle for the end effector 555. The ideal approach angle may be determined by determining a least occluded image for a specific strawberry from the plurality of collected 3D images of that strawberry and then calculating the ideal approach angle based on the determined least occluded image.

Exemplary pseudocode for the implementation of the aggregator modules 574-1 . . . 574-n is as follows:

```
class PointcloudAggregatorNode :
    def run (self) :
        while True: # Loop forever
            # Get new pointcloud data
            pointcloud_msg = self.sub_pointcloud_sock.receive ( )
            # Update tf tree with new transform
            self.transform_tree.add_tf_message (pointcloud_msg.transforms)
            # Transform pointcloud to self.pc_frame
            pc_user      =      get_pointcloud_in_user_frame (pointcloud_msg,
self.transform_tree)
            # Discard points that are too far away
            valid_positions = pc_user [X, :] < self.max_valid_distance
            # Filter out points with low ripeness score
            valid_ripeness = pointcloud_msg.scores > self.min_ripeness_score
            filtered_msg_data = filter_message_data (
                pointcloud_msg, valid_positions, valid_ripeness
            )
            # New scan, reset pointcloud and scan poses
            if pointcloud_msg.scanUid != cached_scan_uid:
                reset_cache ( )
            aggregated_msg_data.append (filtered_msg_data)
            if       aggregated_msg_data.pointclouds.num_points ( )       >
self.min_cluster_size:
                # Cluster pointclouds using DBSCAN and estimate pick-points
                clusterer = DBSCAN ( )
                # Cluster based on y, z
                clusterer.fit (aggregated_msg_data.pointcloud [ (Y, Z) , : ] )
                clusters = clusterer.results ( )
                # For each cluster
                for i, cluster_values in clusters :
                    (
                        clusters [i].ripeness_score,
                        clusters [i].centroid,
                        clusters [i].median_error,
                    )     =     compute_cluster_metrics (aggregated_msg_data,
cluster_values)
                    # Sort the scans based on distance to the cluster
                    scan_distances = calculate_scan_distance_to_cluster (
                        aggregated_msg_data, cluster_centroids [i]
                    )
                    aggregated_msg_data.sort (by=scan_distances)
                    # Pick the least occluded scan
                    least_occluded_view                              =
min (aggregated_msg_data.occlusion_scores)
                    best_scan_index, width, height, robotsensor_T_berry = (
                        extract_info_from_scan (aggregated_msg_data,
least_occluded_view)
                    )
                    # Get the full transform
                    full_transform = self.transform_tree.lookup_transform (
                        self.robot_user_frame,
                        self.robot_eoat_pick_frame,
```

```
        robotsensor_T_berry,
    )
    # Get the euler angles
    xzywpr = convert_transform_to_euler_angles (full_transform)
    if not best_scan_index:
        # No valid scans for this cluster.Use default pick
angle
        xzywpr [3 : ] = default_pick_angle
    # Save the pick angles.
    clusters [i].pick_angle = xzywpr [3: ]
    clusters [i].height = height
    clusters [ i].width = width
    # Discard bad clusters based on error metric
    clusters = clusters [
        (median error <= self.error_thresh)
        & (ripeness_scores > self.min_ripeness_score)
    ]
    # Sort clusters by X coordinate (pick order front to back)
    pick_order = np.argsort (cluster_centroids [0, : ] )
    msg_pickpoints = create_message (
        vision.PickLocations, clusters [pick_order]
    )
self.robot_pick_locations_pub_sock.send (msg_pickpoints.to_bytes ( ) )
```

Figure 31:
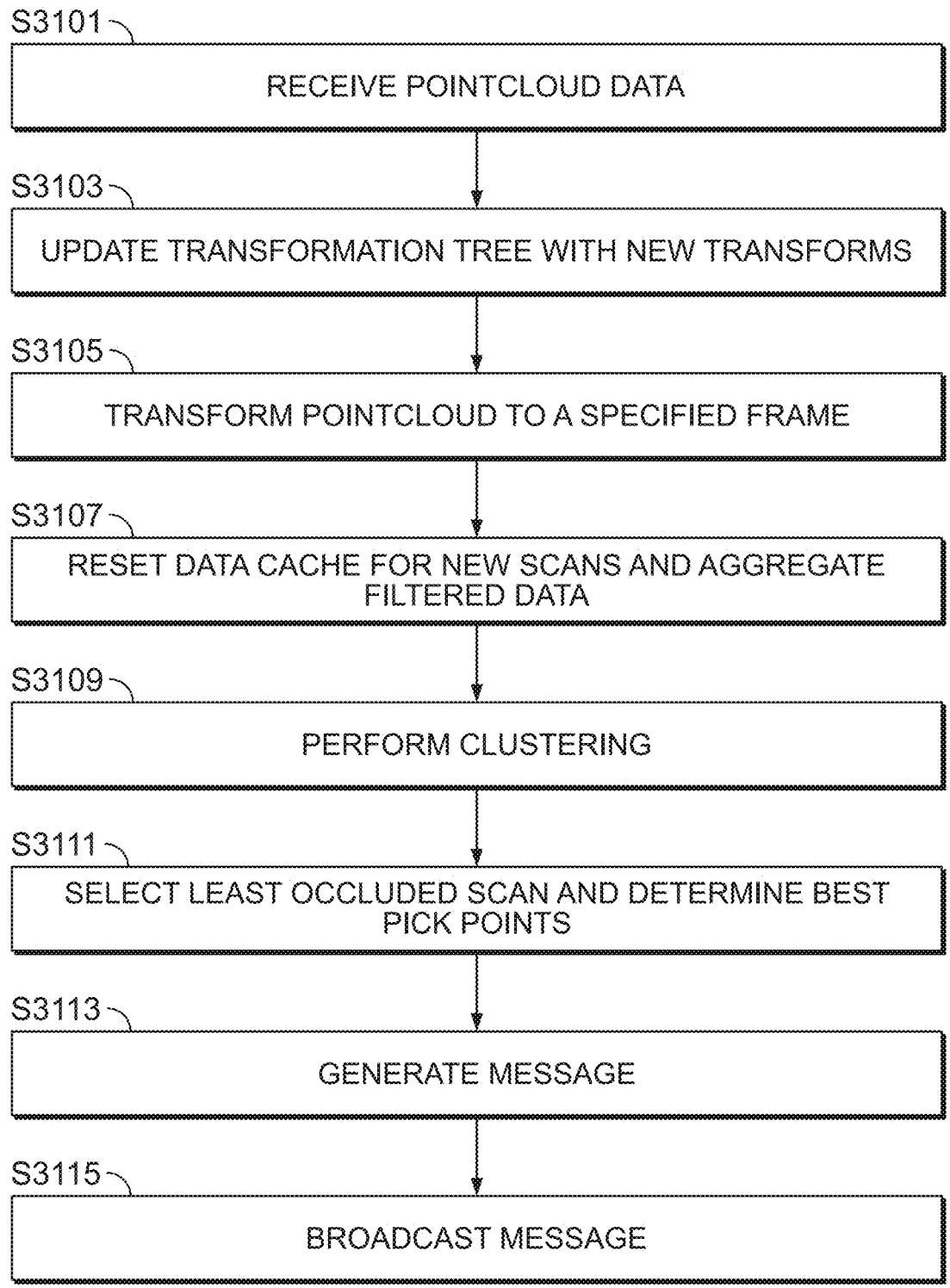
FIG. 31 is a flowchart showing a process carried out by an aggregator module 574-$n$ according to an exemplary embodiment of the present invention.

FIG. 31 is a flowchart showing a process carried out by the aggregator module 574-$n$ according to an exemplary embodiment of the present invention. In step S3101, the aggregator module 574-$n$ continuously receives pointcloud data and, in step S3103, updates the transformation tree with new transforms. In step S3105, the aggregator module 574-$n$ transforms the pointcloud to a specified frame and filters out points based on distance and ripeness criteria. In step S3107, the aggregator module 574-$n$ resets data cache for new scans and aggregates filtered data. Once sufficient data is collected, in step S3109, the aggregator module 574-$n$ performs clustering using, for example, Density-Based Spatial Clustering of Applications with Noise (DBSCAN) or Hierarchical Density-Based Spatial Clustering of Applications with Noise (HDBSCAN). In step S3111, for each cluster, the aggregator module 574-$n$ calculates metrics, selects the least occluded scan, and determines the best pick points including angle, height, and width. Clusters may be filtered based on error and ripeness, and sorted for picking order. In step S3113, the aggregator module 574-$n$ packages pick data into a message and broadcasts the message to various modules in the pipeline using memory module 561.

The safety modules 576-1 ... 576-$n$ are configured to determine whether a specific strawberry pick is within bounds. In this regard, the safety modules 576-1 ... 576-$n$ may determine whether a specific pick violates one or more rules based on the output of the aggregator modules 574-1 ... 574-$n$. The one or more rules may relate to, for example, predetermined area within which the pick should be limited, angle of approach is within a predetermined safety angle, and whether the pick would cause a robot to function outside of safety parameters, to name a few.

Exemplary pseudocode for implantation of the safety modules 576-1 ... 576-$n$ is as follows:

```
class SafetyModule ( ) :
    """
    This class subscribes to pick position messages and filters them based on
set safety zones / limits.
    """
    def __init__(self) :
        # Load safety zones from config file
        self.safety_settings = safe_load (open ("/settings/safety.yaml") )
    def run (self) :
        while True: # Run forever
            for msg in self.subscriber.receive_messages ( ) :
                cluster_centroids =
extract_cluster_centroids_from_received_message (msg)
                # Filter pick locations based on safety zones, discarding
clusters that are too far away
                valid_clusters = self.safety_settings ["rack_min_x"] <
cluster_centroids [X] < self.safety_settings ["rack_max_x"]
                valid_clusters = self.safety_settings ["rack_min_y"] <
cluster_centroids [Y] < self.safety_settings ["rack_max_y"]
                valid_clusters = self.safety_settings ["rack_min_z"] <
cluster_centroids [Z] < self.safety_settings ["rack_max_z"]
                output_msg = create_filtered_output_message (msg,
valid_clusters)
                self.publisher.send (output_msg)
```

Figure 32:
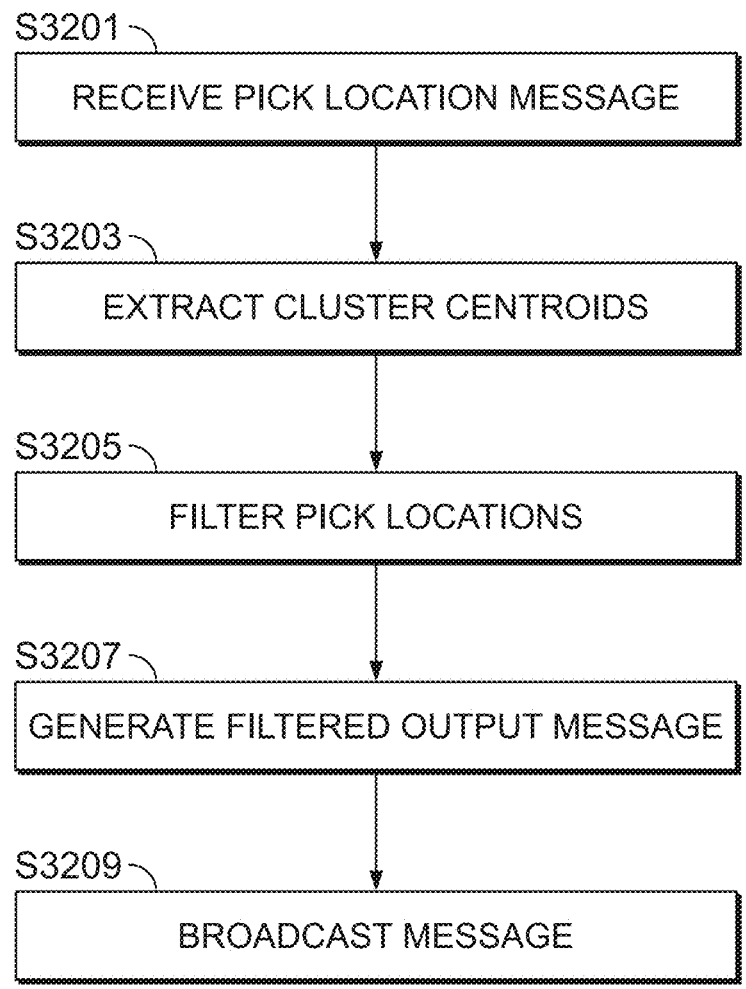
FIG. 32 is a flowchart showing a process carried out by a safety module according to an exemplary embodiment of the present invention.

FIG. 32 is a flowchart showing a process carried out by safety module 576-$n$ according to an exemplary embodiment of the present invention. After initialization in which the safety module 576-$n$ is configured with predefined safety zones (per-robot), including allowable bounds along the X, Y, and Z axes, the safety module 576-$n$, for each incoming message (step S3201) containing the 3-D pick locations from a set of scans, performs steps S3203-S3209. In step S3203, the safety module 576-$n$ extracts the cluster centroids from the received message. In step S3205, the safety module 576-$n$ filters the pick locations based on safety zones, discarding clusters based on the allowable bounds along the X, Y, and Z axes. In step S3207, the safety module 576-$n$ generates a filtered output message and, in step S3209, broadcasts the message to various modules in the pipeline using memory module 561.

Pollination System

Figure 33:
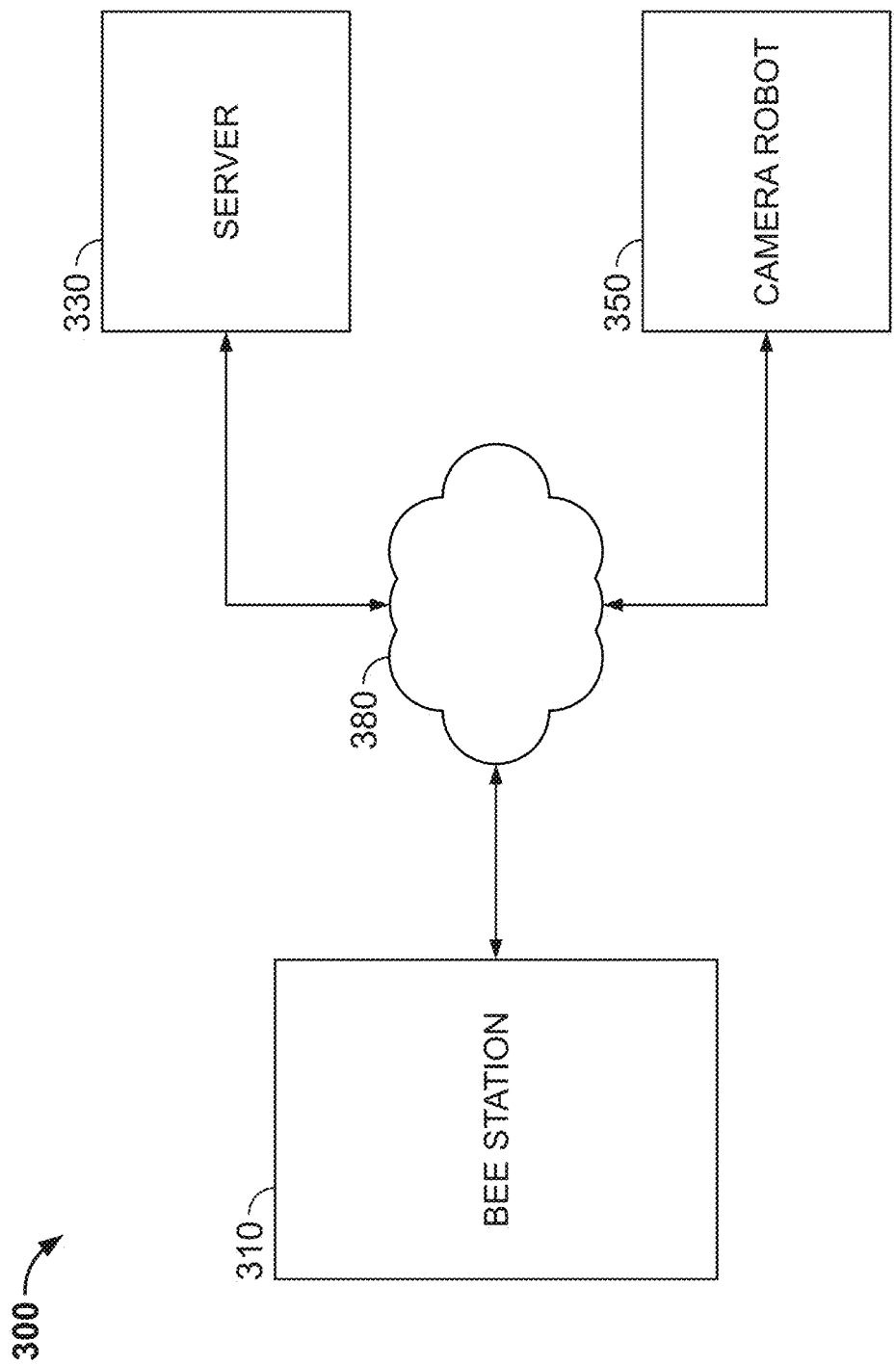
FIG. 33 is a block diagram of a pollination system according to an exemplary embodiment of the present invention.

In exemplary embodiments, the system 1 may include a pollination system that stores one or more beehives and releases a number of bees on a periodic basis, where the number of bees is determined based on the number of flowers within the enclosure 10 or any other factors related to bee pollination. In this regard, FIG. 33 is a block diagram of a pollination system, generally designated by reference number 300, according to an exemplary embodiment of the present invention. The pollination system 300 includes a bee station 310, a server 330 and a camera robot 350. The bee station 310, server 330 and camera robot 350 may be in communication through a network 380, such as, for example, a wide area network or a local area network. Each enclosure 10 may include one or more bee stations 310.

Figure 34A:
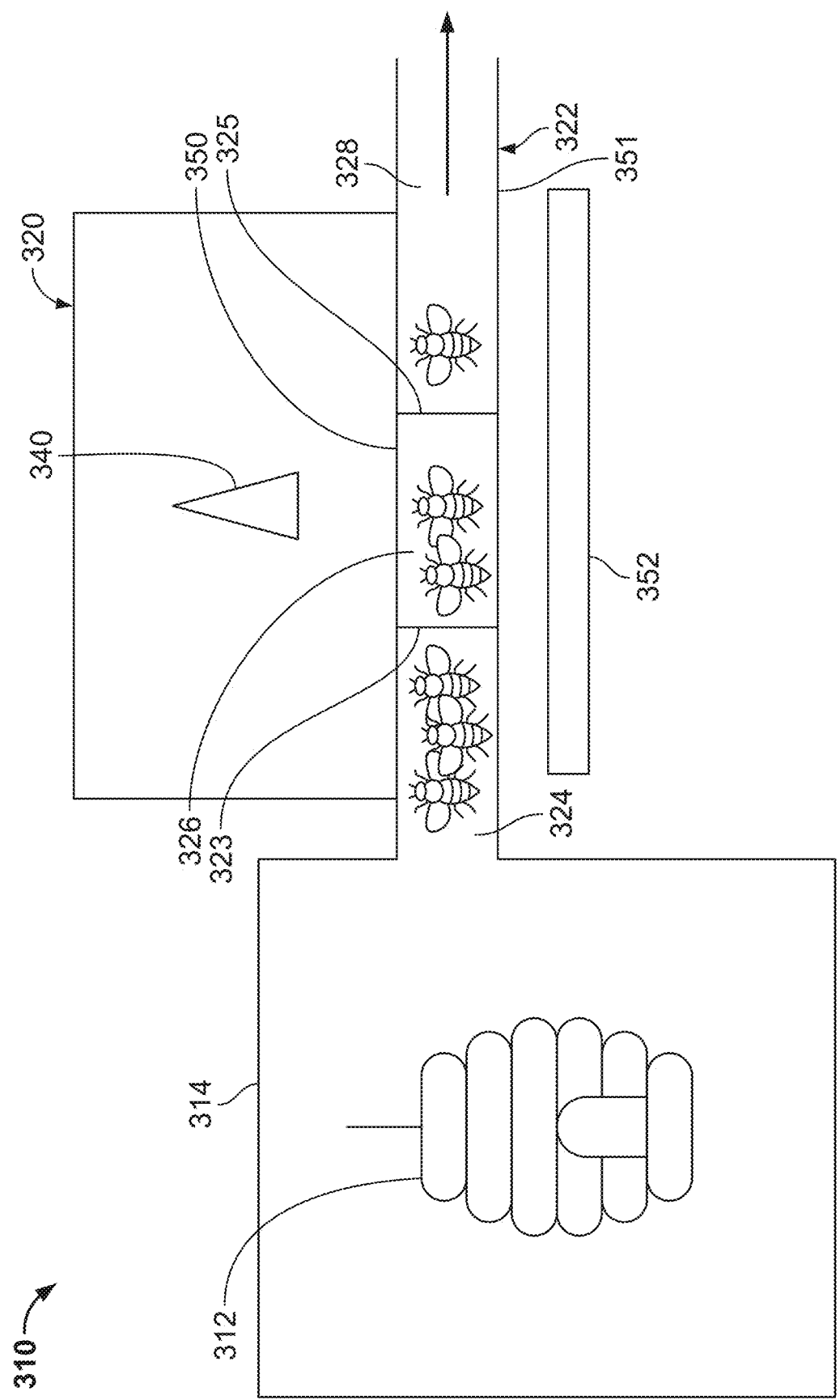
FIGS. 34A and 34B are cross-sectional views of a pollination system according to an exemplary embodiment of the present invention.
Figure 34B:
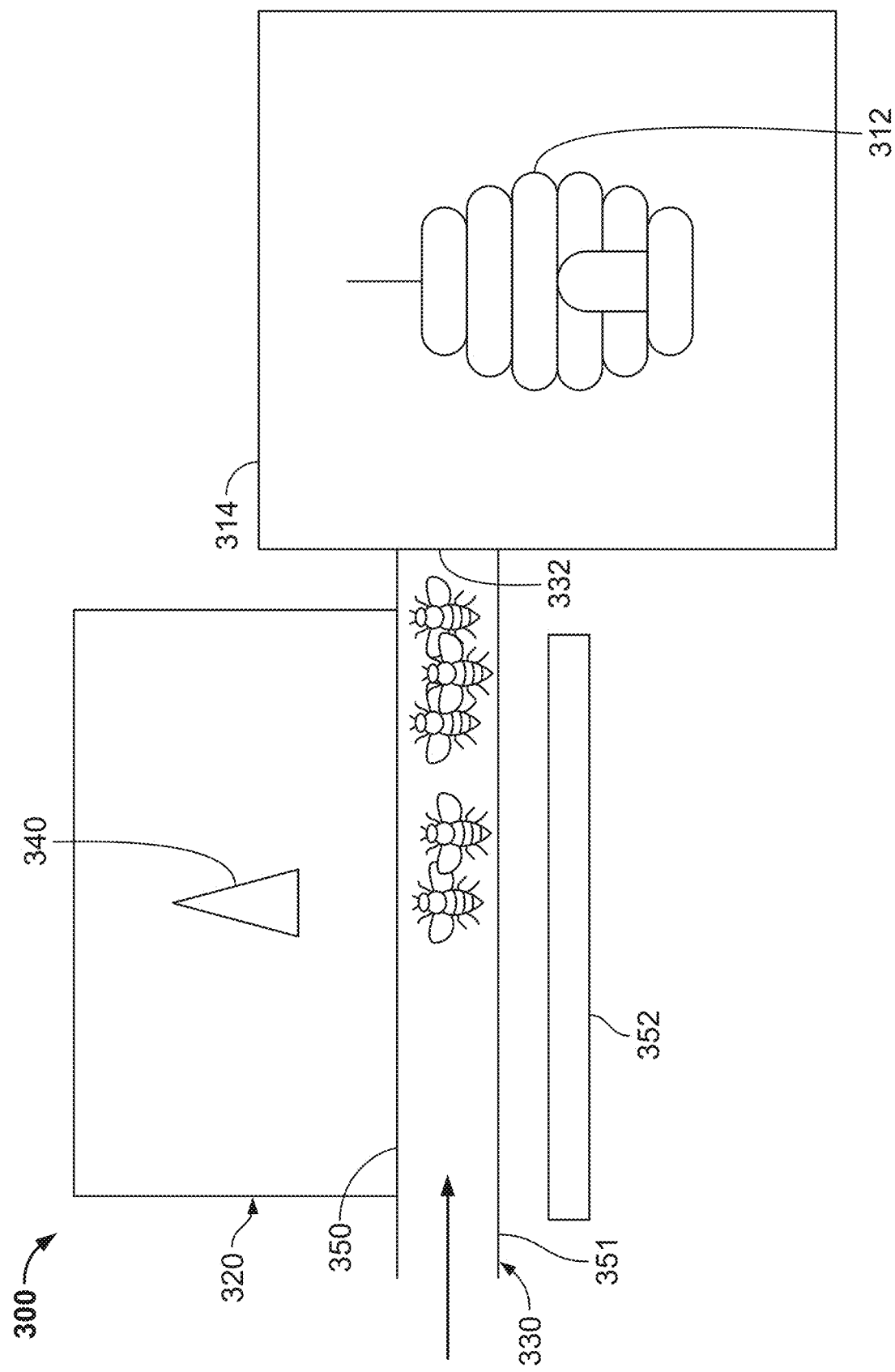

FIGS. 34A and 34B show simplified block diagrams of opposite sides of a bee station, generally designated by reference number 310, according to an exemplary embodiment of the present invention. The bee station 310 includes a hive 312 held within a hive enclosure 314. The hive enclosure 314 may be any commercially available bee box, such as, for example, NATUPOL™ (Koppert Biological Systems, Inc., Howell, MI, USA). A bee gate system, generally designated by reference number 320, is attached to the hive enclosure 314. The bee gate system 320 includes a bee exit gate assembly 322 and a bee entrance gate assembly 330 arranged side by side with one another. As explained in more detail below, a vision system including a camera 340 is disposed on top of the bee exit gate assembly 322 and bee entrance gate assembly 330 to track movement of bees in and out of the hive so that the number of bees in the enclosure 10 can be controlled using the bee exit gate assembly 322. The bee exit gate assembly 322 and the bee entrance gate assembly 330 share a top wall 350, which may be made of a transparent material, such as, for example, plexiglass or transparent acrylic. A lighting system 352 is disposed below the bee gate system 320 to backlight the bees within the bee gate system 320 to allow the camera 340 to view the bees. The lighting system 352 may be, for example, an LED strip. The bee exit gate assembly 322 and the bee entrance gate assembly 330 also include a shared bottom wall 351 that may be made of a translucent material, such as, for example, frosted glass or translucent acrylic.

The bee exit gate assembly 322 includes a proximal portion 324, a middle portion 326 and a distal portion 328. The proximal, middle and distal portions 324, 326, 328 are divided by first and second gates 323, 325. As explained in more detail below, the gates 323, 325 are controlled to allow only a predetermined number of bees out of the hive at one time depending on pollination requirements. In this regard, the first gate 323 may open first to allow some bees to enter the middle portion 326 from the proximal portion 324, followed by closure of the first gate 323 and subsequent opening of the second gate 325 to allow bees from the middle portion 326 to enter the enclosure 10 through the distal portion 328.

The bee entrance gate assembly 330 includes a trap door 332 that allows bees to enter the hive but does not allow any bees to exit the hive. In exemplary embodiments, the trap door 332 may be separately provided as part of the hive enclosure 314 or may be an integrated as part of the bee gate system 320.

Figure 35:
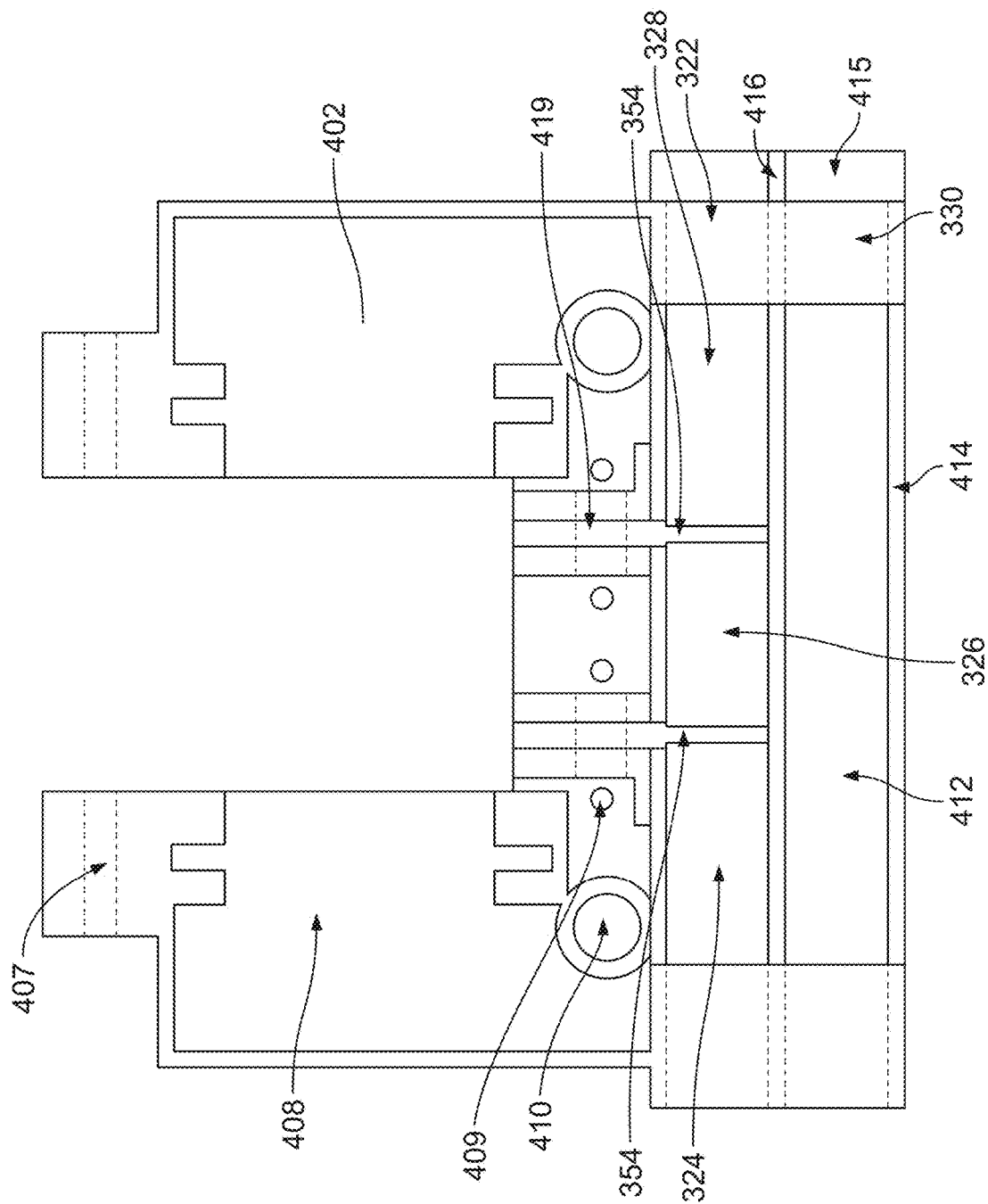
FIG. 35 is a top cross-sectional view of a bee gate system according to an exemplary embodiment of the present invention.

FIG. 35 is a top cross-sectional view of the bee gate system 320 according to an exemplary embodiment of the present invention. Slots 354 are formed through the portion of top wall 350 over the bee exit gate assembly 322 that accommodate movement of the first and second gates 323, 325 between open and closed configurations. A separate slot (not shown) may be provided for the trap door 332 in the case the trap door 332 is provided as part of the bee gate system 320 (otherwise a separate slot may not be needed if the trap door 332 is provided separately with the hive enclosure 314). The bee exit gate assembly 322 and the bee entrance gate assembly 330 are separated by a wall 416. A platform 402 is disposed adjacent to the bee exit gate assembly 322 and bee entrance gate assembly 330 to support other components of the bee gate system 320, such as, for example, components for controlling operation of the first and second gates 323, 325, which may include servo motors. Sensors may also be used to control operation of the first and second gates 323, 325, and may be located on the underside of the bee gate system 320 connected via bolts in holes 409 with a slot 419 for sensing.

Figure 36:
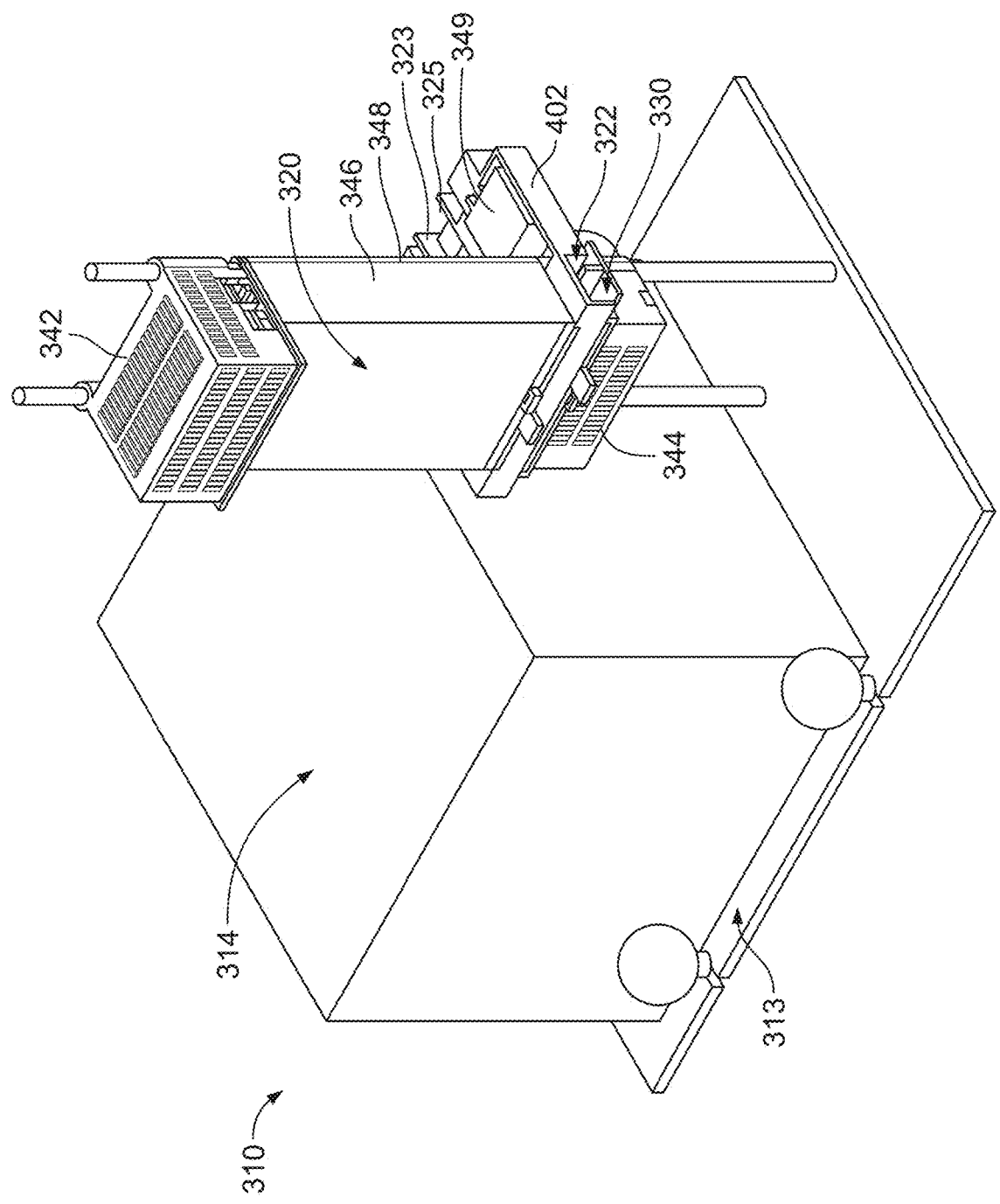
FIG. 36 is a perspective view of a bee station according to an exemplary embodiment of the present invention.

FIG. 36 is a perspective view of the bee station 310 according to an exemplary embodiment of the present invention. As mentioned, the bee station 310 includes a hive enclosure 314 and a bee gate system 320, both of which may be supported on a common base plate 313. In addition to the components mentioned above, the bee gate system 320 further includes a top housing 342, a bottom housing 344 and a middle housing 346 disposed between the top and bottom housings 342, 344. The top housing 342 encloses a computing unit, to be described in more detail below. The middle housing 346 encloses and functions as a focal length spacer for the camera 340. The bottom housing 344 encloses the lighting system 352, among other components. The bee exit gate assembly 322 and bee entrance gate assembly 330 are disposed between the bottom and middle housings 344, 346. The platform 402 supports components including, for example, a first servo motor 348 for the first gate 323 and a second servo motor 349 for the second gate 325.

Figure 37:
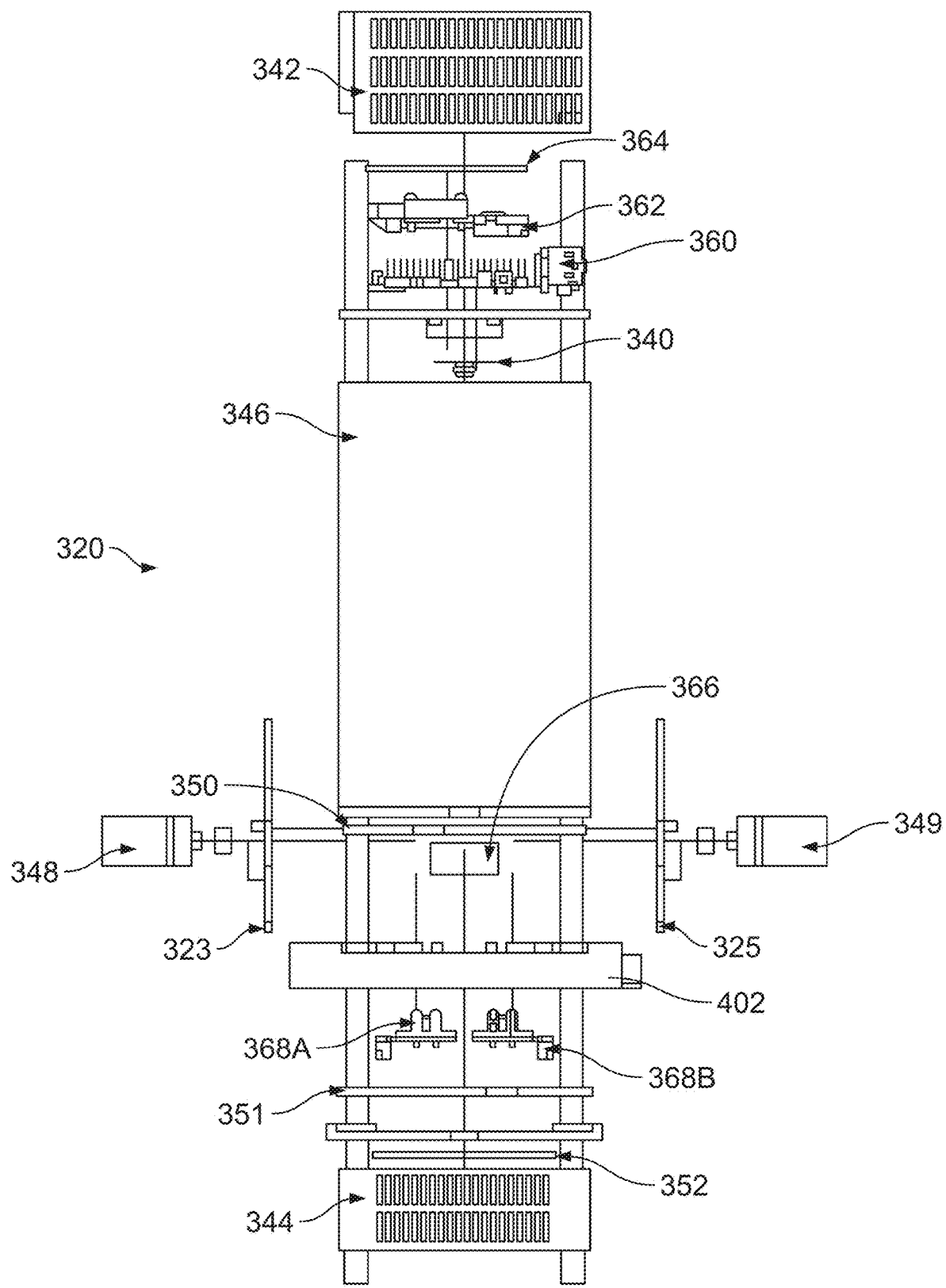
FIG. 37 is an exploded view of a bee gate system according to an exemplary embodiment of the present invention.

FIG. 37 is an exploded view of the bee gate system 320 according to an exemplary embodiment of the present invention. Disposed within the top housing 342 is a computing unit, which may include, for example, a printed circuit board 364 and a single board computer 360. The single board computer 360 may be, for example, a Raspberry Pi (Cambridge, England, UK), a BeagleBoard (Michigan, USA) or a Nano Pi (Guangzhou, China), to name a few. The computing unit may also include a Power over Ethernet (PoE) connection 362, such as, for example, a Raspberry Pi PoE HAT.

As also shown in FIG. 37, a spacer 366 is provided to separate the first and second gates 323, 325 on an axle on the platform 402, and sensors 368A and 368B corresponding to the first gate 323 and the second gate 325, respectively, are provided below the platform 402.

The bee gate system 320 is controlled by the single board computer 360, which may receive power and data through the PoE connection and which is operatively connected to the camera 340 and the lighting system 352. The printed circuit board 364 is operatively connected to the single board computer 360, the two sensors 368A, 368B and the two motors 348, 349.

Figure 38:
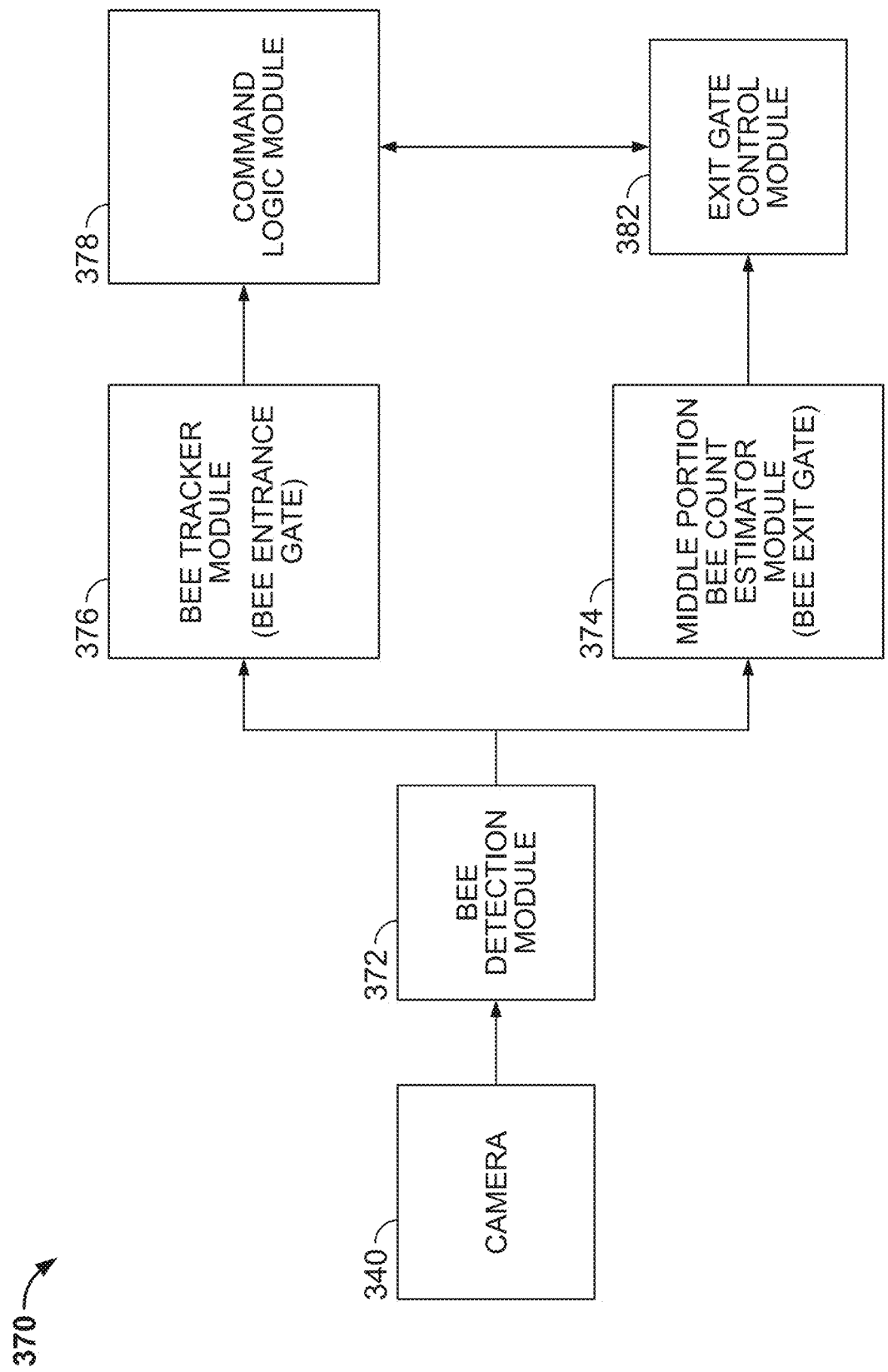
FIG. 38 is a block diagram showing various computer modules of a bee box computing unit according to an exemplary embodiment of the present invention.

FIG. 38 is a block diagram showing various computer modules of a bee box computing unit, generally designated by reference number 370, according to an exemplary embodiment of the present invention. The computing unit includes a bee detection module 372, a bee exit gate middle portion bee count estimator module 374, a bee tracker module 376, a bee counter module 378, an exit gate control module 382, and a command logic module 380.

The bee detection module 372 uses image data from the camera 340 to detect locations of bees within the various regions of the bee exit and bee entrance assemblies 322, 330. In this regard, the bee detection module 372 may return global bee location data associated with bee locations within the proximal, middle, and distal portions 324, 326, 328 of the bee exit assembly 322 and within the bee entrance assembly 330. Each bee detected in the various regions may be provided with an (x,y) coordinate, where the x coordinate is relative to a horizontal axis and the y-coordinate is relative to a vertical axis.

Exemplary pseudocode for implementation of the bee detection module 372 is as follows:

```
class BeeDetectionModule ( ) :
    def __init__(self) :
        # Get camera and associated buffers
        self.is_calibrated = False
        self.camera = PiCamera (resolution=(640, 480) ,
sensor_mode=self.sensor_mode, framerate=self.framerate)
        self.raw_capture_array = PiRGBArray (self.camera,
size=self.camera.resolution)
    def run (self) :
        '''
        Runs forever
        '''
        # Wait for camera to warm up
        time.sleep (5)
        frame_num : int = 0
        recal_this_frame : bool = False
        for frame in self.camera.capture_continuous (self.raw_capture_array,
format="bgr", use_video_port=True) :
            image_timestamp = nsec_since_boot ( )
            # Get OpenCV image
            img = frame.array
            # Convert to grayscale
            img_gray = cv2.cvtColor (img, cv2.COLOR_BGR2GRAY)
            # Make sure that the camera is calibration before running any
detection algorithm
            if not self.is_calibrated:
                self.calibrate_or_load_calibration_from_disk (img_gray)
                self.recal_this_frame = False
            else:
                # Detect bees
                dets, region_fill = self.detectBees (img_gray)
                # Call Bee Tracker Module 376
                bypassDelta = self.getBypassBeeDelta (dets)
                # Send detection message (even if no bees detected)
                msg_dets = beebox_msgs.VisionDetections.new_message (
                    nSecMsgSend=nsec_since_boot ( ) ,
                    nSecCam=image_timestamp,
                    )
                # Send results from Bee Tracker Module 376
                msg_dets.beeDeltaBypass = bypassDelta
                # Send raw estimate of middle portion bee count,
                # to be refined by Middle Port Bee Count Estimator 374
                msg_dets.hive = [det for det in dets if det.region ==
Region.HIVE.value]
                msg_dets.airlock = [det for det in dets if det.region ==
Region.AIRLOCK.value]
                msg_dets.farm = [det for det in dets if det.region ==
Region.FARM.value]
                msg_dets.bypass = [det for det in dets if det.region ==
Region.BYPASS.value]
                # Calculate region fill ratios
                msg_dets.fillRatio.hive = region_fill [Region.HIVE.value-1] /
float (self.mask_areas [Region.HIVE.value-1] )
                msg_dets.fillRatio.airlock =
region_fill [Region.AIRLOCK.value-1] /
float (self.mask_areas [Region.AIRLOCK.value-1] )
                msg_dets.fillRatio.farm = region_fill [Region.FARM.value-1] /
float (self.mask_areas [Region.FARM.value-1] )
                msg_dets.fillRatio.bypass = region_fill [Region.BYPASS.value-
1] / float (self.mask_areas [Region.BYPASS.value-1] )
                # Send message
                self.pub_sock_det_regions_output.send (msg_dets)
            frame_num += 1
            # Dispose of previous frame
            self.raw_capture_array.truncate (0)
            # Subscribe to recalibration request (non-blocking)
            dat_recalibrate =
self.sub_sock_calibrate_event.receive (non_blocking=True)
            if dat_recalibrate is not None:
                # Delete calibration file on disk
                if os.path.isfile (self.calibration_image_path) :
                    os.remove (self.calibration_image_path)
                self.is_calibrated = False
            # Subscribe to count reset request (non-blocking)
            dat_reset = self.sub_sock_reset_event.receive (non_blocking=True)
            if dat_reset is not None:
                # Reset centroid tracker
                self.tracker = self.tracker =
```

```
CentroidTracker (maxDistance=self.maxDistance,
maxDisappeared=self.maxDisappeared)
    def detectBees (self, img_gray) :
        dets = [ ]
        region fill = [ ]
        # Perform Otsu thresholding on each region separately
        img_morphology = np.zeros ( (img_gray.shape [0], img_gray.shape [1] ) ,
dtype=np.uint8)
        for (x, y, w, h) in self.mask_bbox_regions :
            # Clip image to bounding box
            img_clip = img_gray [y:y+h, x:x+w]
            # Threshold image using adaptive thresholding (one per region)
            thresh_otsu, img_region =
cv2.threshold (img_clip, 0, 255, cv2.THRESH_BINARY_INV+cv2.THRESH_OTSU)
            # Copy result to morphology image
            img_morphology [y:y+h, x:x+w] = img_region
        # Bitwise AND our current adaptive thresholded image (bees are white)
with our mask (white center)
        # This should turn all pixels outside of our mask black.
        img_masked = cv2.bitwise_and (img_morphology, img_morphology,
mask=self.background mask)
        # Clean up global adaptive threshold (remove small detection areas
caused by dirt)
        img_separated = cv2.morphologyEx (img_masked, cv2.MORPH_OPEN, kernel3,
iterations = 2)
        # Get number of pixels filled in each region
        for (x, y, w, h) in self.mask_bbox_regions :
            # Clip image to bounding box
            img_clip = img_separated [y:y+h, x:x+w]
            # Record per-region fill
            region_fill.append (cv2.countNonZero (img_clip) )
        # Number and locate the blobs by getting connected components
        retval, labels, stats, centroids =
cv2.connectedComponentsWithStats (img_separated)
        # Create bee detection
        for j in range (1, retval) : # Ignore first blob (background)
            # Get labeled region
            r,c = int (centroids [j] [1] ) , int (centroids [j] [0] )
            component_area = stats [j] [cv2.CC_STAT_AREA]
            region = int (self.region_mask [r,c])
            # Remove bad blob sizes.
            if component_area < self.min_area or component_area >
self.max_area:
                continue
            # Create detection
            det = beebox_msgs.VisionDet (uid=len (dets) , region=region, x=c,
y=r, area=int (component_area) )
            dets.append ( det )
        return dets, region_fill, img_separated
```

Figure 40:
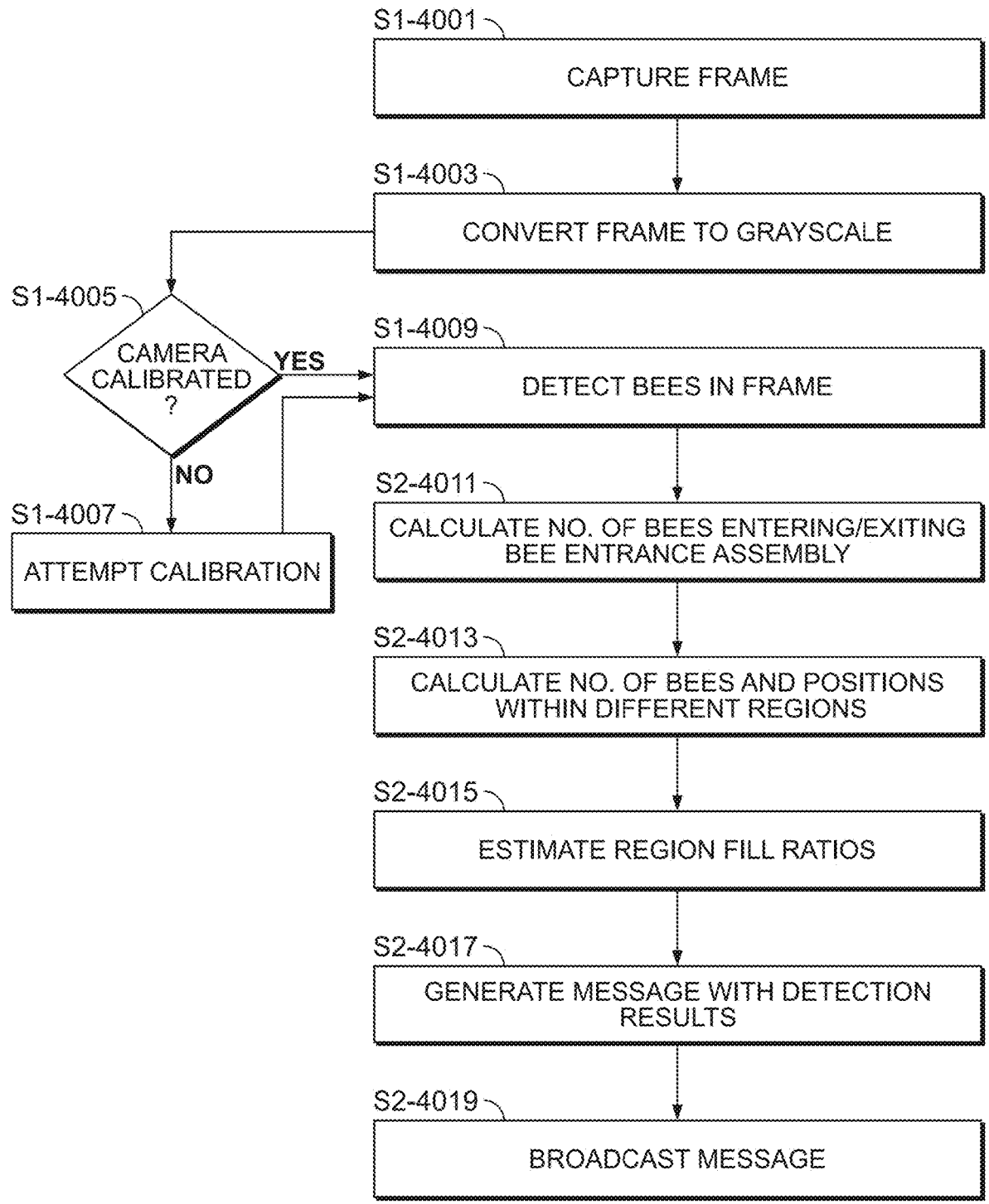
FIG. 40 is a flowchart showing a process carried out by a bee detection module according to an exemplary embodiment of the present invention.

FIG. 40 is a flowchart showing a process carried out by the bee detection module 372 according to an exemplary embodiment of the present invention. The camera is initialized with specified resolution, sensor mode, and frame rate, and a raw capture array is set up to hold the camera's output. In step S1-4001, the bee detection module 372 continuously captures frames from the camera in an infinite loop and, in step S1-4003, converts the current frame to grayscale. In step S1-4005, the bee detection module 372 determines if the camera has been calibrated. If the camera has not been calibrated, then in step S1-4007 the bee detection module 372 attempts calibration. If it is determined that the camera is calibrated (or after calibration in step S1-4007), the bee detection module 372 detects bees in the frame using thresholding and morphology operations (S1-4009). Step S1-4009 includes sub-steps S2-4011 to S2-4019. In step S2-4011, the bee detection module 372 calculates number of bees entering/exiting bee entrance assembly 330 by calling bee tracker module 376. In step S2-4013, the bee detection module 372 calculates the number of bees and their positions within different regions (e.g., hive, airlock, farm, bypass) based on the processed image. In step S2-4015, the bee detection module 372 estimates region fill ratios based on the detected bees and predefined region masks. In step S2-4017, the bee detection module 372 generates a message with detection results including bee positions, counts, and region fill ratios and broadcasts the message to various modules in the pipeline. The bee detection module 372 may also check for recalibration and reset requests, responding by either recalibrating the camera or resetting the tracking system as needed.

The middle portion bee count estimator module 374 uses the bee location data to estimate current number of bees in the middle portion 326 of the bee exit assembly 322. In this regard, the bee counter estimate module 374 may use an exponential filter to estimate current number of bees in the middle portion 326. Exemplary pseudocode for implementation of the middle portion bee count estimate module 374 is as follows:

```
def middlePortionBeeCountEstimatorModule (msg_vision_dets) -> float:
    vis_dets_airlock = len (msg_vision_dets.airlock)
    # Modified version of Exponential moving average factor [0-1] for bee
count in airlock.
    # Note: the sensor is more likely to undercount bees.
    # So we use a modified version of an exponential moving average to give
more probablistic weight to higher readings.
    alpha = self.ALPHA
    if self.bees_in_airlock <= vis_dets_airlock:
        alpha = alpha * self.ALPHA_MULTIPLIER # Give higher weight to this
recent higher reading.
    self.bees_in_airlock = (1.-alpha) * self.bees_in_airlock +
alpha*vis_dets_airlock
    # Publish the estimated bee count in airlock
    return self.bees_in_airlock
```

Figure 41:
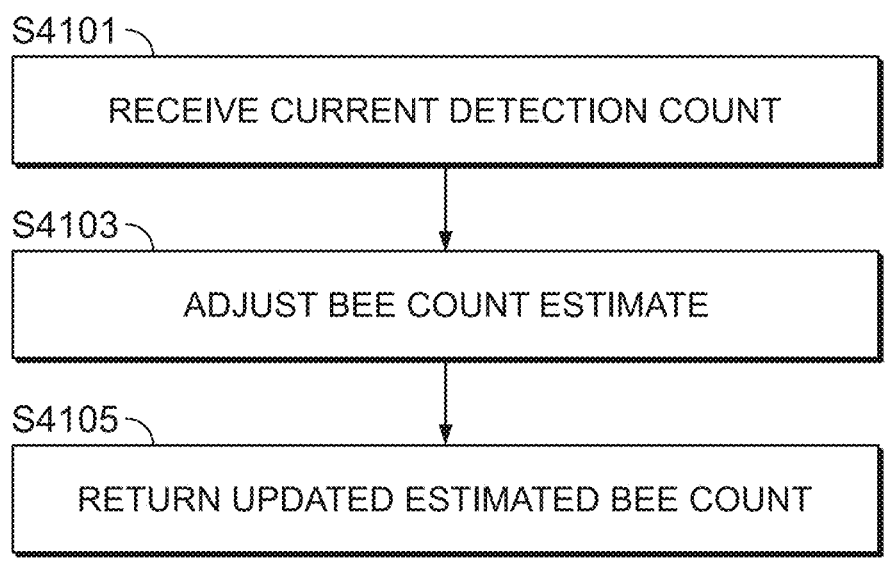
FIG. 41 is a flowchart showing a process carried out by a middle portion bee count estimate module according to an exemplary embodiment of the present invention.

FIG. 41 is a flowchart showing a process carried out by the middle portion bee count estimate module 374 according to an exemplary embodiment of the present invention. In step S4101, the middle portion bee count estimate module 374 receives the current detection count of bees in the airlock from a message. In step S4103, the middle portion bee count estimate module 374 adjusts the bee count estimate using an Exponential Moving Average, modified to give more weight to higher recent readings. This adjustment accounts for the sensor's tendency to undercount by increasing the weight (alpha) when a higher count is observed. In step S4105, the middle portion bee count estimate module 374 returns updated estimated bee count for the airlock, usable in other modules.

The bee tracker module 376 tracks the number of bees leaving and entering the bee entrance assembly 330. In this regard, bees may enter the bee entrance assembly 330, but not necessarily enter the hive, and in some cases may leave the bee entrance assembly 330 without entering the hive at all. Thus, the bee tracker module 376 tracks bee trajectories within the bee entrance assembly 330 within a predetermined period of time to determine an increase or decrease in the number of bees within the enclosure 10. The bee tracker module 376 may use a filtering technique to generate bee tracking data, where the filtering technique may include, for example, Kalman filtering, nearest neighbor, extended Kalman filtering, and unscented Kalman filtering, to name a few. The bee tracking data is then used by the bee tracker module 376 to generate bee count adjustment data to subtract or add to the bee count within the enclosure 10.

Exemplary pseudocode for implementation of the bee tracker module 376 is as follows:

```
# Called by Bee Detection Module 372 with bee detection data in same process
def getBypassBeeDelta (self, dets) -> int:
    '''
    Given a list of bee detections,
    return the number of bees that have crossed the bypass region
    in this timestep.
    '''
    dets_bypass = [det for det in dets if det.region ==
Region.BYPASS.value]
    centroids = np.array ( [ [det.x, det.y] for det in dets bypass] )
    # Update the tracker
    keys, centroids, prevCentroids, tracks =
self.tracker.update (centroids)
    # Check if any centroids have crossed the midway point of the bypass
region
    bypass_cx = self.mask_centers [Region.BYPASS.value-1, 0]
    # Make bypass_cx not an integer, so that it is impossible
    # for the math to land on the midway point
    # This is very important to prevent integrator runaway!
    bypass_cx = bypass_cx - 0.5
    delta = 0
    for x_new, x_old in zip (centroids [ : , 0], prevCentroids [ : , 0] ) :
        x_new_centered = x_new - bypass_cx
        x_old_centered = x_old - bypass_cx
        dx = np.sign (x_new_centered) - np.sign (x_old_centered)
        # dx will be in range [-2, 2]. 0 means same side or no movement.
        # Ignore same side movement or standing on the boundary
        if dx == 0 :
            continue
        # Entering the hive is a negative dx movement (right to left)
        delta += -1 if dx < 0 else 1
    return delta
```

Figure 42:
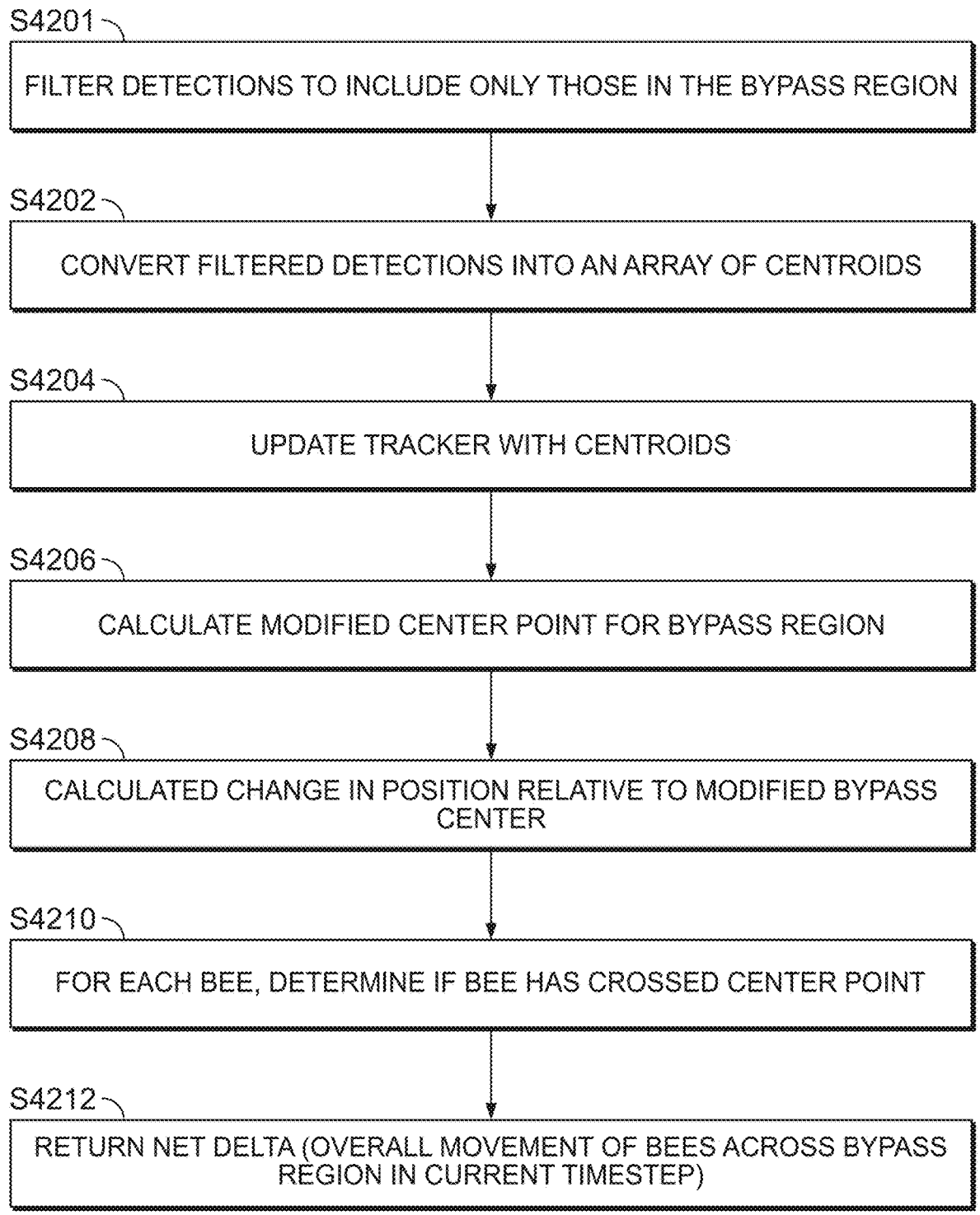
FIG. 42 is a flowchart showing a process carried out by a bee tracker module according to an exemplary embodiment of the present invention.

FIG. 42 is a flowchart showing a process carried out by bee tracker module 376 according to an exemplary embodiment of the present invention. In step S4201, the bee tracker module 376 filters the detections to only include those in the bypass region. In step S4201, the bee tracker converts the filtered detections into an array of centroids, representing the positions of detected bees. In step S4204, the bee tracker module 376 updates a tracker with the centroids, which manages tracking of individual bees across frames and returns updated centroid positions along with previous positions and tracking information. In step S4206, the bee tracker module 376 calculates a modified center point ('bypass_cx') for the bypass region to ensure it's a non-integer value. This adjustment is important for preventing exact matches with the center point, which could lead to errors in calculating movement directions. In step S4208, the bee tracker module 376 iterates through the current and previous centroid positions, calculating the change in position relative to the modified bypass center. In step S4210, for each bee, the bee tracker module 376 determines if the bee has crossed the midway point of the bypass region by checking the sign change in its position relative to 'bypass_cx'. In step S4212, the bee tracker module 376 returns the net delta, representing the overall movement of bees across the bypass region in the current timestep.

The command logic module 378 generates control data for the exit gate control module 382 to cycle through opening of the first and second gates 323, 325. The control data may be based on a bee limit setting, current bee count data and a scheduled rest period. The scheduled rest period may occur upon commencement of a nighttime period, at which point the hive door may be closed, followed by a count reset and hive door opening at the beginning of the following daylight period. The command logic module 378 tracks the number of bees in the enclosure to generate bee count data based on the bee count adjustment data generated by the bee tracker module 376, bee release data generated by the exit gate control module 382 (described below), and reset data.

Exemplary pseudocode for the command logic module 378 is as follows:

```
class CommandLogicController ( ) :
    # Consts
    STATE_FILE = "/data/airlock state.beebox.AirlockStateWithCount"
    def __init__(self) -> None:
        # Try to load beebox state, counts, limits from file.
        if os.path.isfile (self.STATE_FILE) :
            with open (self.STATE_FILE, "rb") as f:
                self.airlock_state = beebox_msgs.AirlockStateWithCount.read (f)
    @property
    def hourLimit (self) -> bool :
        """
        Returns True if bee output should be disabled.
        """
        hour = time.localtime ( ).tm_hour
        return self.SCHEDULE_ENABLE and ( (hour < self.RELEASE_TIME) or (hour >= self.RECAPTURE_TIME) )
    @property
    def beeCount (self) -> float :
        """
        Returns normalized beecount.
        """
        return self.airlock_state.beeCountFarm - self.airlock_state.beeDailyMin
    def updateBeeCountWithDelta (self, delta) :
        """
        Update beecount
        """
        self.airlock_state.beeCountFarm += delta
        self.airlock_state.beeDailyMin = min (self.airlock_state.beeCountFarm, self.airlock_state.beeDailyMin)
        if delta != 0:
            self.saveBeeCount ( )
    @property
    def airlockIsFree (self) -> bool :
        """
        Returns True if airlock is empty.
        """
        return (self.bees_in_airlock <= self.AIRLOCK_FREE_THRESH) and self.airlockInPosition
    @property
    def airlockIsOccupied (self) -> bool :
        """
        Returns True if airlock is occupied.
        """
        return (self.bees_in_airlock > self.AIRLOCK_FREE_THRESH) and self.airlockInPosition
    @property
    def airlockInPosition (self) -> bool :
        """
        Returns True if airlock is in position.
        """
        return (self.last_msg_motor_state is not None) and self.last_msg_motor_state.isInPosition
    @property
    def airlockAcceptingCommands (self) -> bool :
        """
        Returns True if airlock is accepting commands.
        """
        return (self.last_msg_motor_state is not None) and (not
```

```
self.last_msg_motor_state.isMoving)
    def saveBeeCount (self) :
        with open (self.STATE_FILE, 'wb') as f:
            self.airlock_state.write (f)
    def handleDailyCountReset (self) :
        hour = time.localtime ( ).tm_hour
        day = time.localtime ( ).tm_mday
        if hour == self.RESET_TIME and day != self.lastCountResetDate:
            self.airlock_state.beeCountFarm = 0
            self.airlock_state.beeDailyMin = 0
            self.lastCountResetDate = day
            # Save to disk
            self.saveBeeCount ( )
            # Publish reset event to all subscribing nodes
            self.pub_sock_reset.send (msg)
    def run (self) -> None:
        '''
        Runs the airlock controller.
        '''
        # Close the gate on init
        msg_airlock_command =
beebox_msgs.AirlockStateOverride.new_message (nSecMsgSend=nsec_since_boot ( ) , s
tate=AirlockState.LOCKED.value)
        self.pub_airlock_state.send (msg_airlock_command)
        framenum: int = 0
        while 1:
            bee_delta = 0
            # Get mode override (non-blocking)
            msg_override state =
self.sub_override_mode_sock.receive (non_blocking=True)
            if msg_override_state is not None:
                self.override_state_int = msg_override_state.state if
msg_override_state.override else None
            # Get latest bee limit from API Node (non-blocking)
            msg_override_limit =
self.sub_override_limit_sock.receive (non_blocking=True)
            if msg_override_limit is not None:
                self.airlock state.beeLimit = msg_override_limit.data
                # Write to file (in case of restart)
                self.saveBeeCount ( )
            # Get manual update of bee count from API Node (non-blocking)
            msg_override_count =
self.sub_override_count_sock.receive (non_blocking=True)
            if msg_override_count is not None:
                self.airlock_state.beeCountFarm = msg_override_count.data -
self.airlock_state.beeDailyMin
                self.airlock_state.beeDailyMin = 0
                self.saveBeeCount ( )
            # Check if we need to reset our bee count
            self.handleDailyCountReset ( )
            # BLOCK for new vision data
            msg_vision_dets = self.sub_detection_sock.receive ( )
            # Get motor state (non-blocking)
            msg_motor_state =
self.sub_motor_state_sock.receive (non_blocking=True)
            if msg_motor_state is not None:
                self.last_msg_motor_state = msg_motor_state
            # Update bee count using bypass delta from vision stack
            bee_delta += msg_vision_dets.beeDeltaBypass
            # Calculate error (error = target - actual).
            bee_count_error = self.airlock state.beeLimit - self.beeCount
            vis_dets_airlock = len (msg_vision_dets.airlock)
            # Vent bees? (Y/N) Defaults to ingress if at bee limit.
            should_vent = (bee_count_error > 0+epsilon)
            self.bees_in_airlock =
middlePortionBeeCountEstimatorModule (msg_vision_dets)
            # Update new state considering priorities.
            new_state_int: int = None
            if self.airlockAcceptingCommands :
                # Gui override
                if self.override_state_int is not None:
                    new_state_int = self.override_state_int
                # Hour limit
                elif self.hourLimit:
                    new_state_int = AirlockState.LOCKED.value if
(self.airlockIsFree) else AirlockState.OPEN_TO_FARM.value # do not lock a
bee inside the airlock
                # Venting
                elif should_vent :
```

```
            airlock_bee_delta, new_state_int =
self.cycle_airlock (msg_vision_dets)
            bee_delta += airlock_bee_delta
        # If at bee limit and there are no bees in the airlock, lock it.
        elif self.airlockIsFree:
            new_state_int = AirlockState.LOCKED.value
        # if no case matches, do not change state.
        else:
            new_state_int = None
        # update bee count
        self.updateBeeCountWithDelta (bee_delta)
        # Publish bee count to API Node
        if self.last_msg_motor_state is not None:
            # send the airlock state update message
            self.pub_airlock_state.send (msg_airlock_state_update)
        # Update the airlock state based on
        if new_state_int is not None:
            msg_airlock_command =
beebox_msgs.AirlockStateOverride.new_message (
                nSecMsgSend = nsec_since_boot ( ) ,
                state = new_state_int)
            self.pub_motor_command.send (msg_airlock_command)
            # Prevent sending double commands to airlock.
            self.last_msg_motor_state = None
        framenum += 1
    def cycle_airlock (self, msg_vision_dets) -> Tuple [int, int] :
        '''
        Non-blocking function that will request an appropriate state change of the airlock.
        If the state change, vents or ingests bees, it will return the bee delta.
        Returns bee delta, new state.
        '''
        new_state is an int or None if no state change is requested.
        '''
        bee_delta = 0
        new_state_int = None
        # Only allow for state changes if the airlock is working properly.
        if self.airlockInPosition:
            # Change state to new state.
            transaction_dir = (-1 if self.airlockIsFree else 1)
            # Figure out the next state
            new_state_int = self.last_msg_motor_state.commandedState + transaction_dir
            new_state_int = max (new_state_int, 0)
            new_state_int = min (new_state_int, AirlockState.OPEN_TO_FARM.value)
        if (new_state_int == self.last_msg_motor_state.commandedState) :
            # This means that we are already in the target state.
            # Do not start a new transaction and exit immediately.
            return 0, None
        if
            (new_state_int == AirlockState.LOCKED.value) :
            # Make a note of the time we locked the airlock.
            # Thus, we can add some additional time to the airlock lock time
            # for estimating the count.
            self.time_last_locked = time.time ( )
        # The airlock was locked.We are about to release bees in a direction.Keep track of the delta.
        elif (new_state_int == AirlockState.OPEN_TO_FARM.value) :
            if (self.time_last_locked is not None) and ( (time.time ( ) - self.time_last_locked) < self.AIRLOCK_FILTER_TIME ) :
                # Not enough time to estimate the count.
                return 0, None
            # We have been locked for a while.Release the bees !
            bee_delta = ceil (self.bees_in_airlock - self.AIRLOCK_FREE_THRESH)
        # It might be possible for us to accidentally ingest bees using the airlock.
        elif (new_state_int == AirlockState.OPEN_TO_HIVE.value) :
            # Check that there is not a huge mass of bees in the hive side.
            # Otherwise, we should wait to open the hive door.
            if msg_vision_dets.fillRatio.hive > self.HIVE_REGION_OVERCROWDED_RATIO:
                return 0, None
            # Allow the bees to enter the airlock
```

```
    bee_delta = - 1 * ceil (self.bees_in_airlock -
self.AIRLOCK_FREE_THRESH)
        return bee_delta, new_state_int
```

Figure 43:
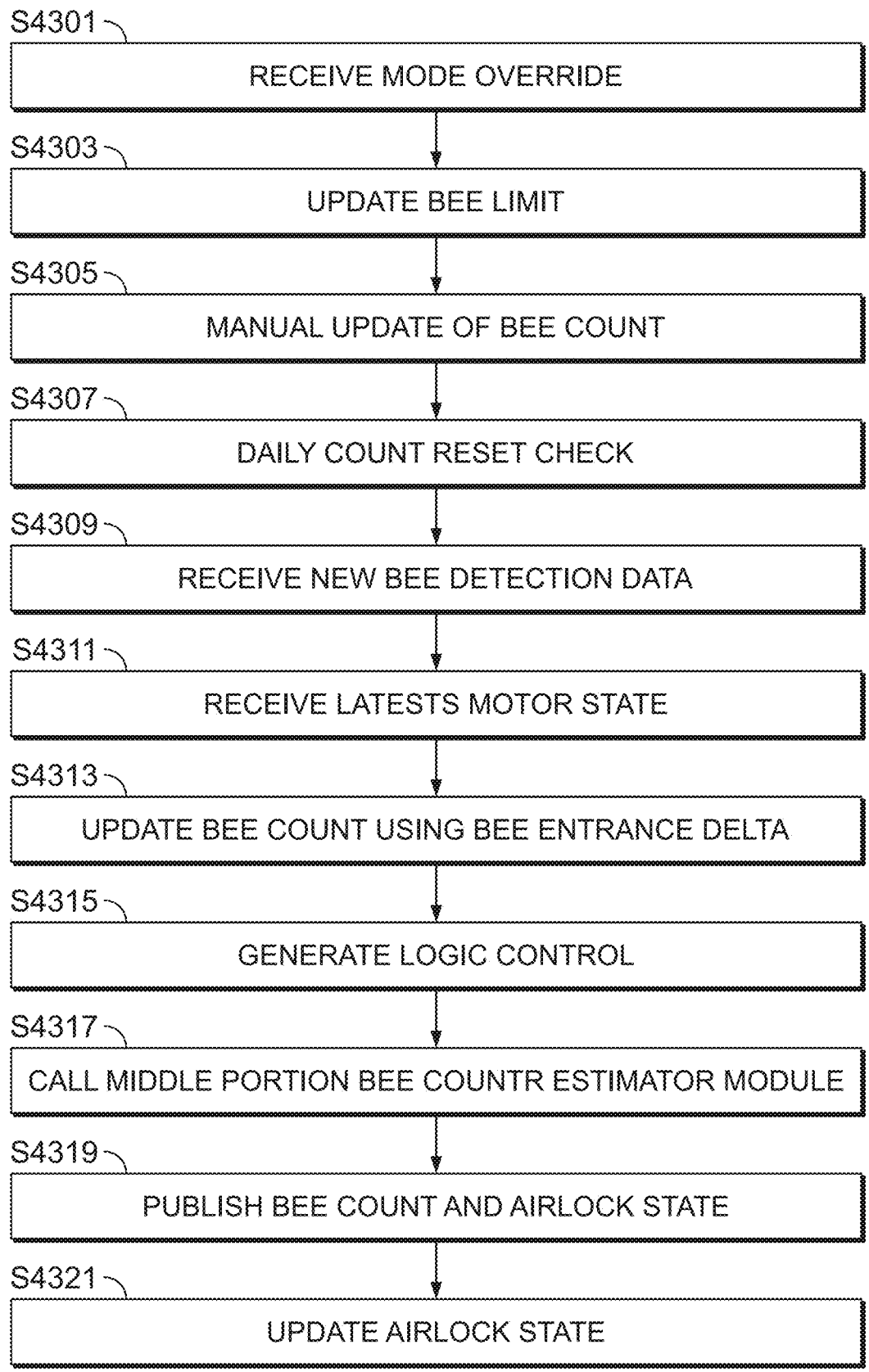
FIG. 43 is a flowchart showing a process carried out by a command logic module according to an exemplary embodiment of the present invention.

FIG. 43 is a flowchart showing a process carried out by the command logic module 378 according to an exemplary embodiment of the present invention. As part of an initialization procedure, the command logic module 378 attempts to load state file from memory, and uses defaults if state file does not exist. In step S4301, the command logic module 378 performed a receive mode override in which any manual override commands are checked that might have been sent to alter the airlock's operation mode. In step S4303, the command logic module 378 updates the system with new bee population limits received from external sources and saves these updates to memory. This ensures that the system maintains the most current operational parameters, even after a restart. In step S4305, the command logic module 378 performs a manual update of bee count, allowing for manual corrections or adjustments to the bee count, with saving of these changes to the state file. In step S4307, if a reset is performed on a daily schedule, the command logic module 378 resets the bee count to zero and writes this reset state to memory. In step S4309, the command logic module 378 waits for and then processes new bee detection data. In step S4311, the command logic module 378 updates the controller with the latest state of the airlock's motor. In step S4313, the command logic module 378 adjusts the internal bee count based on the net change (delta) of bees detected passing through bee entrance assembly 330 by bee tracker module 376. In step S4315, the command logic module 378 applies a series of logical checks and balances to decide the airlock's next state, integrating manual overrides, environmental conditions (time-based restrictions), and operational needs (e.g., venting excess bees or locking the airlock). In step S4317, the command logic module 378 calls the middle portion bee count estimator module 374 for an exponential moving average for bee count in the airlock. In step S4319, the command logic module 378 communicates the updated bee count and any changes in the airlock state to external systems. In step S4321, the command logic module 378 issued commands to change the airlock state based on the determined need, with new states saved to memory to ensure that the system can recover the current operational state after any interruption.

The exit gate control module 382 operates the first and second gates 323, 325 based on the control data generated by the command logic control module 380. Upon release of bees from the exit gate assembly 322, the exit gate control module 382 generates bee release data based on the number of bees released. The bee release data is then fed back to the command logic module 378 for adjustment of the bee count. Exemplary pseudocode for implementation of the exit gate control module 382 is as follows:

```
class GateControl ( ) :
    def __init__(self) -> None:
        # Initialize gate state
        current_state = self.get_sensor_state ( )
        self.motor_angles = self.get_control_command (current_state)
        self.target_state = current_state
    def handle_messages (self) -> None:
        '''
        Handle incoming messages.
        '''
        current_state = self.get_sensor_state ( )
        # Only process new commands if we are not in motion.
        if not self.isMoving:
            # Block for new commands (with a timeout)
            new_state = self.sub_command_sock.receive ( )
            if new_state is not None:
                # New state requested.Send it to the motors.
                self.send_motor_state_command (new_state)
        # Update motor commands (speed control, de-sticking, disengage, etc.)
        self.update_motors (current_state)
        # Publish node state.
        self.pub_state_sock.send (msg_motor_state_update)
    def run (self) -> None:
        '''
        Runs the airlock controller.
        '''
        while 1:
            self.handle_messages ( )
    @property
    def hasDivergedFromTarget (self) -> bool :
        '''
        Returns True if the motor has diverged from the target state.
        Will return false in the case of a jammed motor.
        '''
        return (not self.isJammed) and (not self.isMoving) and
    (self.get_sensor_state ( ) != self.target_state)
    @property
    def isInPosition (self) -> bool:
        '''
        Returns True if the airlock is in position.
```

```
        '''
        return (not self.isMoving) and ( (self.get_sensor_state ( ) ==
    self.target_state) or self.IGNORE_SENSORS)
        @property
        def isMoving (self) -> bool:
            return not math.isclose (self.timestamp_last_actuation, 0.0)
        def update_pwm_output (self) -> None:
            self.hive_servo.angle = self.motor_angles [0] if self.motors_engaged
    else None
            self.farm_servo.angle = -1.* self.motor_angles [1] if
    self.motors_engaged else None
        def update_motors (self, current_state: AirlockState) -> bool:
            '''
            Updates the motor state based on the current state.
            Returns a bool if the Airlock state has converged.
            '''
            if not self.isMoving:
                # If we are stuck in the absence of a command, try to recover to
    last commanded state.
                if (self.isJammed) or (self.hasDivergedFromTarget and not
    self.IGNORE_SENSORS) :
                    self.send_motor_state_command (self.target_state)
                    return
            # target_theta is a vector of the target angles for both motors.
            target_theta = self.get_control_command (self.target_state_low_level)
            # Linear interpolation of motor angles from last state to new target
    state based on current time and max speed of motors.
            self.motor_angles = linear_interpolate (self.last_motor_angles,
    target_theta, self.timestamp_last_actuation, time.time ( ) )
            # State is converged to target state.Deenergize actuators.
            # if math.isclose (actuation_percentage, 1.0) and ( (current_state ==
    self.target_state) or self.DEBUG_IGNORE_SENSORS) :
            if (math.isclose (actuation_percentage, 1.0) and (current_state ==
    self.target_state or self.IGNORE_SENSORS) ) :
                self.isJammed = False
                self.actuator_retry_times = 0
                self.target_state_low_level = self.target_state
                self.timestamp_last_actuation = 0.
                self.motors_engaged = False
                self.update_pwm_output ( )
                return True
            # If still in motion from any command.
            if actuation_percentage < 1.0:
                self.update_pwm_output ( )
                return False
            # If no longer in motion, but not yet at convergence to target, we
    need to do some state cycling.
            if self.actuator_retry_times < self.ACTUATOR_MAX_RETRY*2 :
                # Start a retry cycle.
                self.actuator_retry_times += 1
                # Every other retry cycle, swap from old and new target states.
                # We use the old state, since this is a safe state to be in
                # This is a pseudo-call to "send_motor_state_command"
                self.target_state_low_level = self.last_state_if
    (self.actuator_retry_times % 2) else self.target_state
                self.timestamp_last_actuation = time.time ( )
                self.last_motor_angles = self.motor_angles
                return False
            # JAMMED! No need to handle this further here.
            # We will update other nodes of the jammed state and await new
    commands.
            self.isJammed = True
            self.timestamp_last_actuation = 0.
            self.motors_engaged = False
            self.update_pwm_output ( )
            return False
        def send_motor_state_command (self, target_state: AirlockState) -> None:
            '''
            This command only expects to be called whenever the airlock is not in
    motion,
            as it will override the current command.
            Care needs to taken to only execute commands when the airlock is not
    in motion.
            '''
            # If we are already in the target state, no need to move.
            if (not self.isJammed) and (target_state == self.get_sensor_state ( ) ) :
                return
            self.last_state = self.target_state_low_level
            self.last_motor_angles = self.motor_angles
```

```
    self.target_state = target_state
    self.target_state_low_level = target_state
    self.timestamp_last_actuation = time.time ( )
    self.actuator_retry_times = 0
    self.motors_engaged = True
def get_sensor_state (self) -> AirlockState:
    '''
    Returns the current state of the airlock based on sensor readings
using a lookup table.
    '''
    r,c = self.hive_feedback.value, self.farm_feedback.value
    state = AirlockState ( self.state_lookup [r, c] )
    return state
def get_control_command (self, desired_state : AirlockState) ->
np.ndarray:
    '''
    Returns the angular command to send to the actuators.
    '''
    hive, farm = np.where (self.state_lookup == desired_state.value)
    # Create angular commands (open is always positive)
    farm_cmd = self.SERVO_CLOSED_DEG_if (farm == 0) else
self.FARM_SERVO_OPEN_DEG
    hive_cmd = self.SERVO_CLOSED_DEG if (hive == 0) else
self.HIVE_SERVO_OPEN_DEG
    return np.asarray ( [hive_cmd, farm_cmd] )
```

Figure 44:
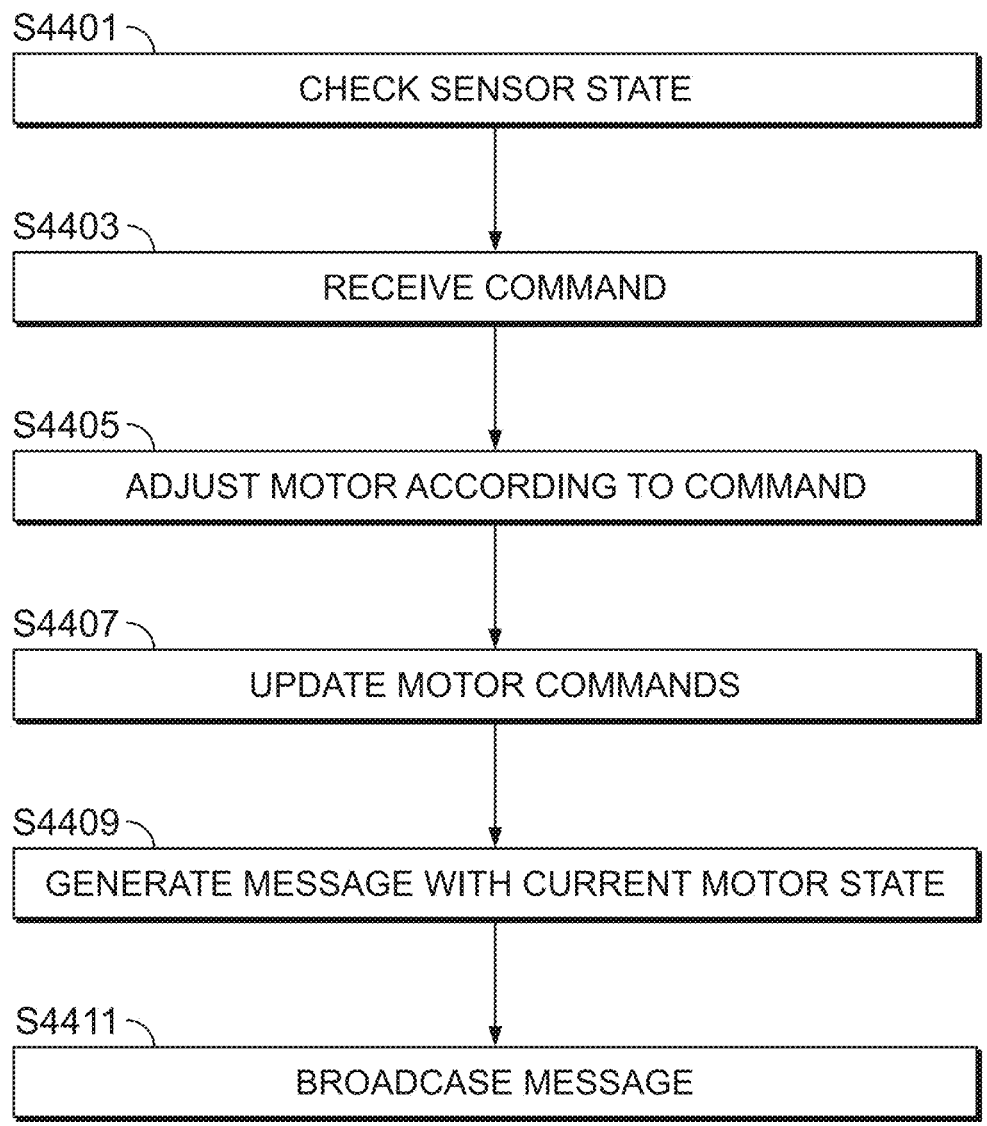
FIG. 44 is a flowchart showing a process carried out by an exit gate control module 382 according to an exemplary embodiment of the present invention.

FIG. 44 is a flowchart showing a process carried out by the exit gate control module 382 according to an exemplary embodiment of the present invention. As part of an initialization procedure, the exit gate control module 382 acquires the initial gate state from sensors and determines motor angles needed to achieve or maintain this state. The target state is set to match the current state, establishing a baseline for operation. In step S4401, the exit gate control module 382, at each iteration, retrieves the current gate state from sensors to understand the gate's real-time position. In step S4403, if the gate is not currently moving ('isMoving' property returns 'False'), the exit gate control module 382 listens for new state commands from a subscribed socket. Upon receiving a command, the exit gate control module 382 issues a directive to adjust the motors accordingly ('send_motor_state_command' method), aiming to transition the gate to the requested state. In step S4407, the exit gate control module 382, regardless of movement, updates motor commands to manage speed, address potential sticking issues, and disengage motors if necessary. In step S4409, the exit gate control module 382, after handling the incoming messages and updating the motor state, creates a message with the current motor state and, in step S4411, broadcasts the message to various modules in the pipeline.

Figure 39:
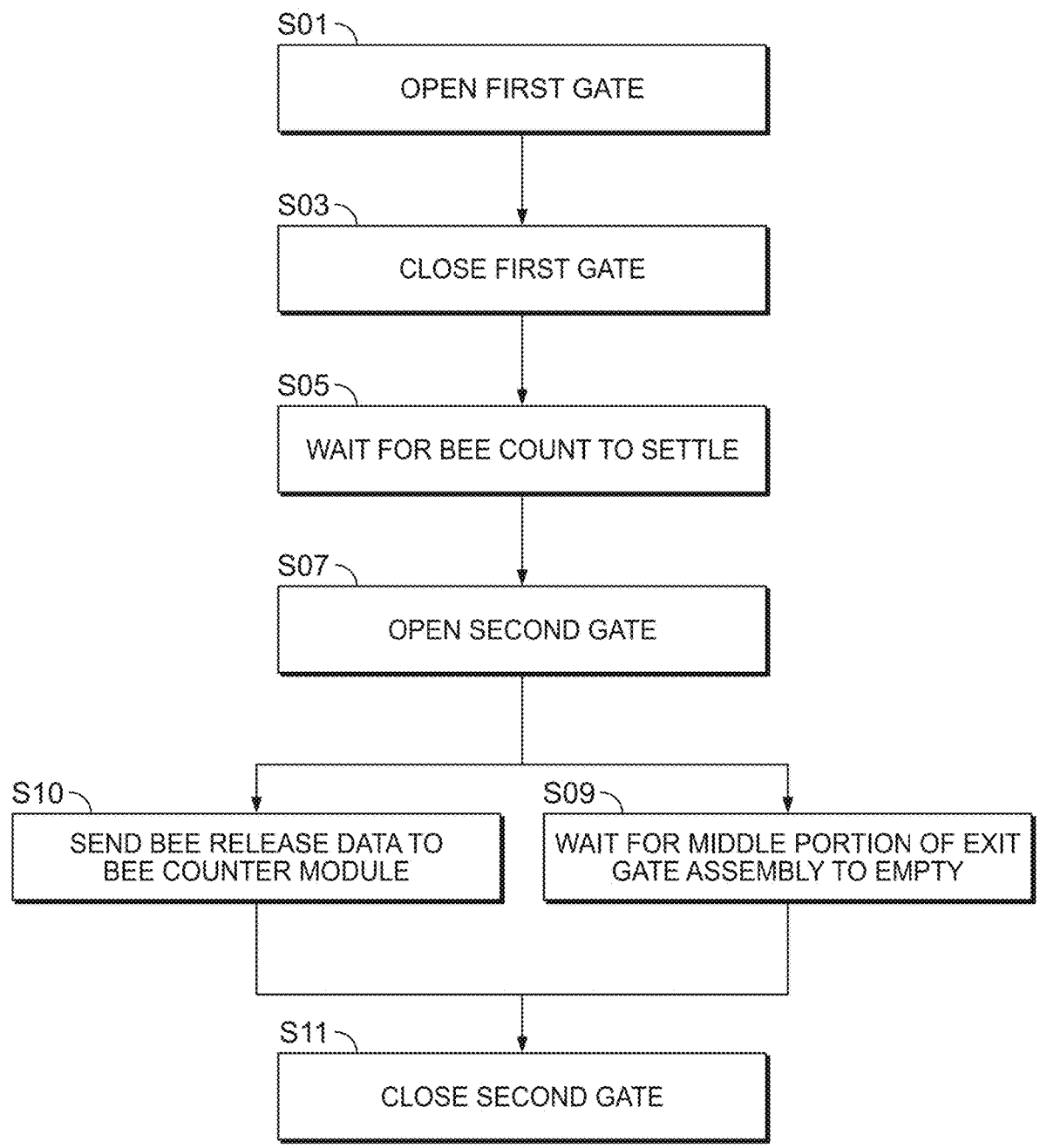
FIG. 39 is a flowchart showing operation of an exit gate assembly according to an exemplary embodiment of the present invention.

FIG. 39 is a flowchart showing operation of the exit gate assembly 322 according to an exemplary embodiment of the present invention. The process shown in FIG. 39 may be repeated on a periodic basis, such as, for example, every 5 seconds, or every 10 seconds, or every minute, or any other period. At step S01 of the process, the first gate 323 is opened to allow bees to enter the first and second portions 324, 326 of the bee exit assembly 322. At step S03, the first gate 323 is closed, which may occur at a preset time after the first gate 323 is initially opened. At step S05, both the first and second gates 323, 325 are kept closed for a period of time to allow the bee count to settle. This step provides adequate time for the bee tracker module 376 to track the number of bees entering and leaving the bee entrance assembly 330 and the middle portion bee count estimator module 374 to estimate current number of bees in the middle portion 326. In step S07, the second gate 325 is opened, thereby releasing the bees from the middle portion 326. In step S10, after the middle portion 326 is determined to be empty (step S09), the bee release data is sent to the bee counter module 378 for adjustment of the bee count within the enclosure 10. In step S11, the second gate 325 is then closed.

In exemplary embodiments, the camera robot 350 is on a stationary platform and may include a vision system configured to identify and count the number of flowers in the crops as the racks 20 move past the robot 350. In other exemplary embodiments, the flower count may be determined using a vision system integrated within the harvesting system 500, for example, within the harvesting robots 552-1, 552-2 . . . 552-n. The vision system may be configured to recognize flowers in various stages of growth and provide fruit ripeness analytics. The vision system may implement machine vision image processing techniques, such as, for example, stitching/registration, filtering, thresholding, pixel counting, segmentation, edge detection, color analysis, blob detection and extraction, neural net/deep learning/machine learning processing pattern recognition including template matching, gauging/metrology, comparison against target values to determine a "pass or fail" or "go/no go" result, to name a few.

It should be appreciated that the bee station as described herein is not limited to use in an indoor vertical farm environment, and in other exemplary embodiments, the inventive bee station may be used in other agriculture environments, such as, for example, outdoor farming, indoor farming, conventional farming, and greenhouse farming, to name a few. For the purposes of the present disclosure, for a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Figure 45:
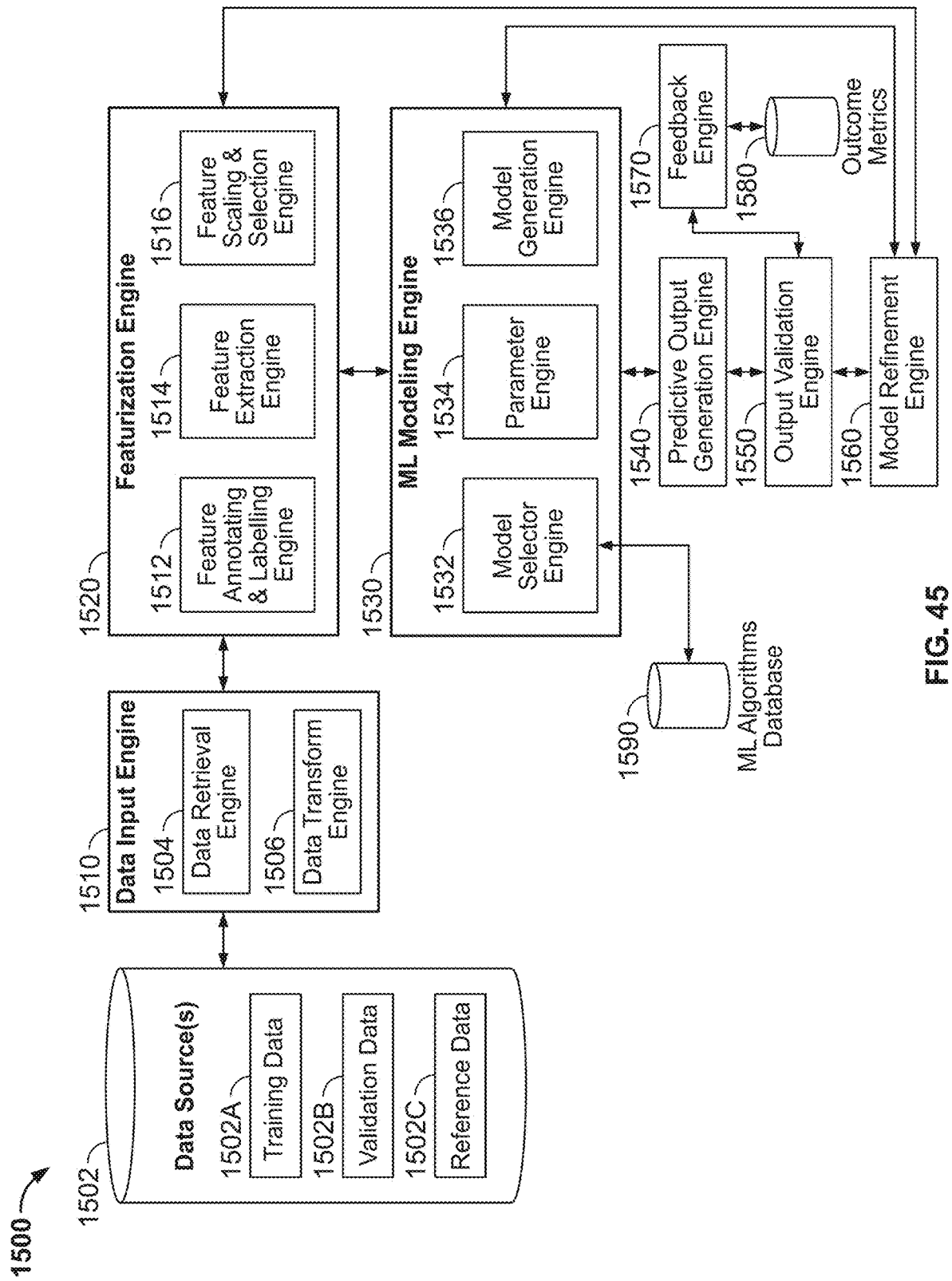
FIG. 45 is a block diagram illustrating a machine learning platform according to an exemplary embodiment of the present invention.

FIG. 45 is a block diagram illustrating an exemplary machine learning platform for implementing various aspects of this invention, according to some exemplary embodiments of the present invention.

System 1500 may include data input engine 1510 that can further include data retrieval engine 1504 and data transform engine 1506. Data retrieval engine 1504 may be configured to access, interpret, request, or receive data, which may be adjusted, reformatted, or changed (e.g., to be interpretable by other engines, such as data input engine 1510). For example, data retrieval engine 1504 may request data from a remote source using an API. Data input engine 1510 may be configured to access, interpret, request, format, re-format, or receive input data from data source(s) 1502. For example, data input engine 1510 may be configured to use data transform engine 1506 to execute a re-configuration or other change to data, such as a data dimension reduction. Data source(s) 1502 may exist at one or more memories and/or data storages. In some embodiments, data source(s) 1502 may be associated with a single entity (e.g., organization) or with multiple entities. Data source(s) 1502 may include one or more of training data 1502a (e.g., input data to feed a machine learning model as part of one or more training processes), validation data 1502b (e.g., data against which at least one processor may compare model output with, such as to determine model output quality), and/or reference data 1502c. In some embodiments, data input engine 1510 can be implemented using at least one computing device. For example, data from data sources 1502 can be obtained through one or more I/O devices and/or network interfaces. Further, the data may be stored (e.g., during execution of one or more operations) in a suitable storage or system memory. Data input engine 1510 may also be configured to interact with data storage, which may be implemented on a computing device that stores data in storage or system memory. System 1500 may include featurization engine 1520. Featurization engine 1520 may include feature annotating and labeling engine 1512 (e.g., configured to annotate or label features from a model or data, which may be extracted by feature extraction engine 1514), feature extraction engine 1514 (e.g., configured to extract one or more features from a model or data), and/or feature scaling and selection engine 1516. Feature scaling and selection engine 1516 may be configured to determine, select, limit, constrain, concatenate, or define features (e.g., AI features) for use with AI models. System 1500 may also include machine learning (ML) modeling engine 1530, which may be configured to execute one or more operations on a machine learning model (e.g., model training, model re-configuration, model validation, model testing), such as those described in the processes described herein. For example, ML modeling engine 1530 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 1502a) through a machine learning model process (e.g., a training process). In some embodiments, different epochs may have different degrees of supervision (e.g., supervised, semi-supervised, or unsupervised). Data into a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, trillions, or even billions of model parameters. ML modeling engine 1530 may include model selector engine 1532 (e.g., configured to select a model from among a plurality of models, such as based on input data), parameter selector engine 1534 (e.g., configured to add, remove, and/or change one or more parameters of a model), and/or model generation engine 1536 (e.g., configured to generate one or more machine learning models, such as according to model input data, model output data, comparison data, and/or validation data). Similar to data input engine 1510, featurization engine 1520 can be implemented on a computing device. In some embodiments, model selector engine 1532 may be configured to receive input and/or transmit output to ML algorithms database 1590. Similarly, featurization engine 1520 can utilize storage or system memory for storing data and can utilize one or more I/O devices or network interfaces for transmitting or receiving data. ML algorithms database 1590 (or other data storage) may store one or more machine learning models, any of which may be fully trained, partially trained, or untrained. A machine learning model may be or include, without limitation, one or more of (e.g., such as in the case of a meta-model) a statistical model, an algorithm, a neural network (NN), a convolutional neural network (CNN), a generative neural network (GNN), a Word2Vec model, a bag of words model, a term frequency-inverse document frequency (tf-idf) model, a Generative Pre-trained Transformer (GPT) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein.

System 1500 can further include predictive output generation engine 1540, output validation engine 1550 (e.g., configured to apply validation data to machine learning model output), feedback engine 1570 (e.g., configured to apply feedback from a user and/or machine to a model), and model refinement engine 1560 (e.g., configured to update or re-configure a model). In some embodiments, feedback engine 1570 may receive input and/or transmit output (e.g., output from a trained, partially trained, or untrained model) to outcome metrics database 1580. Outcome metrics database 1580 may be configured to store output from one or more models, and may also be configured to associate output with one or more models. In some embodiments, outcome metrics database 1580, or other device (e.g., model refinement engine 1560 or feedback engine 1570) may be configured to correlate output, detect trends in output data, and/or infer a change to input or model parameters to cause a particular model output or type of model output. In some embodiments, model refinement engine 1560 may receive output from predictive output generation engine 1540 or output validation engine 1550. In some embodiments, model refinement engine 1560 may transmit the received output to featurization engine 1520 or ML modeling engine 1530 in one or more iterative cycles.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

The invention claimed is:

1. An irrigation system for a vertical farm system, the irrigation system comprising:
    a main drainpipe; and
    one or more irrigation stations, each of the one or more irrigation stations comprising:
        one or more tanks that hold irrigation fluid; and
        one or more spigots configured to deliver the irrigation fluid from the one or more tanks to the vertical farm system, wherein each of the one or more irrigation stations comprises a plurality of sub-assemblies arranged in a vertical stack relative to one another, each sub-assembly comprising:
            a corresponding one of the one or more tanks;
            a corresponding one of the one or more spigots;
            a corresponding stopper;
            a corresponding piston assembly configured to move the corresponding stopper between a position in which the stopper blocks a drain of the vertical farm system and a position in which the stopper unblocks the drain; and
            a corresponding drain tray configured to guide the irrigation fluid, drained due to the stopper unblocking the drain from the sub-assembly, to the main drainpipe.

2. The irrigation system of claim 1, wherein the corresponding drain tray of each of the plurality of sub-assemblies is configured to guide the irrigation fluid, drained due to the stopper unblocking the drain from the sub-assembly, to the corresponding tank of one of the plurality of sub-assemblies below the sub-assembly.

3. The irrigation system of claim 1, wherein each of the plurality of sub-assemblies is connected to an overflow pipe that collects irrigation fluid overflow from the one or more tanks.

4. The irrigation system of claim 3, wherein the main drainpipe collects the irrigation fluid overflow from the overflow pipe and delivers the irrigation fluid to the one or more irrigation stations.

5. The irrigation system of claim 1, wherein each tank is supplied separately with irrigation fluid.

* * * * *